US006911488B2

(12) United States Patent
Cody et al.

(10) Patent No.: US 6,911,488 B2
(45) Date of Patent: Jun. 28, 2005

(54) PHYSICAL METHODS OF DISPERSING CHARACTERISTIC USE PARTICLES AND COMPOSITIONS THEREOF

(75) Inventors: Charles A. Cody, Nashville, IN (US); Manshi Sui, Hillsborough, NJ (US); Youssef Awad, North Brunswick, NJ (US)

(73) Assignee: Shamrock Technologies, Inc., Dayton, NJ (US)

( * ) Notice: Subject to any disclaimer, the term of this patent is extended or adjusted under 35 U.S.C. 154(b) by 145 days.

(21) Appl. No.: 10/177,893

(22) Filed: Jun. 21, 2002

(65) Prior Publication Data

US 2003/0144398 A1 Jul. 31, 2003

Related U.S. Application Data

(63) Continuation-in-part of application No. 09/671,075, filed on Sep. 27, 2000, now abandoned.

(51) Int. Cl.$^7$ ................................................ C08K 9/10
(52) U.S. Cl. ...................... 523/210; 523/216; 524/445; 524/442; 524/545
(58) Field of Search ............................... 523/207, 209, 523/200, 210, 225, 276; 524/545, 495, 497, 492

(56) References Cited

U.S. PATENT DOCUMENTS

| | | | |
|---|---|---|---|
| 2,355,356 A | 8/1944 | Young | 260/583 |
| 2,775,617 A | 12/1956 | Shapiro et al. | 260/567.6 |
| 2,966,506 A | 12/1960 | Jordan | 260/448 |
| 3,136,819 A | 6/1964 | Shapiro et al. | 260/583 |
| 3,252,757 A | 5/1966 | Granquist | 23/111 |
| 3,586,478 A | 6/1971 | Neumann | 23/111 |
| 3,666,407 A | 5/1972 | Orlemann | 23/111 |
| 3,671,190 A | 6/1972 | Neumann | 23/111 |
| 3,844,978 A | 10/1974 | Hickson | 252/455 R |
| 3,844,979 A | 10/1974 | Hickson | 252/455 R |
| 3,852,405 A | 12/1974 | Granquist | 423/118 |
| 3,855,147 A | 12/1974 | Granquist | 252/317 |
| 3,897,586 A * | 7/1975 | Coker | 428/403 |
| 3,904,575 A | 9/1975 | Satokawa et al. | 260/32.8 R |
| 4,025,481 A | 5/1977 | Tournut et al. | 260/29.6 F |
| 4,039,297 A | 8/1977 | Takenaka | 428/566 |
| 4,058,578 A | 11/1977 | Kuhls et al. | 260/884 |
| 4,081,496 A | 3/1978 | Finlayson | 260/864 |
| 4,105,578 A | 8/1978 | Finlayson et al. | 252/316 |
| 4,116,866 A | 9/1978 | Finlayson | 252/316 |
| 4,208,218 A | 6/1980 | Finlayson | 106/287.5 |
| 4,391,637 A | 7/1983 | Mardis et al. | 106/20 |
| 4,410,364 A | 10/1983 | Finlayson et al. | 106/20 |
| 4,412,018 A | 10/1983 | Finlayson et al. | 523/508 |
| 4,434,075 A | 2/1984 | Mardis et al. | 252/315.2 |
| 4,434,076 A | 2/1984 | Mardis et al. | 252/315.2 |
| 4,450,095 A | 5/1984 | Finlayson | 252/315.2 |
| 4,517,112 A | 5/1985 | Mardis et al. | 252/315.2 |
| 4,587,286 A | 5/1986 | Wilkinson | 524/375 |
| 4,664,820 A | 5/1987 | Magauran et al. | 252/28 |
| 4,742,098 A | 5/1988 | Finlayson et al. | 523/514 |
| 4,849,006 A | 7/1989 | Knudson, Jr. | 71/64.11 |
| 4,894,182 A | 1/1990 | Cody et al. | 252/315.2 |
| 4,997,862 A * | 3/1991 | Lark | 523/210 |
| 5,001,198 A | 3/1991 | Sekiya et al. | 525/328.2 |
| 5,006,594 A | 4/1991 | Rees | 524/520 |
| 5,030,667 A | 7/1991 | Shimizu et al. | 523/201 |
| 5,075,033 A | 12/1991 | Cody et al. | 252/315.2 |
| 5,077,097 A | 12/1991 | Moggi et al. | 427/393.6 |
| 5,130,028 A | 7/1992 | Cody et al. | 210/691 |

(Continued)

FOREIGN PATENT DOCUMENTS

| | | |
|---|---|---|
| EP | 0051439 | 5/1982 |
| EP | 0322838 | 7/1989 |
| EP | 0284972 | 11/1991 |
| EP | 0340839 | 5/1994 |
| EP | 0487273 | 6/1995 |
| EP | 0718346 | 6/1996 |
| EP | 0635535 | 11/1997 |
| JP | 07102383 | 4/1995 |
| JP | 07126534 | 5/1995 |
| JP | 07138403 | 5/1995 |
| JP | 07258554 | 10/1995 |
| JP | 09077879 | 3/1997 |
| JP | 09194538 | 7/1997 |
| JP | 09324092 | 12/1997 |
| JP | 10120858 | 5/1998 |
| JP | 11029679 | 2/1999 |

OTHER PUBLICATIONS

J.R. Partington, *An Advanced Treatise on Physical Chemistry*, vol. 3, pp. 211–213, 245–247, (John Wiley & Sons, New York, 1957).

H. Sonntag & K. Strenge, *Coagulation and Stability of Disperse Systems* (John Wiley & Sons, New York, 1993).

Kirk–Othmer, *Powders, Handling (Dispersion)*, vol. 19, p. 1093–1112.

Kirk–Othmer, *Concise Encyclopedia of Chemical Technology*, pp. 1142–1146 (John Wiley & Sons, New York).

Kirk–Othmer, *Encyclopedia of Chemical Technology*, vol. 23, pp. 478–491, (John Wiley & Sons, New York, 1993).

*Physical Chemistry: Enriching Topics from Colloid and Surface Science*, Ed., H. van Olphen & Karol J. Mysels, Theorex, La Jolla, CA, 1975, pp. 135–153.

*Primary Examiner*—David W. Wu
*Assistant Examiner*—Rip A. Lee
(74) *Attorney, Agent, or Firm*—Baker Botts LLP; Manu J. Tejwani

(57) ABSTRACT

The present invention provides compositions that are capable of being dispersed in a target medium. The compositions include characteristic use particles entrapped within a physical entrapment phase, wherein the physical entrapment phase is dispersible in the target medium. Accordingly, the compositions of the present invention physically prevent the agglomeration or self-association of the characteristic use particles. Also disclosed are processes for manufacturing compositions that are capable of being dispersed in a target medium.

25 Claims, 32 Drawing Sheets

U.S. PATENT DOCUMENTS

| | | | |
|---|---|---|---|
| 5,389,200 A | 2/1995 | Cody et al. | 162/5 |
| 5,407,477 A | 4/1995 | Reynolds et al. | 106/284.2 |
| 5,521,230 A | 5/1996 | Bhatia et al. | 523/328 |
| 5,558,777 A | 9/1996 | Kemnetz et al. | 210/691 |
| 5,565,417 A | 10/1996 | Salvia | 508/167 |
| 5,634,969 A | 6/1997 | Cody et al. | 106/287.17 |
| 5,667,694 A | 9/1997 | Cody et al. | 210/679 |
| 5,679,741 A | 10/1997 | Breton et al. | 525/71 |
| 5,696,292 A | 12/1997 | Cody et al. | 564/296 |
| 5,725,805 A | 3/1998 | Kemnetz et al. | 252/315.2 |
| 5,735,943 A | 4/1998 | Cody et al. | 106/164.3 |
| 5,759,938 A | 6/1998 | Cody et al. | 502/62 |
| 5,804,654 A * | 9/1998 | Lo et al. | 525/67 |
| 5,928,589 A | 7/1999 | Norota et al. | 264/115 |
| 5,993,769 A | 11/1999 | Pinnavaia et al. | 423/331 |
| 6,160,038 A * | 12/2000 | Bhatia et al. | 523/206 |
| 6,162,857 A | 12/2000 | Trexler, Jr. et al. | 524/445 |
| 6,172,121 B1 | 1/2001 | Chaiko | 516/101 |
| 6,180,378 B1 * | 1/2001 | Shen et al. | 435/176 |
| 6,262,162 B1 | 7/2001 | Lan et al. | 524/445 |
| 6,380,295 B1 | 4/2002 | Ross et al. | 524/443 |
| 6,469,072 B1 * | 10/2002 | Bhatia et al. | 523/206 |

* cited by examiner

→ RECOVER, DRY & POWDER TO YIELD

PHYSICAL METHODS OF DISPERSING CHARACTERISTIC USE PARTICLES AND COMPOSITIONS THEREOF

This application is a continuation-in-part of U.S. patent application Ser. No. 09/671,075 of Cody et al., filed Sep. 27, 2000, abandoned.

FIELD OF THE INVENTION

The present invention relates to a method of dispersing a characteristic use particle in a target medium. In description when considered with the accompanying drawings, wherein.

Figure 12A:
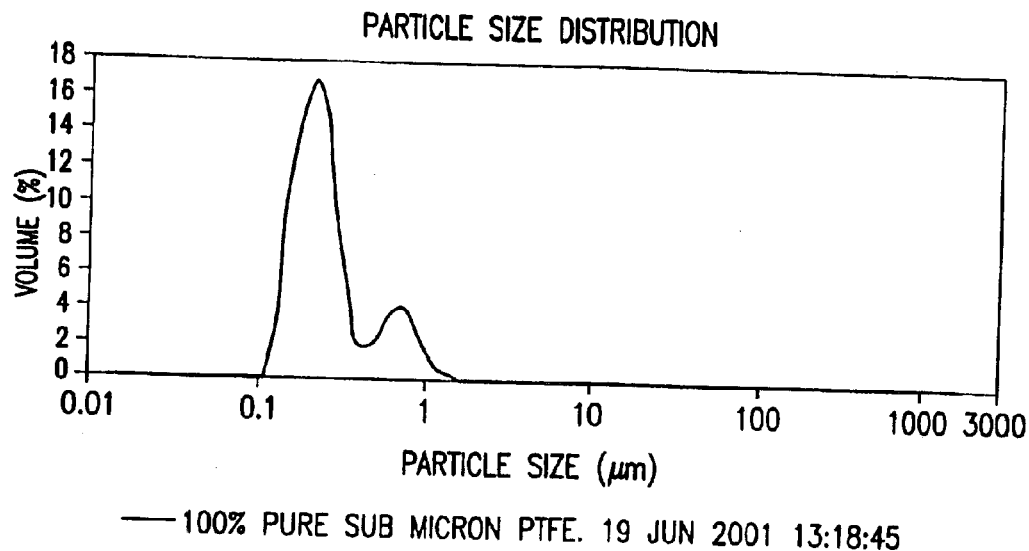
Figure 12B:
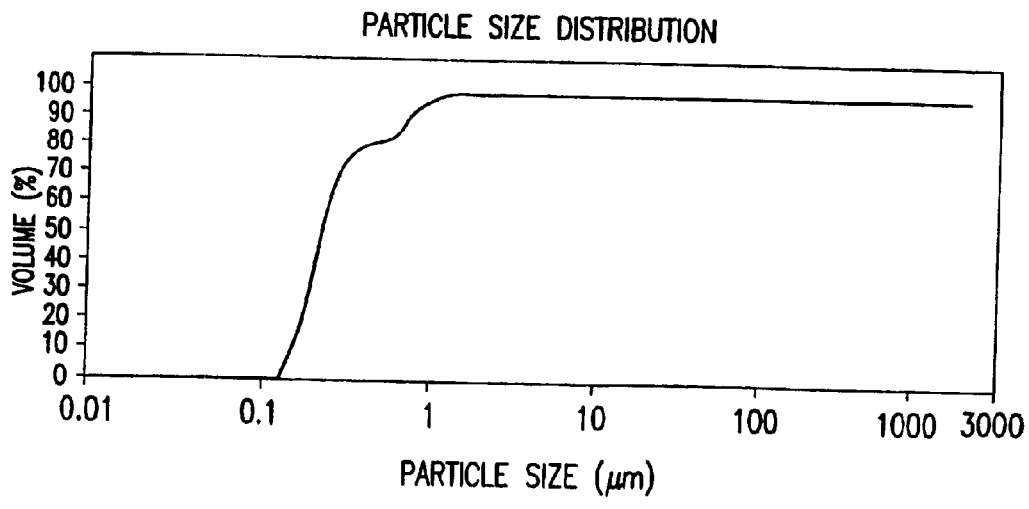
Figure 13A:
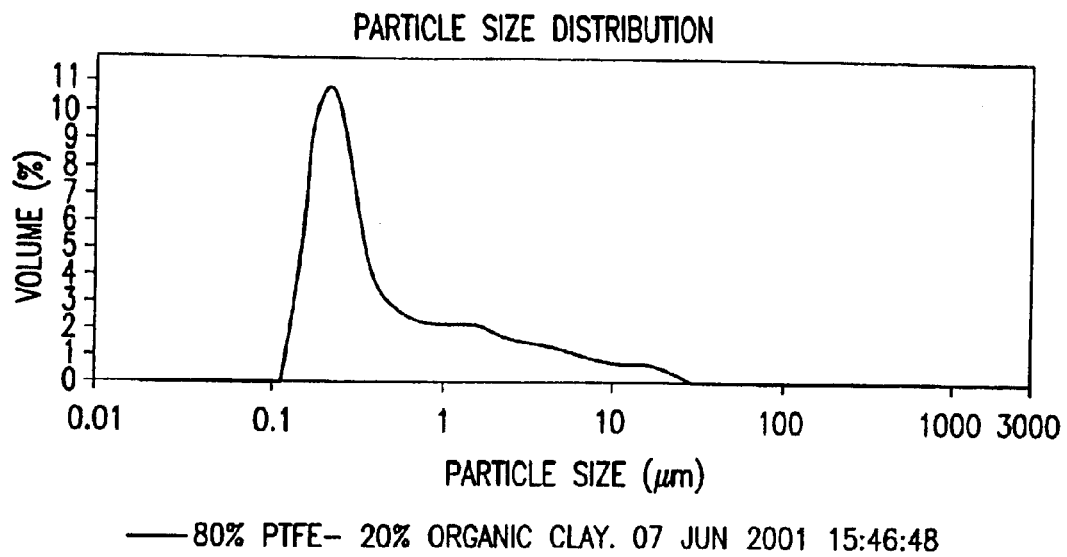
Figure 13B:
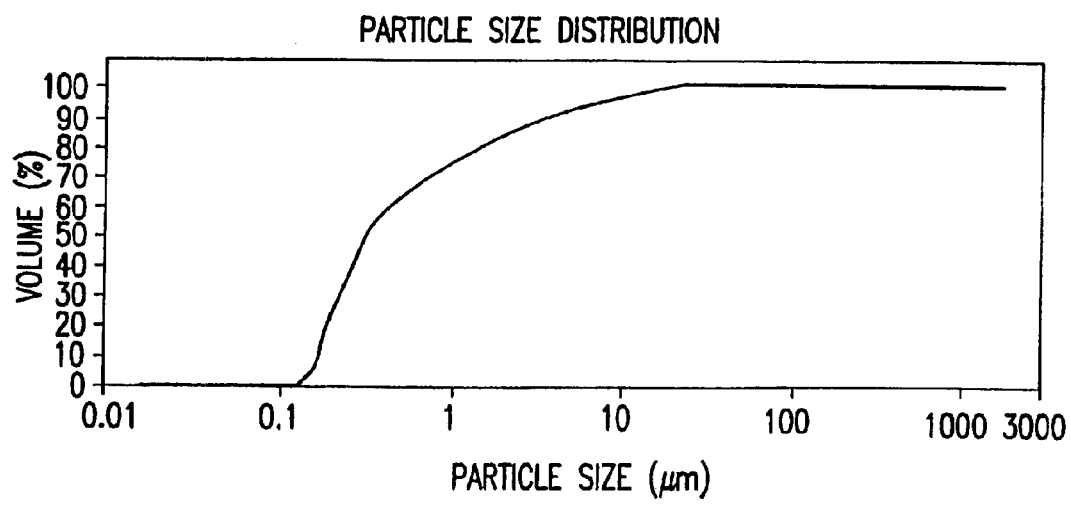
Figure 14A:
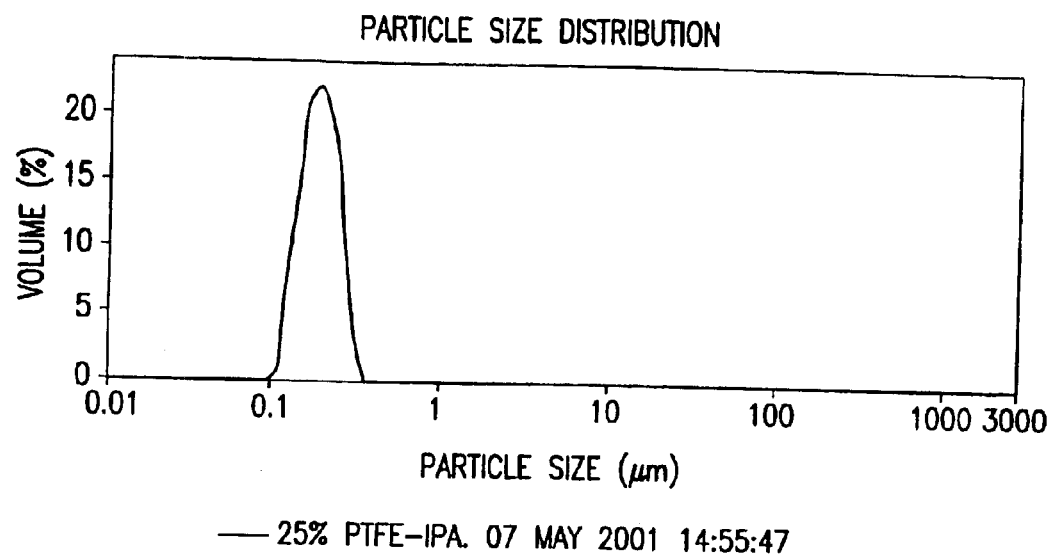
Figure 14B:
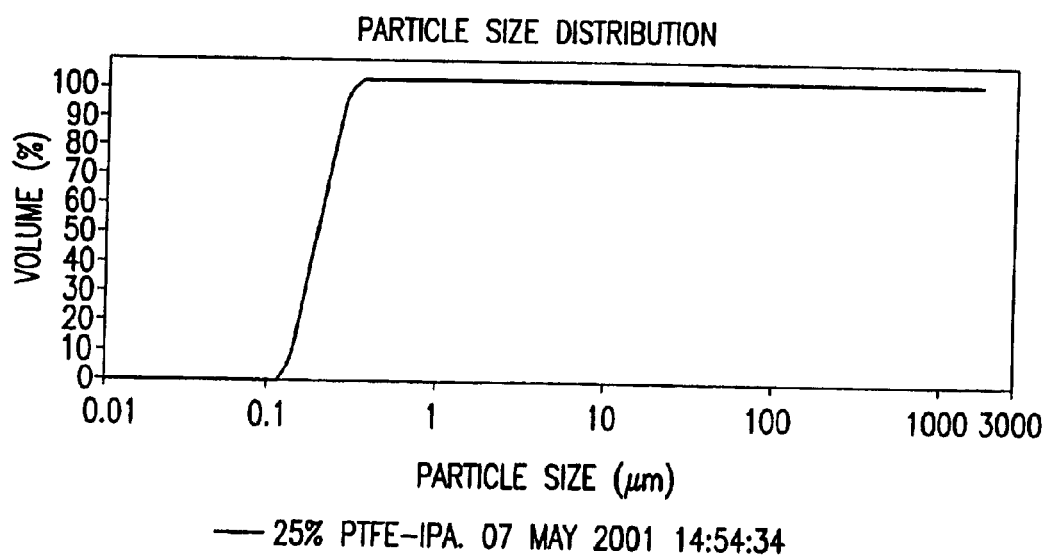
Figure 15A:
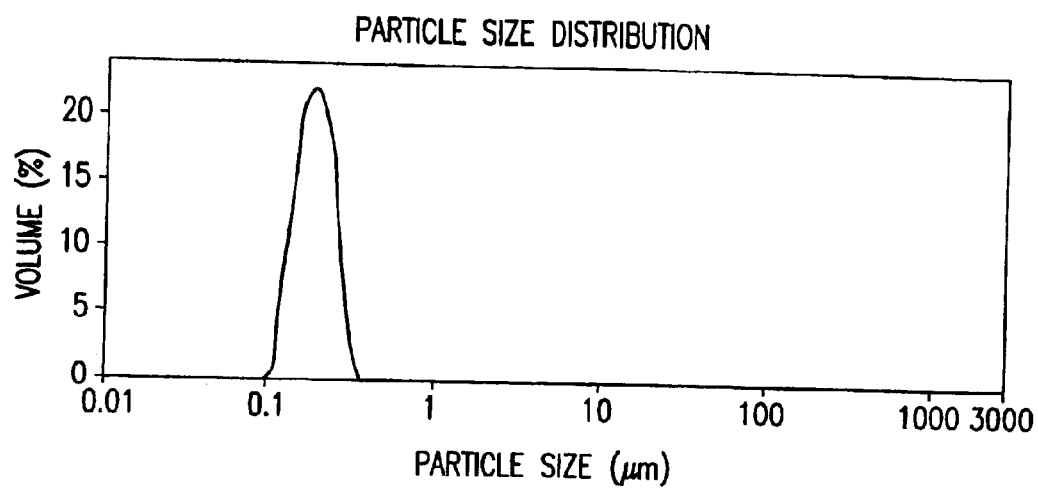
Figure 15B:
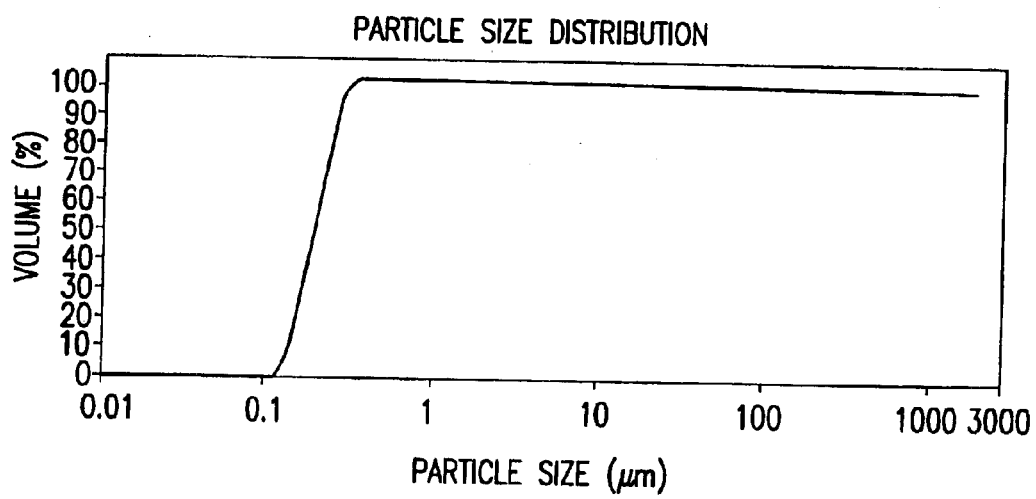
Figure 16:
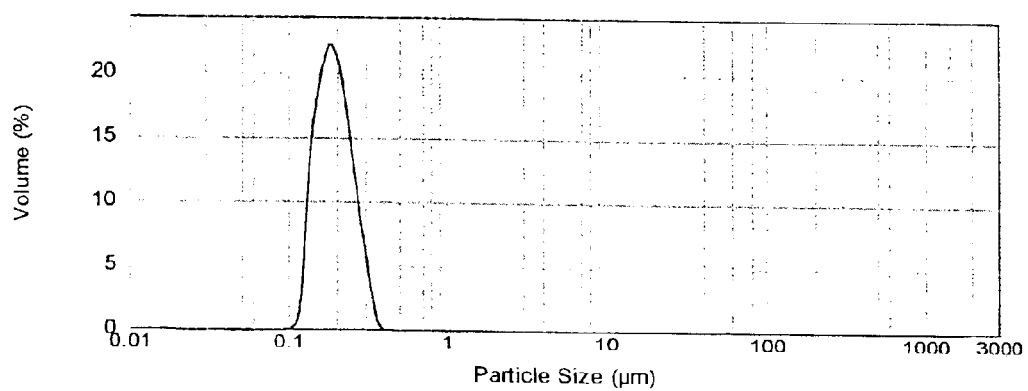
Figure 17:
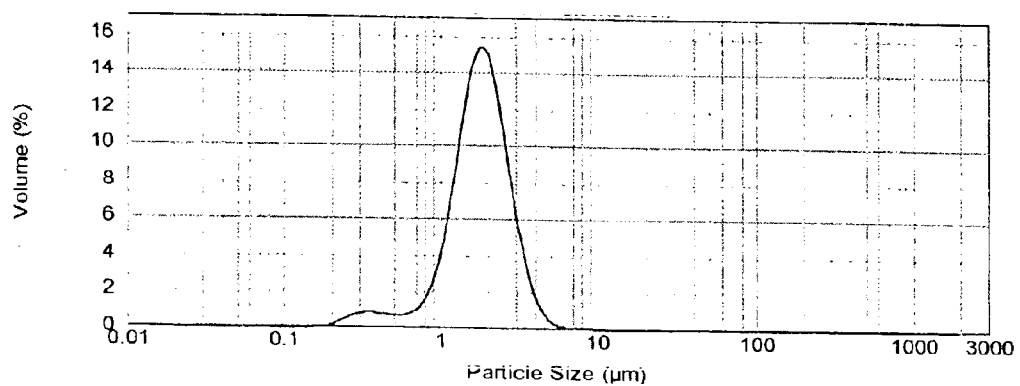
Figure 18:
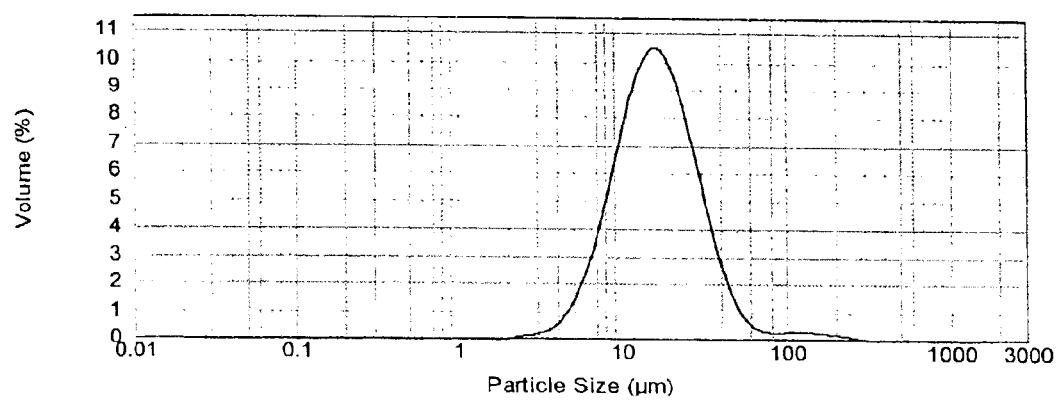
Figure 19:
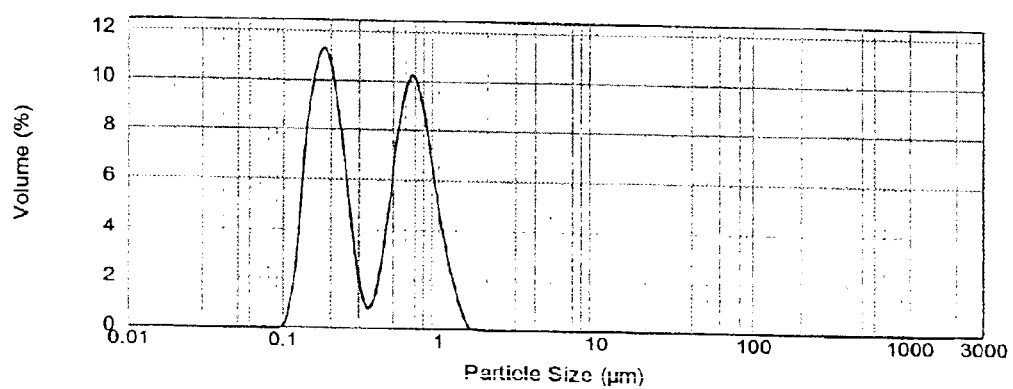
Figure 20:
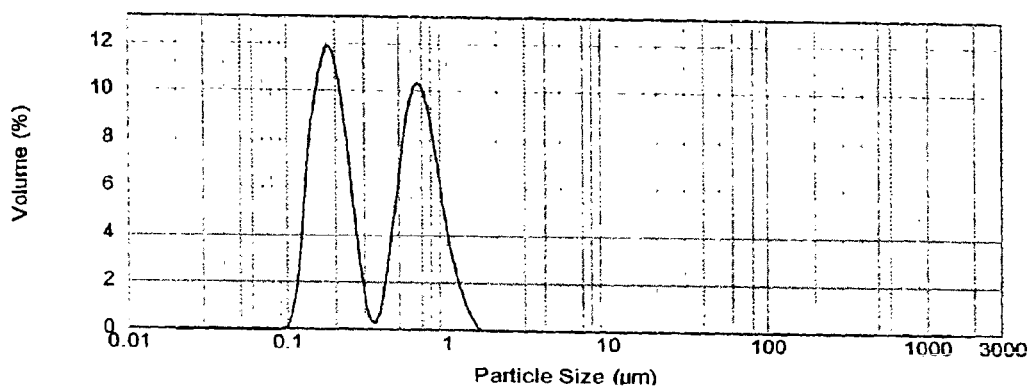
Figure 21:
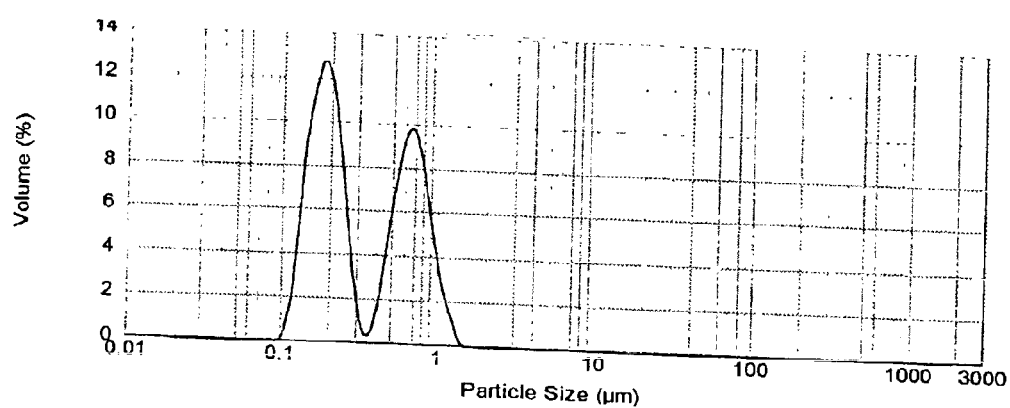
Figure 22:
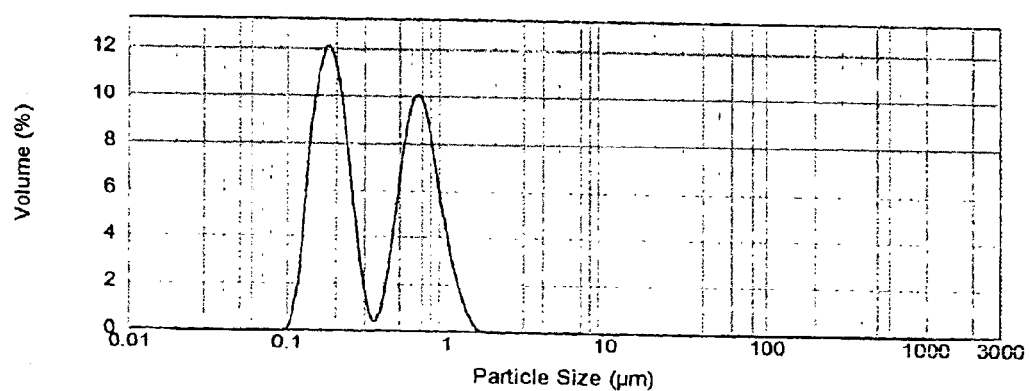
Figure 23:
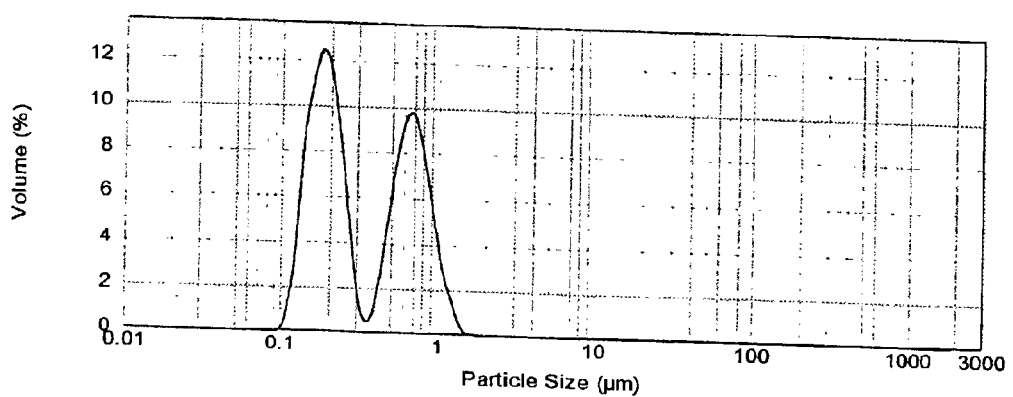
Figure 24:
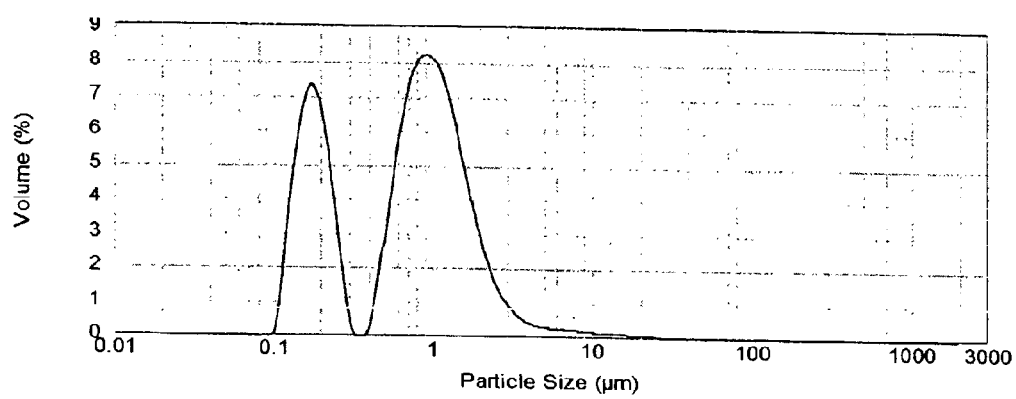
Figure 25:
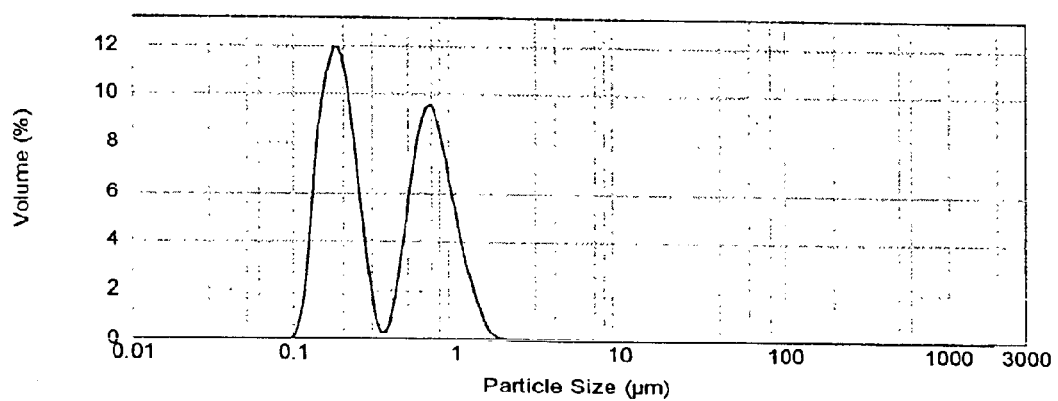
Figure 26:
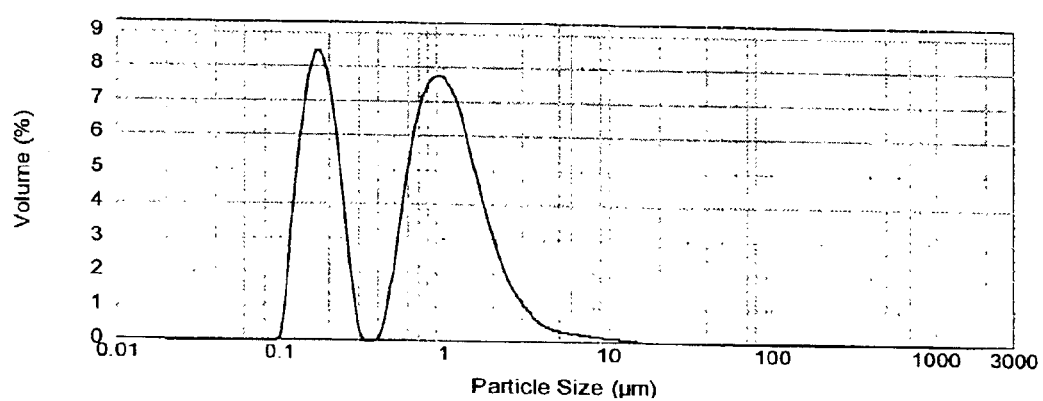
Figure 27:
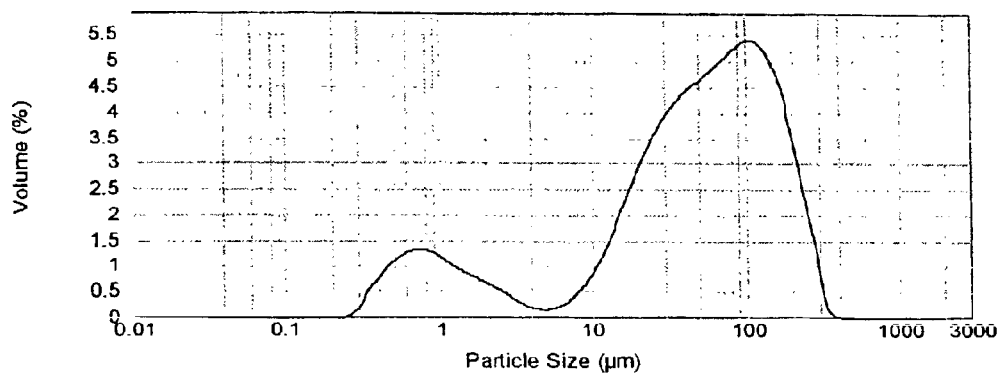
Figure 28:
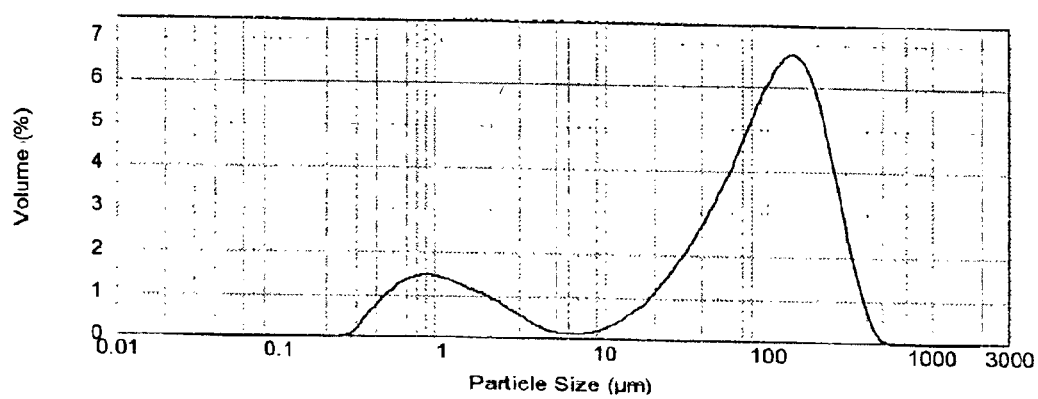
Figure 29:
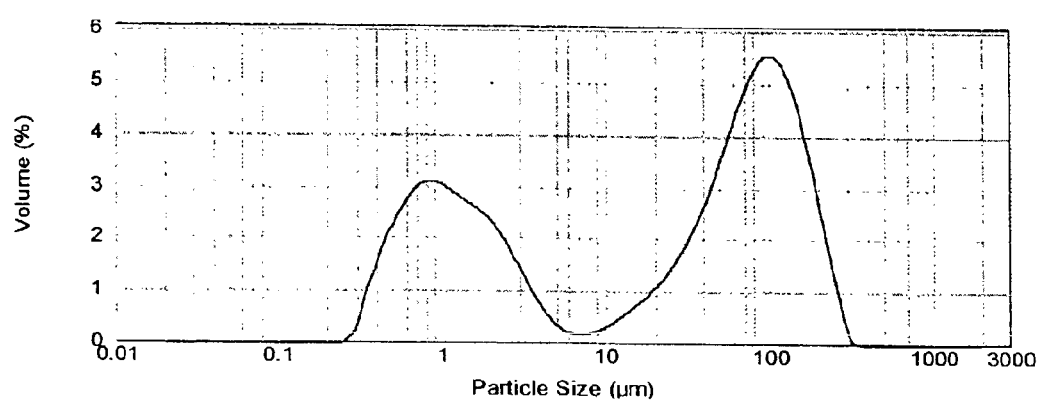

FIGS. 12A and 12B are Malvern results for pure powder submicron PTFE, wherein pure powder submicron PTFE was mixed with IPA and sonicated for two minutes and where IPA was used as a dispersant in the Malvern particle size analyzer; FIG. 12B represents cumulative data; results indicate that the mean particle size value was 0.317 $\mu$m and that 97.89% of the PTFE particles were below 1.00 $\mu$m in particle size;

FIGS. 13A and 13B are Malvern results for 80% PTFE/20% organoclay, wherein the PTFE/organoclay powder was mixed with IPA and sonicated for two minutes and where IPA was used as a dispersant in the Malvern particle size analyzer; FIG. 13B represents cumulative data; results indicate that the mean particle size value was 1.642 $\mu$m and that 72.74% of the particles were below 1.00 $\mu$m in particle size;

FIGS. 14A and 14B are Malvern results for submicron PTFE in IPA, wherein the dispersion was diluted with IPA and sonicated for two minutes and where IPA was used as a dispersant in the Malvern particle size analyzer; FIG. 14B represents cumulative data; results indicate that the mean particle size value was 0.197 $\mu$m and that 100% of the particles were below 1.00 $\mu$m in particle size;

FIGS. 15A and 15B are Malvern results for submicron PTFE in IPA/Quat, wherein the dispersion was diluted with IPA and sonicated for two minutes and where IPA was used as a dispersant in the Malvern particle size analyzer; FIG. 15B represents cumulative data; results indicate that the mean particle size value was 0.198 $\mu$m and that 100% of the particles were below 1.00 $\mu$m in particle size;

FIG. 16 is a Malvern particle size distribution graph for PTFE in its reactor latex form, where IPA was used as a dispersant in the Malvern particle size analyzer;

FIG. 17 is a Malvern particle size distribution graph for reactor latex PTFE combined with bentonite clay slurry, where water was used as a dispersant in the Malvern particle size analyzer;

FIG. 18 is a Malvern particle size distribution graph for reactor latex PTFE combined with warm dissolved Quat, where water was used as a dispersant in the Malvern particle size analyzer;

FIG. 19 is a Malvern particle size distribution graph for 50/50 organoclay/reactor latex PTFE having a clay/Quat ratio of 1:0.6, where mineral oil was used as a dispersant in the Malvern particle size analyzer;

FIG. 20 is a Malvern particle size distribution graph for 50/50 organoclay/reactor latex PTFE having a clay/Quat ratio of 1:0.8, where mineral oil was used as a dispersant in the Malvern particle size analyzer;

FIG. 21 is a Malvern particle size distribution graph for 50/50 organoclay/reactor latex PTFE having a clay/Quat ratio of 1:1.0, where mineral oil was used as a dispersant in the Malvern particle size analyzer;

FIG. 22 is a Malvern particle size distribution graph for 50/50 organoclay/reactor latex PTFE having a clay/Quat ratio of 1:1.2, where mineral oil was used as a dispersant in the Malvern particle size analyzer;

FIG. 23 is a Malvern particle size distribution graph for 50/50 organoclay/reactor latex PTFE having a clay/Quat ratio of 1:1.4, where mineral oil was used as a dispersant in the Malvern particle size analyzer;

FIG. 24 is a Malvern particle size distribution graph for 75/25 organoclay/reactor latex PTFE, where IPA was used as a dispersant in the Malvern particle size analyzer;

FIG. 25 is a Malvern particle size distribution graph for 50/50 organoclay/reactor latex PTFE, where IPA was used as a dispersant in the Malvern particle size analyzer, FIG. 26 is a Malvern particle size distribution graph for 25/75 organoclay/reactor latex PTFE, where IPA was used as a dispersant in the Malvern particle size analyzer;

FIG. 27 is a Malvern particle size distribution graph for 50/50 organoclay/reactor latex PTFE that was irradiated at 7 megarads, where mineral oil was used as a dispersant in the Malvern particle size analyzer;

FIG. 28 is a Malvern particle size distribution graph for 50/50 organoclay/reactor latex PTFE that was irradiated at 14 megarads, where mineral oil was used as a dispersant in the Malvern particle size analyzer; and FIG. 29 is a Malvern particle size distribution graph for 50/50 organoclay/reactor latex PTFE that was irradiated at 28 megarads, where mineral oil was used as a dispersant in the Malvern particle size analyzer.

DETAILED DESCRIPTION OF THE INVENTION

It has been surprisingly found that dispersion of particles of a self-associating material in a target medium can be significantly improved if the particles are occluded in a physical entrapment medium, wherein the physical entrapment medium is dispersible, or can be made to be dispersible, in the target medium. The compositions of the present invention, therefore, are able to overcome the need for special compatabilizing agents, which rely solely on chemical interactions to prevent agglomeration in the target medium. The terms "disperse," "dispersible" or "dispersion," as used herein, mean that a referenced component is finely divided or scattered within a medium. Preferably, the dispersed component does not phase separate into its own pure phase for at least about 1 hour, more preferably for at least about one day, and most preferably for at least about one week after mixing the dispersible component in a target medium. Furthermore, when phase separation or settling of the dispersed component does occur, the sediment is "soft," which means that the sediment may readily be re-dispersed by gentle agitation, e.g., shaking by hand.

Preferably, the compositions of the present invention have substantially less than the typically effective amount of compatabilizing agents for the characteristic use particles in the target medium. The phrase "substantially less than the typically effective amount," as used herein, means that less than about 70%, preferably less than about 60%, and more preferably less than about 50% by weight of the referenced material is present in the composition in comparison to the amount typically used. The term "about," as used herein, means ±10% of the stated value. For example, if the characteristic use material was Dupont PTFE 30, a suspension of PTFE in water with surfactant, the surfactant can also be included when Dupont PTFE 30 is occluded into a physical entrapment phase. The amount of surfactant present in Dupont PTFE 30, however, would be substantially less than the typically effective amount of surfactant sufficient to disperse PTFE in a target medium. Furthermore, compatabilizing agents, which do not disperse the characteristic use particles in the target medium, can be present for any other component in the compositions of the present invention, e.g., a compatibilizing agent for dispersing the physical entrapment phase in the target medium. For example, such compatabilizing agents can be added during the manufacturing process of the characteristic use particle or the physical entrapment phase, or can be used to fine tune the performance of the inventive composition in the target medium.

The compositions of the present invention include characteristic use particles and a physical entrapment phase that physically entraps the characteristic use particles, thereby physically preventing the agglomeration or self-association of the characteristic use particles. The physical entrapment phase is preferably dispersible in the target medium via normal mixing methods known in the art. The compositions of the present invention include from about 1.0% to about 99.0% by weight, preferably from about 2.5% to about 50% by weight, and more preferably from about 5% to about 25% by weight of a physical entrapment phase; and include from about 99% to about 1.0% by weight, preferably from about 92.5% to about 50% by weight, and more preferably from about 95% to about 75% by weight of a characteristic use particle.

Because of the higher particle count for smaller characteristic use particles (those having a particle size of less than 2 $\mu$m), the compositions of the present invention also include from about 1% to 99%, more preferably from about 5% to about 75%, and most preferably from about 10% to 60% by weight of the physical entrapment phase; and include from about 99% to 1%, more preferably from about 95% to 25%, and most preferably from about 90% to 40% by weight of the characteristic use particle.

These weight percentages do not include any compatabilizing agents or other ingredients, such as pigments, fillers, resins, etc., that may be present in the composition of the present invention. Typically, the compositions of the present invention are dispersible in the target medium at a concentration of less than about 50%, preferably less than about 20%, and more preferably less than about 5.0% by weight of the target medium plus the instant composition.

The present invention is also directed to a target medium having dispersed therein a physical entrapment phase and one or more types of characteristic use particles. Target medium, as used herein, means any desired liquid or solid medium into which the characteristic use particles can be dispersed. As will be discussed in further detail below, the dispersibility of the physical entrapment phase in the target medium can be readily controlled. Thus, the physical entrapment phase can be tailored to be dispersible in virtually any given hydrophobic or hydrophillic target medium. Hereinafter, hydrophobic can be referenced as "HB" and hydrophillic can be referenced as "HP."

Nonlimiting examples of suitable hydrophobic target media (e.g., target media having less than 1 gram solubility in 100 grams of water at room temperature) include: hydrocarbon-based compositions, such as motor oil, grease and mineral oil; solvents, such as aromatic solvents including toluene and benzene; unsaturated hydrocarbons, such as cyclohexane and pentachloroethylene; formamides; acetones of $C_6$ or higher carbon content; alcohols having carbon chain lengths of $C_5$ or higher; resins; binders; fillers; film formers; coatings, such as paints, lacquers and clean coats; inks, such as flexogravure and heat set inks; plastics and polymers, such as nylon, polystyrene, polyethylene, polypropylene, polyurethane, terephthalate, polyvinyl chloride, polyglycols, and copolymers and terpolymers having any combination of the monomers thereof; chloro-, fluoro- and nitro- solvents; and mixtures thereof.

Nonlimiting examples of hydrophillic target media (e.g., target media having greater than or equal to 1 gram solubility in 100 grams of water) include: water of neutral, acidic, or basic pH; linear and branched $C_1$ to $C_4$ alcohols; $C_1$ to $C_4$ glycols; organic acids and their alkali metal salts dissolved in water, such as acetic acid, formic acid, propionic acid, and butyric acid; ionic fluids containing water and water-soluble electrolytes; $C_1$ to $C_3$ amines; low molecular weight organic sulfonic acids (both aromatic and aliphatic) and their salts; and mixtures thereof.

Characteristic use particles are made of a material that confers a desired benefit to a target medium. Typically, these particles have an average diameter of less than about 15 $\mu$m (microns), preferably less than about 10 $\mu$m (microns), and more preferably less than about 5 $\mu$m (microns). Many characteristic use particles have a tendency to agglomerate or self-associate. Accordingly, when dispersed in a target medium, characteristic use particles, having a particle size of 2 $\mu$m or more, in the compositions of the present invention (e.g., compositions incorporating the characteristic use particle with a physical entrapment phase) have a Hegman grind gauge improvement of greater than or equal to about 1 unit, preferably greater than or equal to about 1.5 units, more preferably greater than or equal to about 2.0 units, and most preferably greater than or equal to about 2.5 units in comparison to the Hegman grind gauge value of a dispersion of the characteristic use particles in the target medium (e.g., without a physical entrapment phase). Further details regarding the Hegman grind gauge improvement are provided below. For compositions comprising characteristic use particles having a particle size of less than 2 microns, the Malvern method may be used to quantitate an increase in the dispersibility of the composition in the target medium of 10% or more, preferably 25% or more, or most preferably 50% in comparison to the dispersibility of the composition in the target medium without the physical entrapment phase.

Suitable characteristic use particles include, but are not limited to, polymers having one or more monomers, resins, binders, metal oxides, pigments, extenders, dyes, film forming agents, anticorrosive agents, matting/flattening agents, rheological modifiers, biocides, inorganic fillers, and flow modifiers. Further nonlimiting examples of suitable characteristic use particles include, polytetrafluoroethylene (PTFE), polyethylene (PE), polypropylene (PPE), polyethylene terephthalate (PET), polystyrene, polycarbonate, polymethyl methacrylates, polybutadiene, titanium dioxide ($TiO_2$), magnesium oxide (MgO), zinc oxide (ZnO), ferrous oxide (FeO), ferric oxide ($Fe_2O_3$), calcium carbonate ($CaCO_3$), lead chromate ($PbCrO_4$), barium sulfate ($BaSO_4$), molybdate orange, hansa yellow, phthalocyanine blue, phthalocyanine green, carbazole violet, carbon black, rubinine red, talc, china clay, mica, feldspar, and waxes. Preferred characteristic use particles include PTFE, PE, PPE, $TiO_2$, carbon black, and $CaCO_3$.

Another specific example of a characteristic use particle that is preferred in certain embodiments of the present invention is PTFE in its reactor latex form. As used herein, the phrase "PTFE in its reactor latex form" describes a suspension, in water, of PTFE particles in their primary particle size, that results from the synthesis of PTFE via an emulsion polymerization process. The primary particle size of PTFE particles in samples of PTFE reactor latex is typically from about 0.1 μm to about 0.5 μm. The term "latex" is commonly used in the art to describe a water emulsion of a synthetic rubber or plastic obtained by polymerization or a dispersion of polymerization products of rubber-like substances.

In embodiments where PTFE in its reactor latex form is used as the characteristic use particle, the reactor latex form of PTFE typically comprises from about 10% to about 40% by weight solid PTFE, with preferred reactor latex PTFE samples comprising about 25% by weight solid PTFE. PTFE in its reactor latex form is well known in the art to be unstable and often spontaneously collapses or agglomerates with mild agitation, vibration or the like. Once PTFE in its reactor latex form has collapsed, it is not readily dispersible. Thus, using PTFE in its reactor latex form as a characteristic use particle in the present invention provides increased dispersibility in a target medium to the solid PTFE particles via their being entrapped in a physical entrapment phase.

Furthermore, in embodiments where PTFE in its reactor latex form is used as the characteristic use particle, the resulting compositions (comprising reactor latex PTFE physically entrapped by a physical entrapment phase, such as an organoclay) may be recovered, dried, and irradiated using electron beam irradiation and then dispersed in a target medium. The irradiation may further enhance the dispersibility of the resulting reactor latex PTFE/organoclay compositions in various target media. Typically in embodiments where the reactor latex PTFE/organoclay compositions are irradiated, the intensity of the irradiation ranges from about 5 to about 50 megarads, preferably from about 10 to about 40 megarads, and most preferably from about 20 to about 30 megarads.

The compositions of the present invention also include a physical entrapment phase, which prevents the agglomeration or self-association of the characteristic use particles via a physical mechanism. Although the physical entrapment phase preferably comprises particles that are readily dispersible in the target medium, the physical entrapment phase can also be a continuous phase that is readily dispersible in the target medium, such as a coascervate or gel. Without wanting to be limited by any one theory, it is believed that the physical entrapment particles are of a sufficient numerical advantage to block or otherwise physically prevent agglomeration or self-association of the characteristic use particles. Accordingly, it is preferred to have a number ratio of physical entrapment particles to characteristic use particles of greater than about 10:1, more preferably greater than about greater than about 25:1, and most preferably greater than about 100:1.

Typically, the physical entrapment phase is obtained by mixing, by any known means or mechanism, a precursor of the physical entrapment phase with the characteristic use particle in a process medium in which the precursor is dispersible or soluble. The mode of incorporation can be mechanical in nature, such as stirring, and also can be any form or method of separating flocculates, agglomerates, or clumps of the particles known to those skilled in the art of disperse systems. Nonlimiting examples include utilizing sonic energy, cavitation, thermal energy, mechanical mixing, compatabilizing agents (e.g., surfactants) for the precursor and the process medium, and solubilization (e.g., sugar or salts in water). Note that the mode of dispersion can include the use of one or more compatibilizing agents, such as surfactants, which function through chemical interactions between the precursor and the process medium. Such compatibilizing agents are distinguished from the compatibilizing agents that are typically used to disperse the characteristic use particles in the target medium.

Once the precursor is well dispersed or dissolved along with the characteristic use particles in the process medium, a triggering mechanism is employed. The triggering mechanism converts the precursor into the physical entrapment phase, so that the physical entrapment phase is no longer dispersible or soluble in the process medium. Without wanting to be limited by any one theory, it is believed that the dispersibility of the precursor is caused to change quickly enough to entrap the characteristic use particles, which were mixed with the precursor in the process medium. The resulting composition (or "composite"), which contains a mixture of the physical entrapment phase and the characteristic use particles, is then separated by any known method, such as filtration, centrifugation, evaporation, etc. The recovered composite is then available for additional processing, such as (i) drying by any known means to remove all or part of the process medium, and (ii) grinding or milling into a powder. Although the recovered composition can contain some of the processing medium, e.g., water, it is preferred to obtain compositions that are substantially free of the process medium, i.e., compositions having less than about 10%, preferably less than about 5%, and most preferably less than about 2.5% of the processing medium by weight of the recovered composition. Since the physical entrapment phase in the recovered composition is readily dispersible, or can be made readily dispersible in a target medium, it is believed that the characteristic use particles are also dispersed along with the physical entrapment phase in the target medium.

The physical entrapment phase can be formed by any known triggering mechanism to change the dispersibility of the precursor in the process medium, as long as the mechanism provides the following:

1. dispersibility of the precursor in the process medium;

2. a change in dispersibility of the precursor in the process medium, which change in dispersibility can be triggered on demand;

3. the resulting physical entrapment phase physically entraps the characteristic use particles; and 4. the triggered physical entrapment phase can be dispersed, or can be made to be disposed, into a target medium. The triggering mechanism can include changing the reaction conditions (e.g., changing the temperature, pressure, volume, concentration of the precursor, pH, and any combination of thereof), subjecting the dispersed precursor to external stimuli, removing an external stimuli, adding a triggering agent to react with the precursor, and any combination thereof.

Examples of useful precursors include, but are not limited to, smectite-type clays (e.g., montmorillonite, bentonite, beidellite, hectorite, saponite, and stevensite) or organic cations, silicates, organic acids, colloidal salts, one reactant species used to form hydrous oxides that is soluble in the process medium (e.g., soluble metal salts), thixotropic agents, and pectin gels, such as Jello. Examples of useful triggering agents include, but are not limited to, organic cations for smectite-type clays or smectite-type clays for organic cations to obtain organoclays; the other reactant of a hydrous oxide to obtain a hydrous oxide by hydrolysis or precipitation with alkali, alkali for water soluble silicates to obtain $SiO_2$ by precipitation; metal salts for organic acids to obtain organic salts by precipitation; acid or base for acrylic polymers to obtain acrylic polymers by changing pH. Preferred physical entrapment phases obtained by reacting a triggering agent with a precursor include organoclay and hydrous oxide.

Nonlimiting examples of triggering mechanisms include application of or change in light, acoustics, temperature, pressure, volume of solvent, salt concentration, pH, electrolytic concentration, electromagnetic waves (e.g., microwaves, UV waves, and visible light waves), hydrophillicity (e.g., HP to HB), hydrophobicity (e.g., HB to HP), solubility (e.g., to cause precipitation), electricity, and combinations thereof.

As discussed previously, the recovered composite can be further processed, e.g., dried and ground. In one embodiment of the present invention, the recovered composite (e.g., when containing hydrous metal oxides) can be further processed by reacting it with dilute acids or electrolytes to provide peptization, i.e., the formation of a colloidal solution or dispersion. Dilute acid, as used in this particular embodiment, means acid having a concentration of less than about 1N. Examples of suitable dilute acids include, but are not limited to: inorganic acids, such as sulfuric acid ($H_2SO_4$), hydrochloric acid (HCl), perchloric acid ($HClO_4$), and phosphoric acid ($H_3PO_4$); and organic acids, such as acetic acid ($CH_3COOH$), formic acid (HCOOH), propionic acid ($CH_3CH_2COOH$), butyric acid ($CH_3CH_2CH_2COOH$), chloroacetic acid ($CH_2ClCOOH$), dichloroacetic acid ($CHCl_2COOH$), and trichloroacetic acid ($CCl_3COOH$); and mixtures thereof.

Figures 1A, 1B:
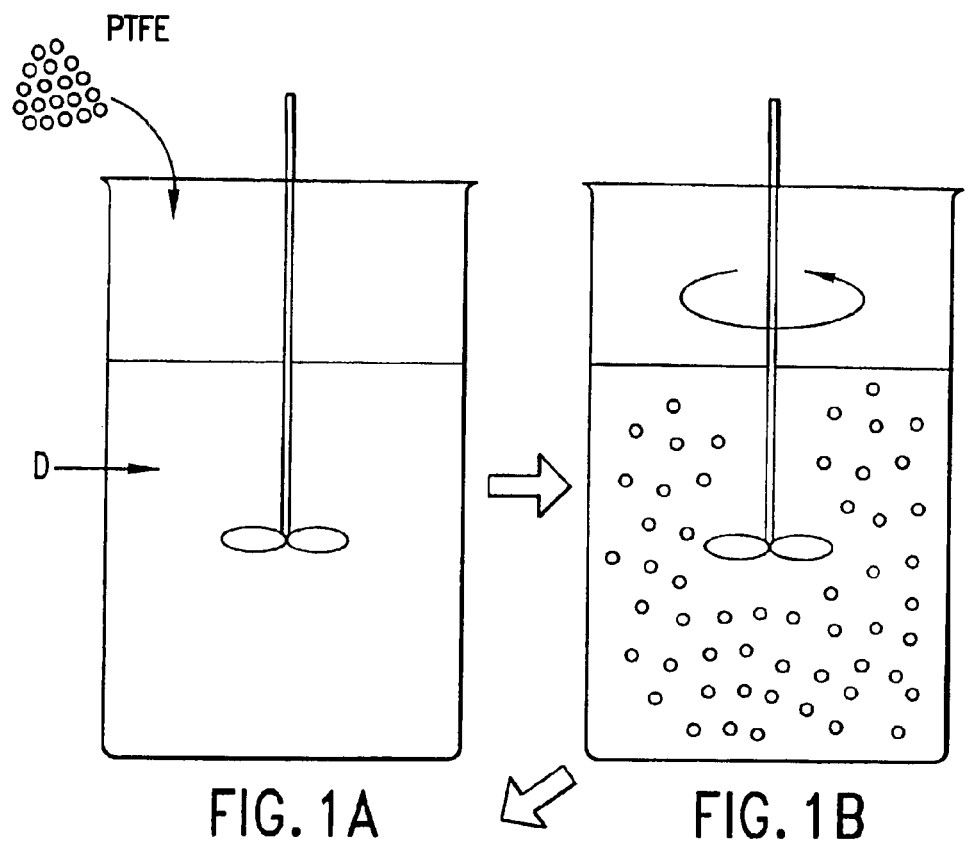
FIGS. 1A to 1C are illustrations of the phases obtained by mixing characteristic use particles with a precursor in a process medium.
Figure 1C:
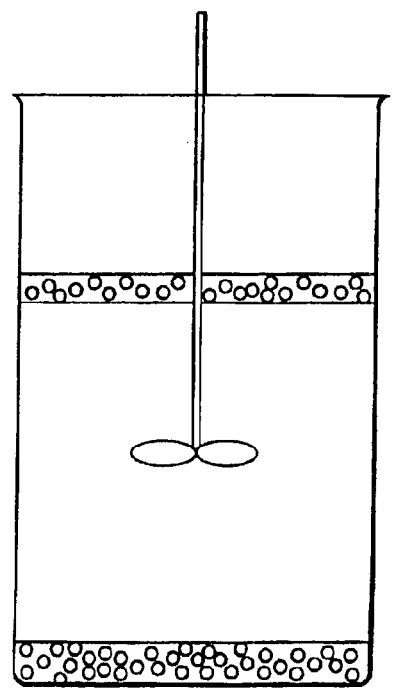
Figures 2A, 2B:
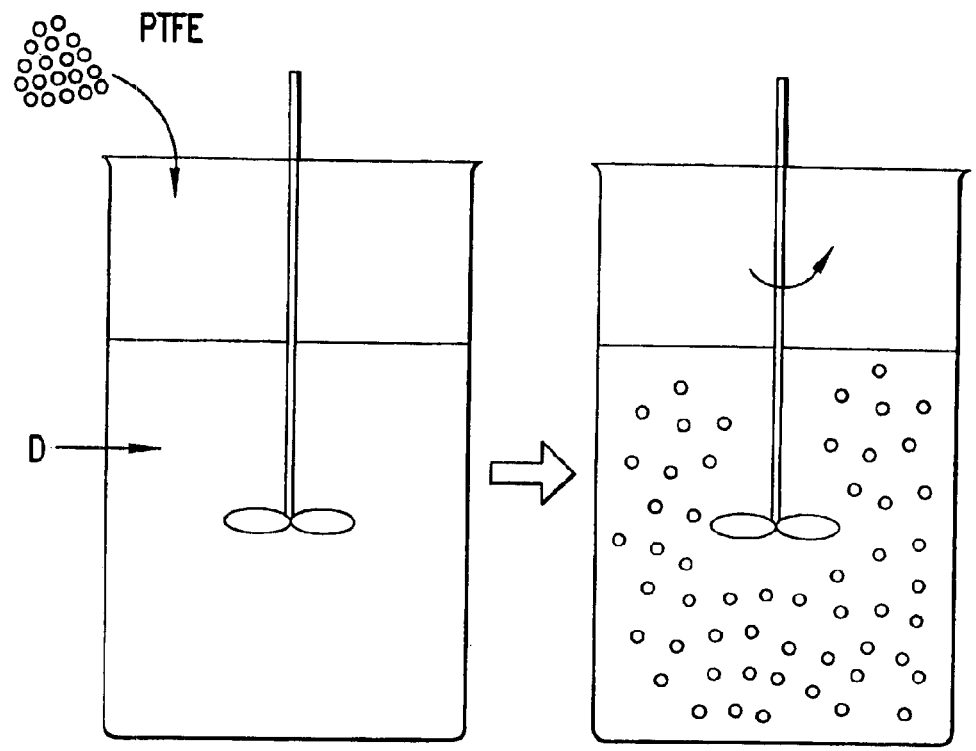
FIGS. 2A to 2F are illustrations of the phases obtained when a triggering agent is added to process medium including characteristic use particles and a precursor.
Figures 2C, 2D:
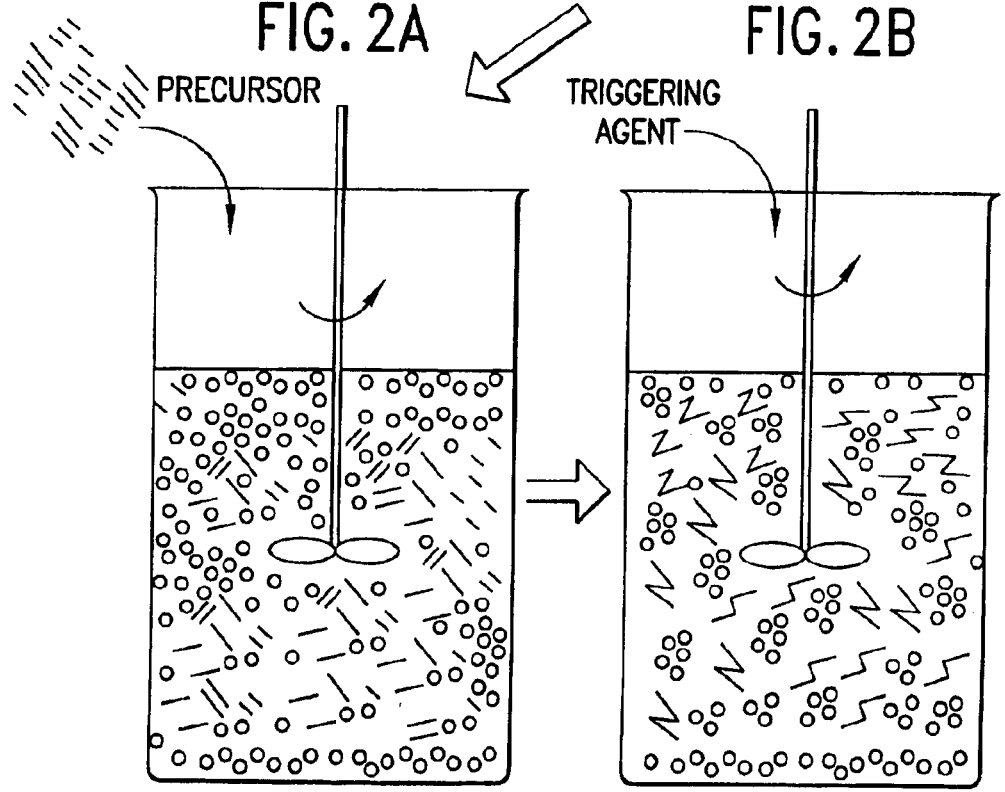
Figure 2E:
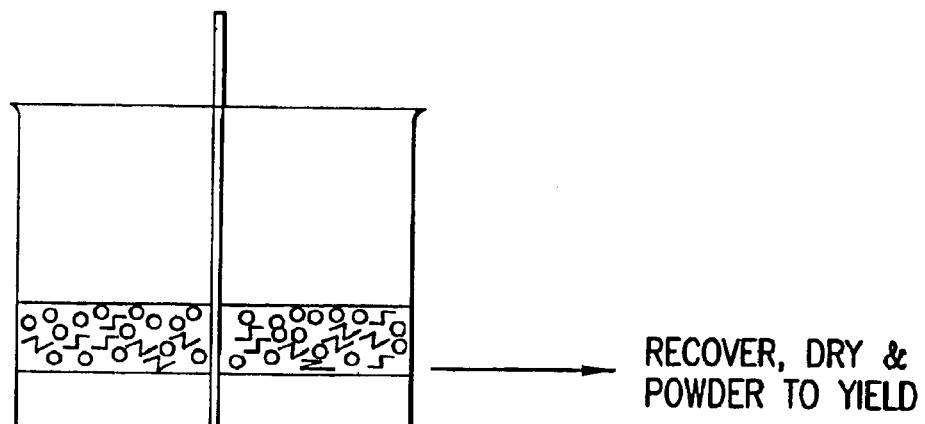
Figure 2F:
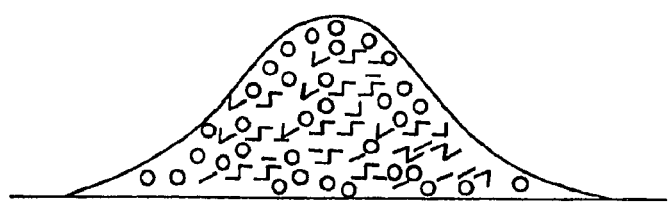

Without the benefit of a physical entrapment phase, as shown in FIGS. 1A to 1C, the characteristic use particle, e.g., white virgin PTFE powder, will agglomerate when mixed in the process medium, e.g., water. While mechanical energy or agitation is applied to overcome the high self-association energy of the PTFE, a highly hydrophillic fine particle size material, such as bentonite clay, can be added as the precursor so that the precursor and the PTFE are well dispersed in the process medium in a high state of division. As a result, individual PTFE particles are separated during agitation and are surrounded by many individual hydrophillic clay particles. At this point, if agitation is discontinued, the PTFE particles will phase separate due to their high tendency to self-associate, while the hydrophillic clay particles remain dispersed in the water.

In contrast, in one embodiment of the present invention, as illustrated in FIGS. 2A to 2F, agitation is continued and a triggering agent (e.g., an organic cation) is added to the well-dispersed mixture of the precursor, such as clay, and the PTFE particles in the process medium. The triggering agent reacts with or causes the precursor to become hydrophobic (e.g., by ion exchange to form an organoclay), thus forming a hydrophobic physical entrapment phase. As a consequence, the highly dispersed, formerly hydrophillic precursor now agglomerates and physically traps the PTFE in the agglomeration process.

The order of addition can be varied to some extent as long as the HB characteristic use particle and the HP precursor are both dispersed before triggering the HP to HB switch of the precursor. For example, the precursor can be either the organic cation or the smectite-type clay. Thus, the HP precursor can be added to water or another processing medium with agitation followed by the HB PTFE. Upon obtaining a good dispersion by agitation or other methods, the triggering agent can be added to change the HP precursor to the HB physical entrapment phase. For example, the triggering agent can be a smectite-type clay for an organic cation precursor, or the triggering agent can be an organic cation for a smectite-type clay precursor. After the HP to HB transition occurs, the resulting coagulate can be recovered, dried and powdered. The PTFE is entrapped within the physical entrapment phase to form a composite composition that can be incorporated and dispersed into a target medium.

The physical entrapment phase is selected so that its chemical characteristics are highly compatible with a target medium into which it can be incorporated. Upon addition to the target medium, the physical entrapment phase can readily disperse to provide a system having large numbers of well dispersed particles. Without wanting to be limited by any one theory, it is believed that individual particles of PTFE are unable to agglomerate because each particle is surrounded by many physical entrapment particles that block reagglomeration. This mechanism of PTFE dispersion is achieved physically, and there is little or no need for chemical compatibilizers, which modify the surface properties of the PTFE particles.

This technology can even be incorporated into the synthesis processes for many characteristic use particles. For example, PTFE is usually synthesized in water, collected, and then dried. In accordance with the present invention, a hydrophillic precursor can be added to the aqueous system being used to form the PTFE at any step of the synthetic process. The hydrophillic precursor can, therefore, be present during the formation of the PTFE or added when the synthesis is completed. For example, a hydrophillic precursor such as a bentonite clay may be added to PTFE in its reactor latex form following an emulsion polymerization process of synthesizing PTFE. After synthesis of the PTFE is complete, the triggering mechanism (such as an organic cation) can be added and/or activated to convert the hydrophillic precursor into a physical entrapment phase. The resulting coagulate can then be collected and dried. This would result in a physically entrapped PTFE composite composition that is ready for use. Similarly, this would result in a physically entrapped PTFE composite composition that may be irradiated by electron beam irradiation and then used in the desired system or target medium.

This newly discovered process and compositions obtained therefrom are not restricted to PTFE but can be applied to any characteristic use material that is not easily dispersible in the desired target medium. Nonlimiting examples of suitable materials that can be used for the characteristic use material have been provided above. For example, paraffin wax particles are difficult to disperse in many systems of application, because paraffin wax particles are chemically incompatible with many chemicals. Once dispersed, they have a tendency to reagglomerate without the use of special chemical compatibilizing agents. The present invention avoids such dispersion and agglomeration difficulties.

In one embodiment, smectite-type clays and in particular bentonite clay can be selected as the HP precursor. Bentonite clay is highly dispersible in water and results in numerous particles with an extremely high surface area. On average, one can approximate a bentonite clay particle in water as having the dimensions of 0.1 μm in length, 0.1 μm in width, and 10 Å in thickness. This clay also is well known to contain exchangeable cations on its surface, which can be used to trigger the HP to HB transition. When dispersed in water, the surface exchangeable cations, such as $Na^+$, $Ca^{2+}$ and $Mg^{2+}$, can be exchanged with organic cations, such as quaternary ammonium chlorides ("quats"), to form the well known organoclays. The formation and use of organoclays are described in U.S. Pat. No. 5,759,938 issued Jun. 2, 1998 to Cody et al.; U.S. Pat. No. 5,735,943 issued Apr. 7, 1998 to Cody et al.; U.S. Pat. No. 5,725,805 issued Mar. 10, 1998 to Kemnetz et al.; U.S. Pat. No. 5,696,292 issued Dec. 9, 1997 to Cody et al.; U.S. Pat. No. 5,667,694 issued Sep. 16, 1997 to Cody et al.; U.S. Pat. No. and 5,634,969 issued Jun. 3, 1997 to Cody et al.; and U.S. Pat. No. 4,664,820 issued May 12, 1987 to Magauran et al.; which are all incorporated herein by reference in their entirety.

Also described in the above-referenced patents are additives which can be employed to assist in organoclay dispersion. Examples of suitable additives include, but are not limited to, polar activators, such as acetone; preactivators, such as 1,6 hexane diol; intercalates, such as organic anions; and mixtures thereof. Such additives are also described in U.S. Pat. No. 5,075,033 issued Dec. 24, 1991 to Cody et al.; U.S. Pat. No. 4,894,182 issued Jan. 16, 1990 to Cody et al.; and U.S. Pat. No. 4,742,098 issued May 3, 1988 to Finlayson et al.; which are all incorporated herein by reference in their entirety.

Organoclays may be prepared by reacting a certain type of clay with an organic cation. Any clay, which can be reacted with one or more organic cations to provide a HP to HB change, can be used in the compositions of the present invention. Preferable clays are smectite-type clays having a cationic exchange capacity of at least about 50 milliequivalents per 100 grams of clay as determined by the well known ammonium acetate method or the well known methylene blue method. The smectite-type clays are well known in the art and are available from a variety of sources. The clays can also be converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before reaction with the organic cation.

Smectite-type clays prepared synthetically by either a pneumatolytic or, preferably, a hydrothermal synthesis process can also be used to prepare these novel organic clay complexes. Representative of smectite-type clays useful in the present invention include, but are not limited to, the following:

Montmorillonite having the general formula $$[(Al_{4-x}Mg_x)Si_8O_{20}(OH)_{4-f}F_f]_xR^+$$

where $0.55 \leq x \leq 1.10$, $f \leq 4$ and R is selected from the group consisting of Na, Li, $NH_4$, and mixtures thereof;

Bentonite having the general formula

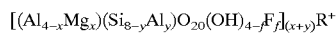

where $0 < x < 1.10$, $0 < y < 1.10$, $0.55 \leq (x+y) \leq 1.10$, $f \leq 4$ and R is selected from the group consisting of Na, Li, $NH_4$ and mixtures thereof;

Beidellite having the general formula

where $0.55 \leq x \leq 1.10$, $0 \leq y \leq 0.44$, $f \leq 4$ and R is selected from the group consisting of Na, Li, $NH_4$ and mixtures thereof;

Hectorite having the general formula

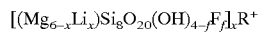

where $0.57 \leq x \leq 1.15$, $f \leq 4$ and R is selected from the group consisting of Na, Li, $NH_4$, and mixtures thereof;

Saponite having the general formula

where $0.58 \leq x \leq 1.18$, $0 \leq y \leq 0.66$, $f \leq 4$ and R is selected from the group consisting of Na, Li, $NH_4$, and mixtures thereof; and Stevensite having the general formula

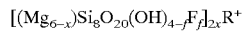

where $0.28 \leq x \leq 0.57$, $f = 4$ and R is selected from the group consisting of Na, Li, $NH_4$, and mixtures thereof.

The preferred clays used in the present invention are bentonite and hectorite, with bentonite being the most preferred. The clays may be synthesized hydrothermally by forming an aqueous reaction mixture in the form of a slurry containing mixed hydrous oxides or hydroxides of the desired metals with or without, as the case may be, sodium (or alternate exchangeable cation or mixture thereof) fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending on the particular smectite-type clay being synthesized, and the optimum time can readily be determined by pilot trials.

Representative hydrothermal processes for preparing synthetic smectite-type clays are described in U.S. Pat. Nos. 3,252,757, 3,586,478, 3,666,407, 3,671,190, 3,844,978, 3,844,979, 3,852,405 and 3,855,147, all of which are herein incorporated by reference.

The organic cation which is reacted with the smectite-type clay must have a positive charge localized on a single atom or on a small group of atoms within the compound. The organic cation is preferably an ammonium cation which contains at least one linear or branched, saturated or unsaturated alkyl group having 12 to 22 carbon atoms. The remaining groups of the cation are chosen from (a) linear or branched alkyl groups having 1 to 22 carbon atoms; (b) aralkyl groups which are benzyl and substituted benzyl moieties including fused ring moieties having linear or branched 1 to 22 carbon atoms in the alkyl portion of the structure; (c) aryl groups such as phenyl and substituted phenyl including fused ring aromatic substituents; (d) beta, gamma-unsaturated groups having six or less carbon atoms or hydroxyalkyl groups having two to six carbon atoms; and (e) hydrogen.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl and 12-ethylstearyl. Representative examples of useful branched, unsaturated radicals include 12-methyloleyl and 12-ethyloleyl. Representative examples of unbranched saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of aralkyl, that is benzyl and substituted benzyl moieties, would include those materials derived from, e.g., benzyl halides, benzhydryl halides, trityl halides, α-halo-α-phenylalkanes wherein the alkyl chain has from 1 to 22 carbon atoms, such as 1-halo-1-phenylethane, 1-halo-1-phenyl propane, and 1-halo-1-phenyloctadecane; substituted benzyl moieties, such as would be derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophile replaces the leaving group on the benzyl type moiety.

Examples of aryl groups would include phenyl such as in N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

The β,γ-unsaturated alkyl group may be selected from a wide range of materials. These compounds may be cyclic or acyclic, unsubstituted or substituted with aliphatic radicals containing up to 3 carbon atoms such that the total number of aliphatic carbons in the β,γ-unsaturated radical is 6 or less. The β,γ-unsaturated alkyl radical may be substituted with an aromatic ring that likewise is conjugated with the unsaturation of the β,γ-moiety or the α,γ-radical is substituted with both aliphatic radicals and aromatic rings.

Representative examples of cyclic β,γ-unsaturated alkyl groups include 2-cyclohexenyl and 2-cyclopentenyl. Representative examples of acyclic β,γ-unsaturated alkyl groups containing 6 or less carbon atoms include propargyl; allyl (2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2-propenyl); 2-phenyl-2-propenyl; and 3-(4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. The alkyl group may be substituted with an aromatic ring independently from the 2 to 6 aliphatic carbons. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The organic cation can thus be considered as having at least one of the following formulae:

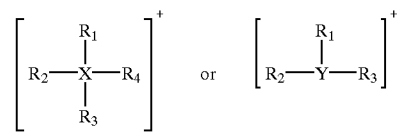

wherein X is nitrogen or phosphorus, Y is sulfur, $R_1$ is the long chain alkyl group, and $R_2$, $R_3$ and $R_4$ are representative of the other possible groups described above.

A preferred organic cation contains at least one linear or branched, saturated or unsaturated alkyl group having 12 to 22 carbon atoms and at least one linear or branched, saturated or unsaturated alkyl group having 1 to 12 carbon atoms. The preferred organic cation may also contain at least one aralkyl group having a linear or branched, saturated or unsaturated alkyl group having 1 to 12 carbons in the alkyl portion. Mixtures of these cations may also be used.

Especially preferred organic cations include ammonium cations where $R_1$ and $R_2$ are hydrogenated tallow and $R_3$ and $R_4$ are methyl or where $R_1$ is hydrogenated tallow, $R_2$ is benzyl and $R_3$ and $R_4$ are methyl or a mixture thereof such as 90% (equivalents) of the former and 10% (equivalents) of the latter.

The amount of organic cation reacted with the smectite-type clay depends upon the specific clay and the desired degree of hydrophobicity. Typically, the amount of cation ranges from about 90 to about 150%, preferably from about 100 to about 130% and most preferably from about 100 to about 116% of the cation exchange capacity of the clay. Thus, for example, when bentonite is used, the amount of cation reacted with the clay will range from about 85 to about 143 milliequivalents, preferably from about 95 to about 124 milliequivalents and most preferably from about 95 to about 110 milliequivalents per 100 grams of clay, 100% active basis. As is apparent to those of ordinary skill in the art, the cation exchange capacity of the clay is on the basis of the original clay and is determined by the ammonium acetate method or the methylene blue method. As is also apparent to those of ordinary skill in the art, other methods to obtain the cation exchange capacity include testing various ratios of organic cation to clay and identifying the ratio that provides the desired characteristics, e.g., a maximum amount of organoclay dispersion in a selected target medium or a desired degree of hydrophobicity.

The anion, which will normally accompany the organic cation, is typically one which will not adversely affect the reaction product or the recovery of the same. Such anions may include, but are not limited to, chloride, bromide, iodide, hydroxyl, nitrite and acetate in amounts sufficient to neutralize the organic cation.

The preparation of the organic cationic salt (i.e., the organic cation paired with the anion) can be achieved by techniques well known in the art. For example, when preparing a quaternary ammonium salt, one skilled in the art would prepare a dialkyl secondary amine, for example, by the hydrogenation of nitrites, see U.S. Pat. No. 2,355,356, and then form the methyl dialkyl tertiary amine by reductive alkylation using formaldehyde as a source of the methyl radical. According to procedures set forth in U.S. Pat. Nos. 3,136,819 and 2,775,617, quaternary amine halide may then be formed by adding benzyl chloride or benzyl bromide to the tertiary amine. The contents of these three patents are hereby incorporated by reference in their entirety.

As is well known in the art, the reaction with benzyl chloride or benzyl bromide can be completed by adding a minor amount of methylene chloride to the reaction mixture so that a blend of products which are predominantly benzyl substituted is obtained. This blend may then be used without further separation of components to prepare the organophilic clay.

Illustrative of the numerous patents which describe organic cationic salts, their manner of preparation and their use in the preparation of organophilic clays are commonly assigned U.S. Pat. Nos. 2,966,506, 4,081,496, 4,105,578, 4,116,866, 4,208,218, 4,391,637, 4,410,364, 4,412,018, 4,434,075, 4,434,076, 4,450,095 and 4,517,112, the contents of which are incorporated by reference.

In a typical organoclay/PTFE composition, virgin PTFE typically would have a density of about 2.2 g/cc. One gram of PTFE occupies a volume of about $4.546 \times 10^{-7}$ m$^3$ ($1 \times 10^{-6}$ m$^3 \div 2.2$). Since a particle of virgin PTFE has an average diameter of about 3 $\mu$m ($3 \times 10^{-6}$ m), the volume occupied by an average PTFE particle is about $1.414 \times 10^{-17}$ m$^3$ (volume= $4/3\pi r^3 = 4/3\pi(1.5 \times 10^{-6}$ m$)^3$). Thus one gram of PTFE contains about $3.22 \times 10^{10}$ particles ($4.546 \times 10^{-7}$ m$^3$/g$\div 1.41372 \times 10^{-17}$ m$^3$/PTFE particle).

Furthermore, in a typical organoclay/PTFE composition, the bentonite clay would have a density of about 5 g/cc, and one gram of bentonite clay occupies a volume of about $2.0 \times 10^{-7}$ m$^3$. Since an average single platelet of bentonite clay has the approximate dimensions of 0.1 $\mu$m$\times$0.1 $\mu$m$\times 10^{-9}$ m, the volume occupied by an average single platelet of bentonite clay is about $1.0 \times 10^{-23}$ m$^3$ (volume= $l \times w \times h=(1.0 \times 10^{-7}$ m$)^2 \times (1.0 \times 10^{-9}$ m$)$). Thus, one gram of bentonite clay contains about $2.0 \times 10^{16}$ particles ($2.0 \times 10^{-7}$ m$^3$/g$\div 1.0 \times 10^{-23}$ m$^3$/single plate).

Thus, for a typical PTFE particle of about 3 $\mu$m in diameter and a density of about 2.2 grams per mL, the number of particles present in 1 gram of PTFE powder will be approximately $3.2 \times 10^{10}$ particles. In comparison, using the dimensions of a bentonite clay platelet given above and assuming a density of about 5 grams per cc, 1 gram of clay will contain approximately $2 \times 10^{16}$ particles. Thus, for a mixture of 1 gram of clay with 1 gram of PTFE particles, there are approximately 625,000 clay particles that can be converted to the HB physical entrapment phase (e.g., as organoclay) per PTFE particle. Accordingly, in a dry coagulate composition (e.g., organoclay and PTFE), each PTFE particle would be physically blocked from self-agglomeration with another PTFE particle as each PTFE particle would be surrounded by approximately 625,000 discrete organoclay particles.

Examination of the surface area relationship between PTFE and the HP precursor (e.g., clay) that is switched to a HB physical entrapment phase (e.g., organoclay) is equally instructive. Many bentonite clays are known to possess a surface area of several hundred meters squared per gram, wherein the large surface area is maintained for well-dispersed organoclay that is obtained from the bentonite clay. In comparison, one gram of PTFE with an average particle diameter of about 3 $\mu$m will have an approximate surface area of 1 meter squared. Therefore, each square meter of PTFE surface area is surrounded by hydrophobic particles having a surface area of several hundred square meters. Thus, the surface of each discreet PTFE particle would be physically blocked from the surface of another PTFE particle by the organoclay particles, thereby preventing self-association or self-agglomeration of the PTFE particles.

Organoclays based on smectite-type clays are the preferred physical entrapment phase, since they are relatively inexpensive and can be readily synthesized in forms that are easily dispersible into numerous hydrophobic target media. Numerous organic cations, such as quaternary ammonium compounds or "quats," are commercially available for the HP to HB conversion of the clay, and these quats have distinct chemical moieties that can be tailored to accommodate the chemical properties of a target medium. For example, tallow-based quats can be employed for hydrocarbon-based systems, whereas quats containing benzyl can be used in target media including aromatic functional groups.

In another embodiment of the present invention, hydrous oxides can be utilized to form a physical entrapment phase that can be dispersed in a hydrophillic target medium. Hydrous oxides can be formed in water by precipitation or hydrolysis of water soluble metal salts, thereby providing a useful mechanism to entrap characteristic use particles. The recovered mixture of hydrous oxide and characteristic use particles ("composition") can then be peptized in water to form a highly dispersed colloidal network surrounding the characteristic use particles. Peptization is the formation of a colloidal dispersion or sol. Colloidal solutions or dispersions are intermediate in character between a true solution and a suspension, wherein the dispersion has particles in the size range of between about 1 $\mu$m and about 100 $\mu$m. The extremely small colloidal particle size provides a high numerical ratio of physical entrapment phase to characteristic use particles. A wide variety of hydrous oxides and the process of peptizing these hydrous oxides are well known in the art, as described in Weiser, *The Colloidal Salts*, (McGraw-Hill Book Co., 1928) and Weiser, *The Hydrous Oxides*, (McGraw-Hill Book Co., 1926), both of which are incorporated herein by reference.

A nonlimiting example of a hydrous oxide is stannic oxide, which is readily formed by the addition of alkali to SnCl$_4$ or SnBr$_4$. Hydrous stannic oxide can then be peptized by dilute mineral acids. Since the target medium is hydrophillic, e.g., water, after the precipitation is triggered the composite can be filtered. While containing water, the composite composition can be added to the target medium and peptized, or the composite composition can be naturally peptized in an acidic target medium. It is not necessary to dry or grind the composition. Other representative examples of hydrous oxides include, but are not limited to, SiO$_2$, TiO$_2$ and Al(OH)$_3$.

When dispersed in a target medium, the compositions of the present invention (e.g., characteristic use particles, having a particle size of 2 $\mu$m or more, entrapped in a physical entrapment phase) have a Hegman grind gauge improvement of greater than or equal to about 1 unit, preferably greater than or equal to about 1.5 units, more preferably greater than or equal to about 2.0 units, and most preferably greater than or equal to about 2.5 units in comparison to the Hegman grind gauge value of a dispersion of the characteristic use particles in the target medium (e.g., without a physical entrapment phase). For the grind gauge values obtained herein, two samples are prepared in the exact same manner (e.g., same materials, apparatus, mixing settings, methods, etc.) except the control sample will include the characteristic use particle alone in the target medium and the test sample will include the characteristic use particles and the physical entrapment phase in the target medium.

The grind gauge test used herein is an adaptation of the Carlstadt Test Method for Fineness of Grind Determination described in ASTM D1316-68, which was approved in 1968 and re-approved in 1979. Utilizing a Hegman grind gauge, this test assesses the size and the prevalence of the larger or coarser particles and agglomerates, but does not provide information on the average particle size of the powder. A Hegman grind gauge reading of 0 translates to a particle size of about 100 $\mu$m; a reading of 1 translates to a particle size of about 85 $\mu$m; a reading of 2 translates to a particle size of about 75 $\mu$m; a reading of 3 translates to a particle size of about 62 $\mu$m; a reading of 4 translates to a particle size of about 50 $\mu$m; a reading of 5 translates to a particle size of about 37 $\mu$m; a reading of 6 translates to a particle size of about 25 $\mu$m; a reading of 7 translates to a particle size of about 17 $\mu$m; and a reading of 8 translates to a particle size of less than about 2 $\mu$m. The procedure for the grind gauge test is as follows:

A calibrated Hegman production grind gauge with scraper (No. 440C at the bottom of the gauge; No. 5254 on the side of the gauge) is first cleaned with a lint-free rag and an appropriate cleaning solution, such as butyl carbitol, IPA, or acetone. Approximately 0.2 grams of the test mixture is then placed in both channels of the grind gauge. If the target medium is a solid at room temperature, the test mixture can be heated to a temperature above the melting temperature of the target medium before applying the test mixture onto the grind gauge, and the grind gauge can also be heated to the same temperature. Grasping the scraper in both hands in a nearly vertical position (e.g., the angle between the draw down blade and the surface of the gauge should be between 80 and 90 degrees), the sample is drawn down the gauge using a smooth, steady stroke that should take at least 3 seconds and no longer than 10 seconds. Sufficient pressure is used so that the center and side portions of the gauge are wiped clean.

The reading must be taken on the draw down within 10 to 20 seconds after completion. The grind of the test sample is determined by examining the scratches and/or strays. Scratches are particles larger than the diameter of the film thickness. Strays are scratches that are non-continuous. The grind gauge reading is the point at which three or more scratches and/or strays are present. The procedure is repeated at least twice, and the readings are averaged.

The compositions of the present invention also help to prevent the formation of or decrease the amount of clusters or agglomerates of the characteristic use particles. In other words, the entrapment of the characteristic use particles in the physical entrapment phase can improve the free-flowing nature of the characteristic use particles. This desirable result can be directly measured by following two reproducible methodologies to determine the decrease in the amount of clusters and agglomerates provided by the compositions of the present invention: (i) a sieve test and (ii) a particle size analysis.

A sample of the compositions of the present invention, i.e., characteristic use particles entrapped in a physical entrapment phase, has a 1 minute sieve weight % result of greater than or equal to about 10%, preferably greater than about 20%, and most preferably greater than about 30% improvement in comparison to the 1 minute sieve weight % result of a sample of pure characteristic use particles (i.e., as purchased commercially and without a physical entrapment phase). Similarly, a sample of the compositions of the present invention, i.e., characteristic use particles entrapped in a physical entrapment phase, has an agglomerated particle size decrease of greater than or equal to about 10%, preferably greater than about 20%, and most preferably greater than about 30% in comparison to the agglomerated particle size results of a sample of pure characteristic use particles. The agglomerated particle size of the samples can be determined on instrumentation, such as a Malvern Mastersizer 2000.

The first methodology performs a sieve test analysis for a fixed amount of a composition sample. The initial step includes making an estimate of the sieve size that would pass about 40% by weight of a control sample, i.e., a sample of pure characteristic use particles, in a 3 minute run. After thoroughly cleaning the sieve, about 3 to 5 grams of control sample is placed onto the sieve, and both the control sample and the sieve are weighed. The sieve containing the control sample is then placed in a Micron Air Jet Sieve unit (commercially available from Micron Powder Systems of Hosokawa Mircon Company located in Summit, N.J.) and covered with a plastic lid. The control sample is screened for a period of 180 seconds in manual mode while recording the vacuum pressure. Upon completion, the sieve and the remaining residue is weighed, and the weight percentage that passed through the sieve is calculated.

If the weight percent passing through the sieve exceeds 45% or is below 35%, the next appropriately sized sieve is selected, and the above steps are repeated for the control sample. Once an appropriate sieve size is found, i.e., a sieve size that allows from about 35% to about 45% by weight of the control sample to pass through the sieve, the above steps are repeated using the sample. Additional data can be obtained by recording the weight percent of the test sample passing through the sieve at 1, 2, and 3 minute intervals.

The second methodology includes the use of a computerized Malvern particle size analyzer in which a small amount of the test sample is analyzed, and the results can be compared to a control sample. A Malvern Mastersizer 2000 dry unit, Scirocco 2000 Model #APA 2000, is commercially available from Malvern Instruments Ltd., located in Worchestershire, United Kingdom. Both dry and wet samples can be tested.

For a dry sample, the procedure is as follows. First, both the feed tray and feed chamber are cleaned. Next, from about 2 to about 4 grams of the sample is loaded into the feed tray. After selecting the Dry PTFE SOP (Standard Operating Procedure) and entering the appropriate label or identification information, analysis of the sample is initiated by right-clicking on the START icon. The Dry PTFE SOP is provided in the Table A below:

TABLE A

| Criteria | Setting | Value |
|---|---|---|
| Sample Selection | Scirocco 2000(A) | |
| Material | PTFE | |
| | Refractive Index | 1.38 |
| | Absorption | 0.1 |
| Labels | Factory Settings | |
| Reports & Saving | Factory Settings | |

PTFE Dry SOP

TABLE A-continued

PTFE Dry SOP

| Criteria | Setting | Value |
|---|---|---|
| Measurement | Measurement Time | 12 seconds |
|  | Measurement Snaps | 12,000 |
|  | Background Time | 12 seconds |
|  | Background Snaps | 12,000 |
| Sampler Settings | Sample Tray | General Purpose (<200 g) |
|  | Dispersive Air Pressure | 3 Bar |
|  | Aliquots | Single |
|  | Vibration Feed Rate | 40% |
|  | Measurement Cycle | Single |

Upon completion of the analysis, a graph representing the particle size distribution data and corresponding volume percent data can be obtained by selecting the RECORDS tab, right-clicking to highlight the desired record, and then selecting the RESULTS ANALYSIS (BU) tab.

For a wet sample (e.g., liquid a target medium containing the composite or a liquid target medium containing the control), the procedure is as follows. After selecting the Wet PTFE SOP, a manual measurement is initiated by first selecting the OPTIONS icon. The Wet PTFE SOP is provided below in Table B.

TABLE B

PTFE Wet SOP

| Criteria | Setting | Value |
|---|---|---|
| Sample Selection | Hydro 2000S(A) |  |
| Material | PTFE |  |
|  | Refractive Index | 1.38 |
|  | Absorption | 0.1 |
| Dispersant Name* | Mineral Oil |  |
|  | Refractive Index | 1.4 |
| Labels | Factory Settings |  |
| Reports & Saving | Factory Settings |  |
| Measurement | Measurement Time | 12 seconds |
|  | Measurement Snaps | 12,000 |
|  | Background Time | 12 seconds |
|  | Background Snaps | 12,000 |
| Sampler Settings | Pump/Stir Speed | 2500 RPM |
|  | Tip Displacement | 100% |
|  | Ultrasonics | Checked Pre-measurement 20 sec. |
|  | Tank Fill | Manual |
| Cycles | Aliquots | Single |
|  | Measurements | 2 per Aliquot |
|  | Cleaning | Before each aliquot (check ENABLE) |
|  | Clean Mode | Manual |
|  | Measurement Cycle | Multiple |
|  | Delay | 10 seconds |

*The dispersant name and its refractive index can be changed for a particular dispersant used.

After entering the appropriate information (e.g., material under analysis and the target medium in which it is dispersed), the liquid sample well is checked to ensure that it is empty. If the sample well is not empty, it can be drained by right-clicking the EMPTY button on the ACCESSORY menu. The empty liquid sample well is then cleaned by filling it with Malvern's proprietary cleaning solution and initiating a cleaning cycle by right-clicking the CLEAN icon. Next, the proper liquid is selected to flush the Hydro Unit. Using a pipette, the wet sample is transferred slowly into the sample well until the system prompts the user to stop adding more of the sample and to initiate analysis. Analysis of the wet sample is initiated by right-clicking the START icon. Upon completion of the analysis, a graph representing the particle size distribution data and corresponding volume percent data can be obtained by selecting the RECORDS tab, right-clicking to highlight the desired record, and then selecting the RESULTS ANALYSIS (BU) tab.

As mentioned earlier, one of the preferred characteristic use particles used in the present invention is PTFE. Embodiments described above contemplate the use of PTFE powder or PTFE in its reactor latex form as a characteristic use particle that benefits from the present invention. Since PTFE is useful in so many applications, compositions resulting from the present invention, comprising small particle size PTFE as the characteristic use particle entrapped in a physical entrapment phase, will be equally as useful in many applications, some of which are listed below in Table C:

TABLE C

Applications for Compositions with Small Particle Size PTFE as the Characteristic Use Particle

| BENEFITS SOUGHT | APPLICATION |
|---|---|
| Film or Coating | Auto Topcoat |
| Transparency | Optical Fibers |
|  | Textile Fibers |
|  | UV Packing |
|  | Clear UV Protection of Wood |
| Rub/Scratch Resistance | Ink |
|  | Ink Jet |
|  | Toners |
|  | Can Coatings |
|  | Auto Topcoat |
|  | Thermoplastics |
|  | UV Packing |
| Feel, Texture | Textile Fibers |
|  | Thermoplastics |
|  | Cosmetics |
|  | Thin Films |
| UV Resistance | Cosmetics (SPF) |
|  | Clear Coat for Wood |
|  | Marine Coatings |
|  | AutoTopcoat |
|  | Textile Fibers (Clothing, Rugs, etc.) |
| Weather/Chemical Resistance | Electronics (Water, Water Vapor) |
| Oxidation Resistance | Marine Paint (Antifoullant) |
|  | Chemical Storage and Reaction Tanks |
|  | Can Coating (Food) |
|  | Wood Treatment |
| Lubrication | Auto Motor Oils |
|  | Gear Lubricants |
|  | Bearings, Shick 50 |
|  | Bowling Alleys |
|  | Thermoplastics (Processing Aid) |
|  | Mold Release |
|  | Fiber Manufacturing |

The above-listed benefits and applications for compositions comprising PTFE as the characteristic use particle are not exhaustive, as many other applications and benefits for PTFE exist. The PTFE-containing compositions formed in the present invention may be dispersed directly into the target media or application systems listed above, or may be pre-dispersed into a carrier liquid and then placed in the target medium or system of use.

EXAMPLES

These examples further describe and demonstrate embodiments within the scope of the present invention. The examples are given solely for the purpose of illustration and are not to be construed as limitations of the present invention, as many variations thereof are possible without departing from the spirit and scope of the invention.

The following common ingredients were used in the Examples below, unless otherwise specified:

| Ingredient | Company |
|---|---|
| Polytetrafluoroethylene (PTFE) SST3D or SST4[1] | Shamrock Technologies, Inc. |
| Polyethylene S-395-N1 | Shamrock Technologies, Inc. |
| Quat: Adogen 442-100 P or 442-75 (dimethyl dihydrogenated tallow quaternary ammonium) | Witco Corporation |
| Bentonite Clay - National Premium Weight 200 mesh | Bentonite Corporation |
| Isopropyl Alcohol | N/A |
| Klearol (mineral oil) | Witco Corporation |
| Acetone | Novick Chemical Co., Inc. |
| Tap Water | N/A |

[1]The Shamrock Technologies data sheet describes SST-4 as an off-white free-flowing PTFE powder, wherein the PTFE particles have an average diameter of 4 microns, a specific gravity of about 2.15, an onset of melting at about 200° C., and a crystalline point of 321° C. SST-3D is a white free-flowing PTFE powder, wherein the PTFE particles have an average diameter of 5 microns, a specific gravity of about 2.15, an onset of melting at about 200° C., and a crystalline point of 321° C.

In addition, unless otherwise specified, the following instruments were used in the Examples described below:

| Instrument | Company & Specification | Conditions |
|---|---|---|
| Magnetic Plate | Corning Stirrer; Range 0–9 | Set at various speeds and durations of time. |
| Blender, 1 L | Waring Company; Model No. 3413297 | Set at various speeds and durations of time. |
| IEC Spinnette Laboratory Centrifuge | Damon/IEC Division, Needham, MA | 5 minutes at maximum speed. |
| Hegman Grind Gauge (Fineness of Grind Gauge) | Precision Gage & Tool. Co., Dayton, OH | H: 0 - 8<br>MLS: 4 - 0<br>$\mu$: 100 - 0 |
| N.P.I.R.I. Production Grindometer Grind Gauge | Precision Gage & Tool. Co., Dayton, OH | NPIRI: 0–10<br>$\mu$: 0–25 |
| Horizontal Media Mill: Mini Motormill 100 | Eiger Machinery, Inc. | Set at 2600 RPM for 4 passes. |
| Grinding Machine | Scienceware Bel Art Product | 2 minutes at fixed speed. |
| Mixer | Magnetek Company; CAT No. D552 | ~1000 RPM |
| Microscope (Color video camera/CCD-Iris) | Sony Corporation Serial No. 10368 Model No. DXC-960MD | 170/–10/0.25 P |
| HR-202 Scale 1 | AND Company Max 210 g, d = 0.1 mg | N/A |
| FX 320 Scale 2 | Max 310 g, d = 0.01 g | N/A |

Example 1

Dispersion of PTFE and PTFE/Organoclay in Organic Solvents 250 mL of hot tap water at ~60° C. was placed in a Waring Blender. While mixing at a setting of 6, 10 grams of PTFE (Grade SST 4) was slowly added and mixed for about 5 minutes. Three grams of quat (methyl benzyl dehydrogenated tallow ammonium chloride, sold under the tradename Kemamine BQ-9701C by Witco Corp.) was slowly added to the water/PTFE mixture and mixed for about 5 minutes. Then, 4.23 grams of hectorite clay (commercially available as Bentone MA from Rheox Inc.) was added to the water/PTFE/quat mixture for about 5 minutes. The resulting mixture was transferred to a glass jar and the material floating at the top ("coagulate") was collected and dried in an oven at 50° C. for 24 hours. After drying, the coagulate composition was ground with a spatula on a glass plate to a powdery consistency.

2.3 grams of the PTFE/organoclay composition was added to 50 grams of toluene in a glass beaker and mixed in a Hamilton Beach model 936-2 (commercially available from Hamilton Beach, Inc. located in Washington, N.C.) at a Variac setting of 40 for about a minute on a magnetic stirrer. This step was repeated in separate glass beakers, which respectively contained 50 grams of Sunpar LW 120 oil (produced by Exxon Corp.) and 50 grams of Magiesol 47 (produced by Magie Bros. Oil Co.). As a control, 2.3 grams of the same PTFE was added and mixed in the same amount of each solvent above. When these test mixtures were checked under the microscope, the PTFE/organoclay was well dispersed in the toluene, i.e., showed virtually no aggregates. However, the other two PTFE/organoclay test samples showed some aggregates. The pure PTFE test samples showed a significant number of aggregates.

0.25 grams of acetone was added to each test sample having aggregates, i.e., all test samples except for the PTFE/organoclay test sample in toluene. After adding the acetone, each test sample was mixed in the Hamilton Beach for about one minute. When these test mixtures were checked under the microscope, the PTFE was well dispersed in all of the PTFE/organoclay test samples. However, all of the pure PTFE test samples still showed a significant amount of aggregates. The results are summarized in Table 1 below:

TABLE 1

Dispersion of PTFE and PTFE/Organoclay in Organic Solvents

| Invention Examples | PTFE/Organoclay Powder (grams) | Organic Solvent | Acetone (grams) | Aggregates of PTFE |
|---|---|---|---|---|
| 1 | 2.5 | 50 grams of toluene | — | none |
| 2 | 2.5 | 50 grams of Sunpar LW 120 | 0.25 | none |
| 3 | 2.5 | 50 grams of Magiesol 74 | 0.25 | none |

TABLE 1-continued

Dispersion of PTFE and PTFE/Organoclay in Organic Solvents

| Comparative Examples | Pure PTFE (grams) | Organic Solvent | Acetone (grams) | Aggregates of PTFE |
|---|---|---|---|---|
| A | 2.5 | 50 grams of toluene | 0.25 | yes |
| B | 2.5 | 50 grams of Sunpar LW 120 | 0.25 | yes |
| C | 2.5 | 50 grams of Magiesol 74 | 0.25 | yes |

The results of this experiment show that the PTFE/organoclay composition significantly increases the dispersion of PTFE in organic solvents as compared with the dispersion of PTFE alone.

Example 2

Dispersion of PTFE and PTFE/Organoclay in Polyethylene

Preparation of Bentonite Clay Slurry

Solid bentonite clay was dispersed by slowly mixing about 3% by weight of bentonite in 97% by weight of water at room temperature. This mixture was mixed for 8 hours in a high-speed mixer to obtain a clay slurry. Without wanting to be limited to any one theory, it is believed that this mixing step helps to separate out the individual platelets of the bentonite clay. After allowing the clay mixture to stand for 24 hours at room temperature, the clay slurry was separated from the waste that settled to the bottom by decanting. A small portion of the clay slurry was then weighed and placed in an oven for 2 hours at 100° C. to evaporate out all of the water. The dried clay was then weighed to determine the solid weight percentage of the clay in the slurry. The solid weight percentage of the clay was about 1.57% by weight of the clay slurry.

Preparation of Organoclay

Organoclay powder was then obtained as follows. A portion of the bentonite clay slurry was weighed, heated to 55° C., and mixed in a blender at high speed. Using the solid weight percentage of the clay obtained from the procedure above (e.g., 1.57%), a quat to clay solid weight ratio of 0.6:1.0 was selected, and the appropriate amount of quat was added to the clay slurry. After mixing for an additional 5 minutes, the mixture was allowed to stand for about 30 minutes. Thereafter, the coagulate floating at the top was collected, filtered, and washed with water. The resulting solid was dried in an oven at 55° C. for 24 hours. The resulting dried solids were ground in a mortar and pestle to obtain a fine powder of organoclay.

Preparation of PTFE/Organoclay Powder Samples

A portion of the clay slurry was placed in a beaker and weighed. The clay slurry was heated to 55° C. while mixing with a magnetic stirrer bar. The heated clay slurry was divided into three equal portions and transferred into three blenders. PTFE (commercially available as SST 3D from Shamrock Technologies, Inc.) was then slowly added while mixing at high speed to each blender according to the proportions provided in Table 2 and using the solid weight percentage of the clay obtained from the previous step.

TABLE 2

Formulation of PTFE/Organoclay Powder

| Sample PTFE/Organoclay Powder | Bentonite Clay (wt. %)* | Quat (wt. %)* | PTFE SST 3D (wt. %)* |
|---|---|---|---|
| I | 15.62 | 9.38 | 75 |
| II | 31.25 | 18.75 | 50 |
| III | 46.47 | 28.13 | 25 |

*% of total weight of physical entrapment phase and characteristic use particles After mixing for five additional minutes, quat was added to each blender according to the weight percentages provided in Table 2 above. After mixing for an additional 5 minutes, the mixture was allowed to stand for about 30 minutes. Thereafter, the coagulate floating at the top of each blender was collected, filtered, and washed with water. The resulting composite compositions (i.e., Samples I–III) were dried in an oven at 55° C. for 24 hours. The resulting dry composite compositions were ground in a mortar and pestle to obtain a fine powder mixture of organoclay and PTFE.

Preparation of PTFE Dispersions in Polyethylene

PTFE dispersions in powdered polyethylene (PE S394-N1 commercially available from Shamrock Technologies) were prepared by adding the respective components, as provided in Table 3 below, in a glass bottle and mixing the dry components by shaking for about 3 minutes. The resulting dry powder mixtures were placed in a metal panel, which was placed on a hot plate. The panel was heated enough to melt the polyethylene, and a spatula was used to mix the molten polyethylene using a backward and forward motion for 15 times (one time constituted one backward and one forward motion). A drop of the hot polyethylene mixture was placed on a hot glass slide. A glass cover was placed on top of the glass slide to make a thin film, and the thin film was inspected under the microscope. The resulting observations are provided in Table 3.

TABLE 3

Formulation of PTFE Dispersions in Polyethylene

Figure 3A:
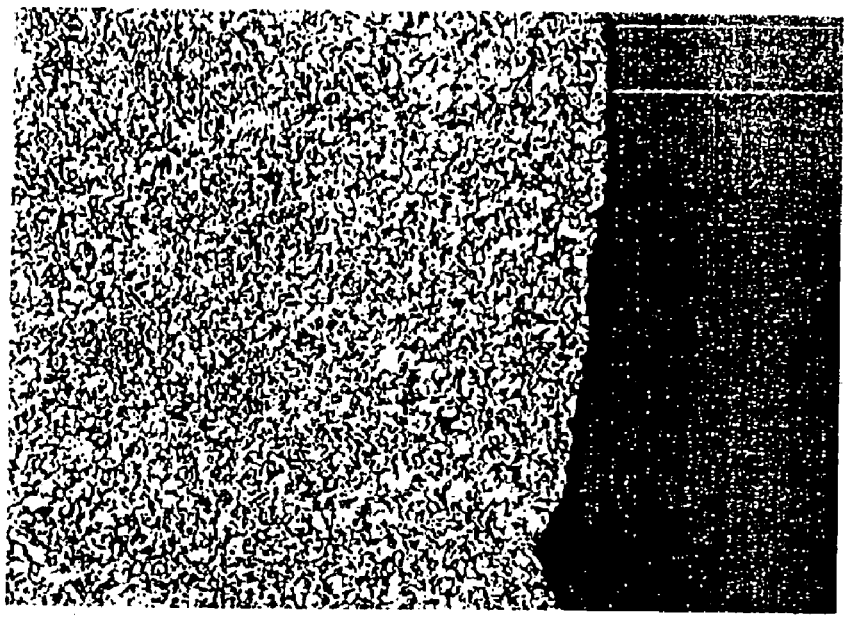
FIGS. 3A and 3B are photographs of polyethylene and polyethylene containing organoclay, respectively.
Figure 3B:
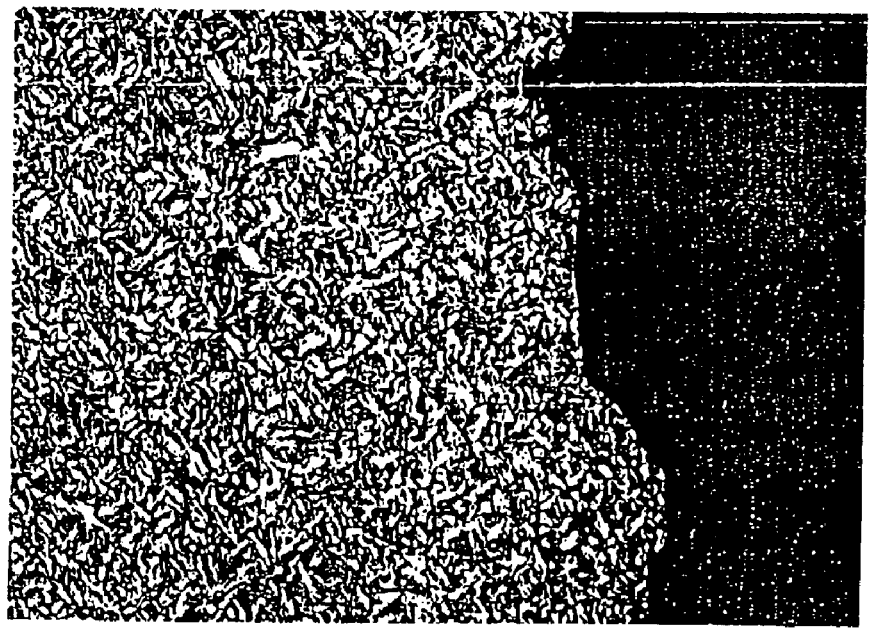
Figure 4A:
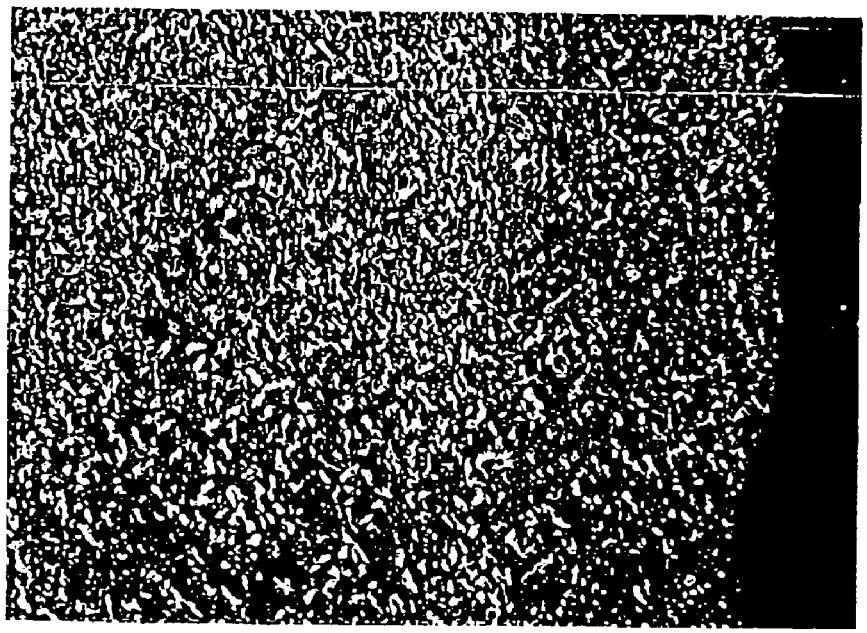
FIGS. 4A and 4B are photographs of PTFE dispersions in polyethylene.
Figure 5A:
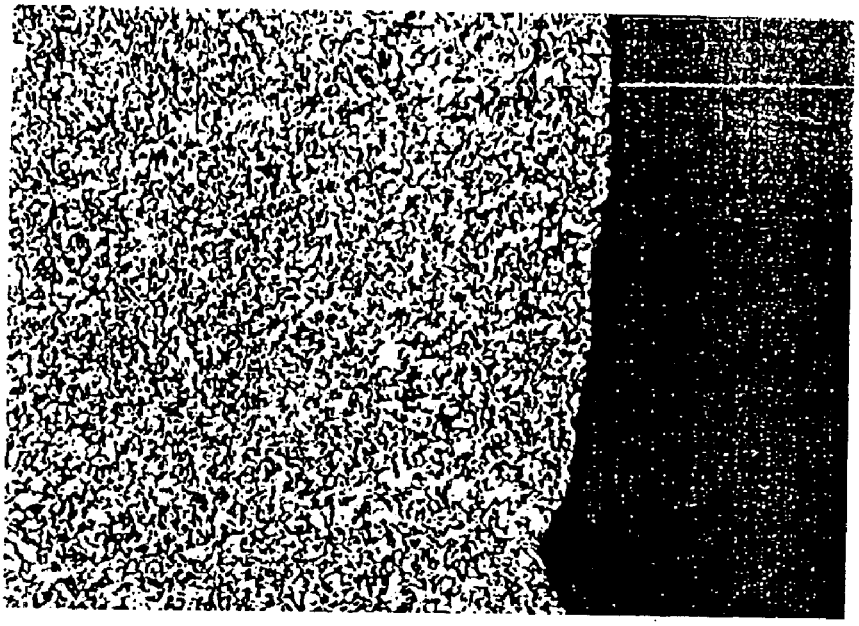
FIGS. 5A and 5B are photographs of PTFE dispersions in polyethylene.
Figure 6A:
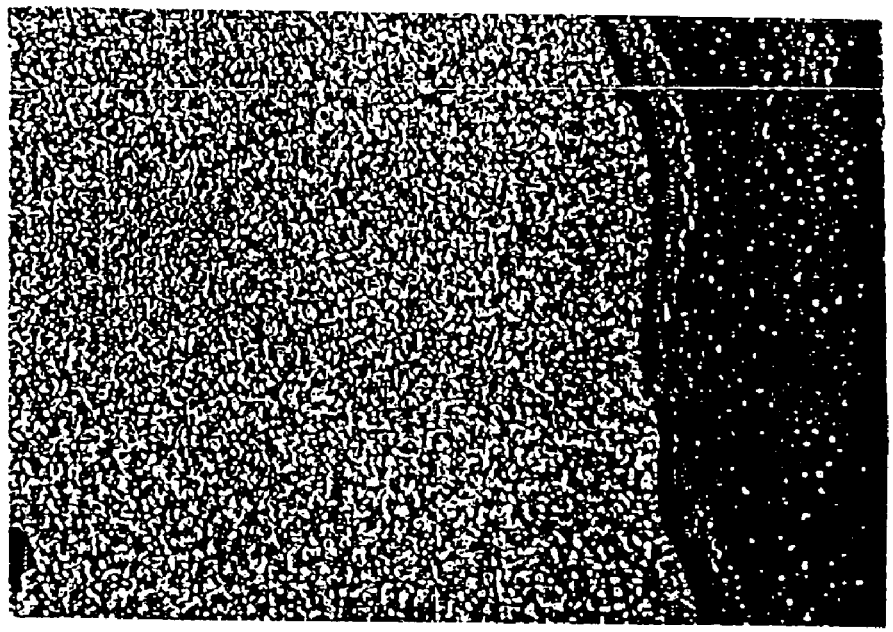
FIGS. 6A and 6B are photographs of PTFE dispersions in polyethylene.

| | Organoclay (grams) | PTFE (grams) | PE (grams) | Observation Under Microscope (125× Magnification) |
|---|---|---|---|---|
| Control Samples | | | | |
| Control PE | — | — | 100.00 | Clear, crystal and homogeneous. See FIG. 3A |
| Control PE + PTFE | — | 5.00 | 95.00 | Agglomerated PTFE particles |
| Control PE + Organoclay | 5.00 | — | 95.00 | Homogeneous and clear. See FIG. 3B |
| Invention Examples | | | | |
| 4[a] | 1.25 | 3.75 | 95.00 | Concentrated and dispersed PTFE particles. See FIG. 4A |
| Control Samples | | | | |
| 5[b] | 2.50 | 2.50 | 95.00 | Dispersed PTFE particles more homogeneous. See FIG. 5A |
| 6[c] | 3.75 | 1.25 | 95.00 | Dispersed PTFE particles. See FIG. 6A |

TABLE 3-continued

Formulation of PTFE Dispersions in Polyethylene

Figure 4B:
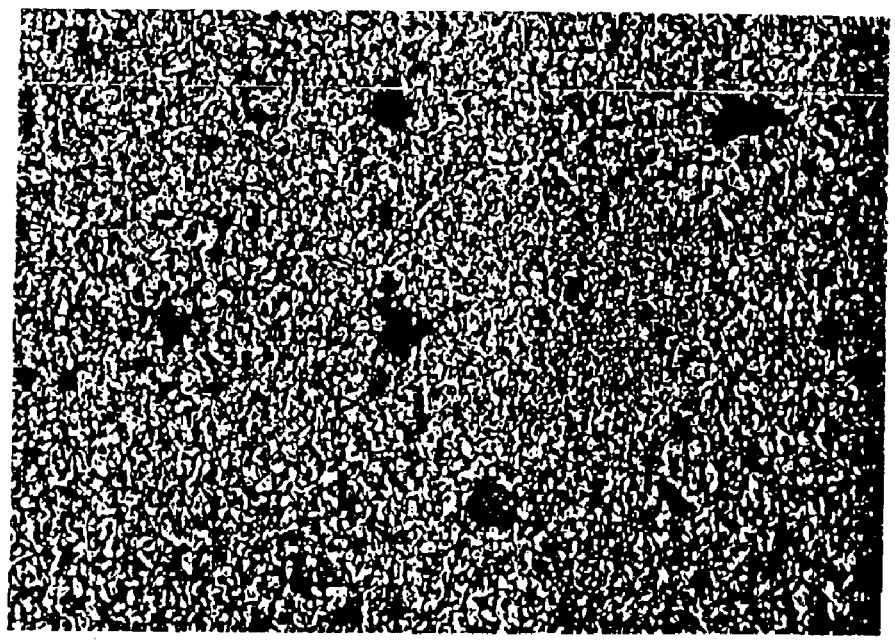
Figure 5B:
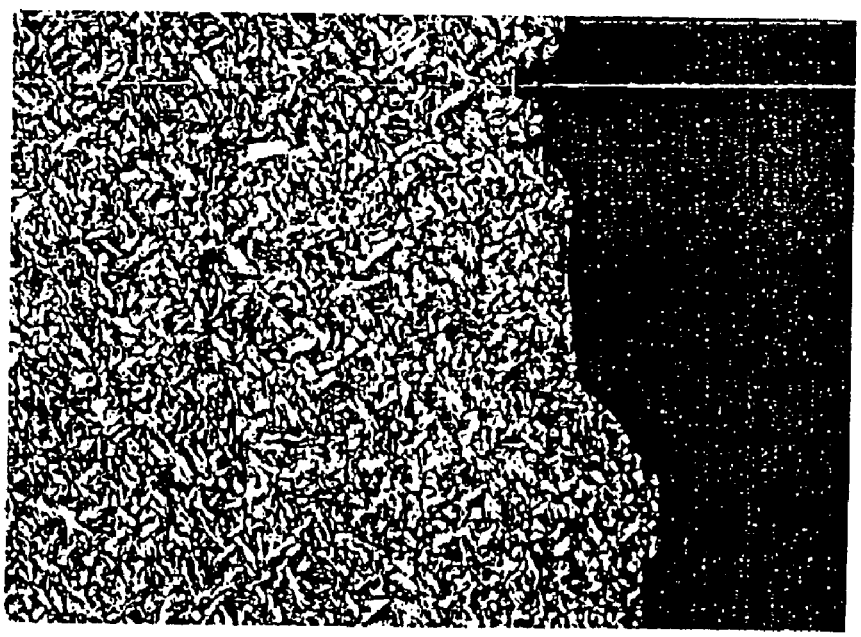
Figure 6B:
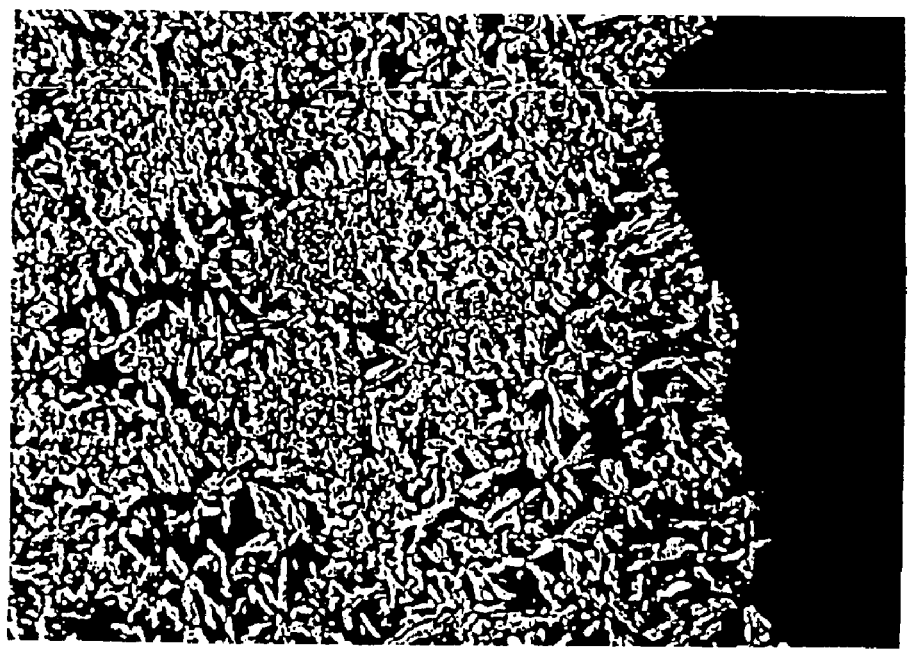

| | Organoclay (grams) | PTFE (grams) | PE (grams) | Observation Under Microscope (125× Magnification) |
|---|---|---|---|---|
| Comparative Examples | | | | |
| D | — | 3.75 | 95.00 | Agglomerated PTFE particles. See FIG. 4B. |
| E | — | 2.50 | 95.00 | Agglomerated PTFE particles. See FIG. 5B. |
| F | — | 1.25 | 95.00 | Agglomerated PTFE particles. See FIG. 6B. |

[a]5 grams of PTFE/Organoclay Sample I from Table 2 was used.
[b]5 grams of PTFE/Organoclay Sample II from Table 2 was used.
[c]5 grams of PTFE/Organoclay Sample III from Table 2 was used.

These results show that organoclay significantly improves the dispersion of PTFE in polyethylene.

Example 3

Dispersion of PTFE and PTFE/Organoclay in Mineral Oil

Preparation of Clay Slurry

The clay slurry was prepared as described in Example 2. However, samples of this clay slurry were centrifuged for various time periods (from 1 minute to 9 minutes) to determine the time needed to remove most of the large, undissolved foreign particles, as observed under a microscope. The optimum time was determined to be about 5 minutes, and the entire clay sample was centrifuged for about 5 minutes. The solid weight percent of the bentonite clay slurry was then determined as described in Example 2.

Preparation of Organoclay/PTFE

In order to determine the appropriate amount of quat needed to react with the clay, five organoclay/PTFE powder mixtures were obtained according to the different mass proportions provided below in Table 4.

TABLE 4

Formulation of PTFE/Organoclay Powder

| Sample PTFE/ Organoclay Powder | Clay Slurry (grams) | Clay (solid wt. %) | Clay (grams) | Quat (grams) | PTFE [1](grams) | Weight Ratio of Quat/Clay |
|---|---|---|---|---|---|---|
| IV | 200 | 1.66 | 3.32 | 1.992 | 5.312 | 0.6 |
| V | 200 | 1.66 | 3.32 | 2.656 | 5.976 | 0.8 |
| VI | 200 | 1.68 | 3.36 | 1.328 | 4.648 | 0.4 |
| VII | 200 | 1.68 | 3.36 | 2.352 | 5.712 | 0.7 |
| VIII | 200 | 1.68 | 3.36 | 2.352 | 0.00 | 0.7 |

[1]PTFE SST-3D (commercially available from Shamrock Technologies, Inc.)

In each of the above five samples, the clay slurry was placed in a 250 mL beaker and heated on a hot plate to 65° C. The heated clay slurry was transferred into a 1 liter blender. The PTFE was slowly added and mixed for about 3 minutes with the blender set at speed 1. While the PTFE was being mixed, the quat was dissolved in 120 grams of water at a temperature of 65° C. The quat solution was then poured into the blender and mixed with the PTFE and clay for about 10 minutes with the blender set at speed 1.

Each organoclay/PTFE mixture was then poured into a jar and allowed to stand for about ½ hour. The organoclay/PTFE agglomerated at the top of liquid mixture and eventually provided a two phase system: the bottom phase was clear water; the top phase was the organoclay/PTFE. The aqueous phase containing the clay slurry has been a brownish-clay color before the quat was added. The top phase agglomerate was separated, filtered, and rinsed with water. Then the composite composition was dried in an oven at 50° C. for 24 hours. Finally the dry composite composition was ground with a spatula on a lab bench for approximately 10 minutes.

TABLE 5

Visual Observations of Samples at Various Quat/Clay Ratios

| Sample ID | Weight Ratio of Quat/Clay | Observations Before Filtering | Observations of Dry Solid |
|---|---|---|---|
| IV | 0.6 | Sample IV had two phases. Most of the solids (PTFE, Quat and clay) agglomerated at the top of the samples. The water phase was clear | Sample IV was a soft solid that was easy to grind into a powder. |
| V | 0.8 | Similar to Sample IV. Sample V had a very clear water phase. | Sample V was the softest solid, which was very easy to grind into a powder. |
| VI | 0.4 | Sample VI had a single uniform phase with a beige color. | Sample VI was very hard and very difficult to grind. |
| VII | 0.7 | Sample VII had two phases. Most of the solids (PTFE, Quat and clay) agglomerated at the top of the samples. The water phase was as clear as Sample IV. | Sample VII was the softest solid, which was very easy to grind into a powder. |
| VIII | 0.7 | Sample VIII had two phases. Most of the solids (quat and clay) agglomerated at the top of the samples. The water phase was as clear as Sample IV. | Sample VIII was a soft solid. |

According to the observations provided in Table 5 above, a Quat to clay weight ratio range from about 0.6 to about 1 was found to be effective in converting the clay into organoclay. A Quat to clay weight ratio range from about 0.7 to about 1 was preferred, and a ratio range from about 0.8 to about 1 was more preferred.

Preparation of PTFE Dispersions in Mineral Oil

Mineral oil and acetone were added to six plastic containers according to the proportions provided in Table 6 below. While stirring with a magnetic stirrer, the dried solids were added to the mineral oil/acetone mixture.

TABLE 6

Formulation of PTFE Dispersions in Mineral Oil

| Control Samples | Mineral Oil (grams) | Acetone (grams) | Organoclay 0.7/1 Quat/clay (grams) | PTFE (grams) | OC/PTFE[1] 1:1 wt. ratio (grams) | OC/PTFE[2] 1:1 wt. ratio (grams) |
|---|---|---|---|---|---|---|
| Mineral Oil/Acetone | 100 | 0.200 | — | — | — | — |
| Mineral Oil/Acetone/ Organoclay | 100 | 0.200 | 1.0 | — | — | — |
| Invention Examples | | | | | | |
| 7 | 100 | 0.200 | — | — | 2.0 | — |
| 8 | 250 | 0.625 | — | — | — | 5.0 |
| Comparative Examples | | | | | | |
| G | 100 | 0.200 | — | 1.0 | — | — |
| H | 250 | 0.625 | — | 2.5 | — | — |

[1]Organoclay having Quat/Clay ratio of 0.7/1 from Sample VII in Table 4 was used.
[2]Organoclay having Quat/Clay ratio of 0.8/1 from Sample V in Table 4 was used.

The samples were then mixed for a period of about 3 minutes with the stirrer speed setting at 4 on the magnetic plate. The samples were observed under the microscope and the observations were recorded. Thereafter, the samples were then mixed in a Waring blender for a period of about 10 minutes at a speed setting of 1, and were again observed visually and at a magnification of 125×.

Finally, the Control Samples, Invention Example 7 and Comparative Example G were sonicated for a period of about 5 minutes at full intensity in a model UC 100 Sonicator (Vibray Cell), (commercially available from Sonics Materials Company located in Danbury, Conn.). These samples were again observed visually and at a magnification of 125×. Invention Example 8 and Comparative Example H were separately mixed and ground using the horizontal mill (4 passes at a RPM of 2600 with 0.8–1.0 mm ceramic beads), which is commercially available as Mini Motormill 100 from Eiger Machinery Inc. These samples were again observed visually and at a magnification of 125×, and the results are shown in Table 7 below:

TABLE 7

Visual and Microscopic Observations of Mineral Oil Dispersions

| | Visual Observations | Microscopic Observations (at 125× magnification) |
|---|---|---|
| Control Samples | | |
| Mineral Oil/Acetone | The sample was clear and colorless. | No particles were present. |
| Mineral Oil/Acetone/ Organoclay | The organoclay dispersed well in mineral oil. However, some light brown solids settled to the bottom of the contain after about 5 minutes. This observation was unchanged even after this solution was mixed using a magnetic stirrer bar, blender and sonicator. | Small and medium sized crystalline particles were observed. |
| Invention Examples | | |
| 7 | Same observations as Mineral Oil/Acetone/Organoclay Control | The particles were agglomerated. |
| 8 | Sample, except the color was lighter. The particles were well dispersed. After about 2 hours, some of the particles started to settle. The color of this sample was tan. | The particles are well dispersed. See FIG. 7A |
| Comparative Examples | | |
| G | The PTFE did not disperse even after mixing with a spatula. The agglomeration of the PTFE was easily observed. The overall sample was cloudy. | Agglomerated particles were observed. These particles were larger than those observed in the Mineral Oil/ Acetone/Organoclay Control Sample. |
| H | Same observations as Comparative Example G, except that this sample was foamy. | Agglomerated particles were observed. See FIG. 7B. |

Figure 7A:
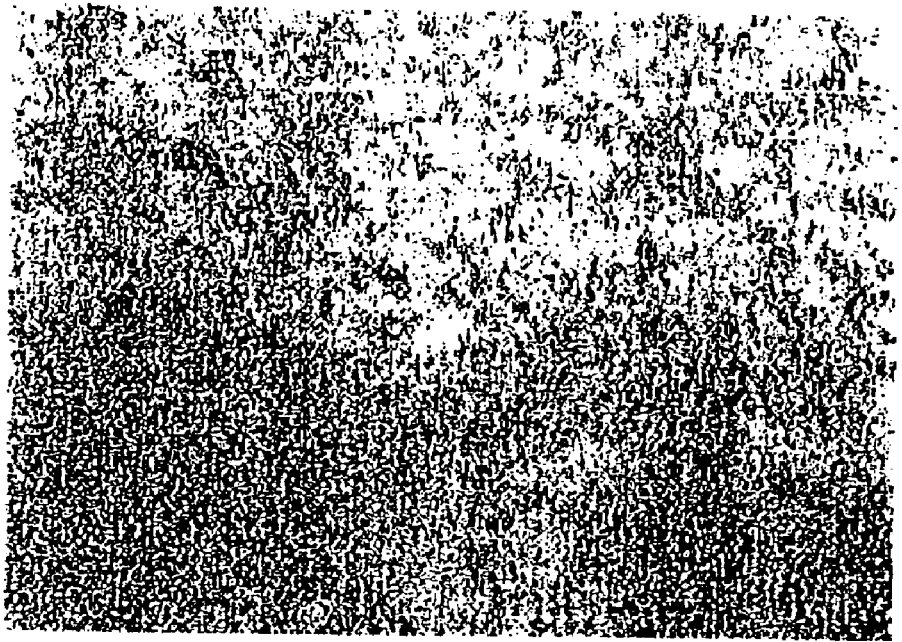
FIGS. 7A and 7B are photographs of PTFE dispersions in mineral oil.
Figure 7B:
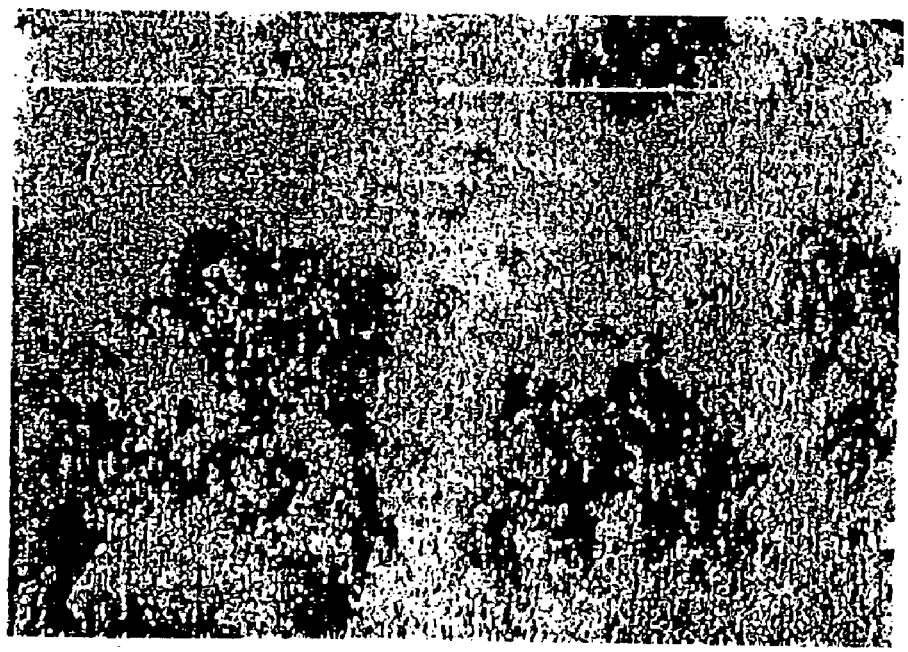

The visual observations of the solutions and the microscopic pictures, shown in FIGS. 7A and 7B, of the samples of Invention Example 8 and Comparative Example H showed that organoclay (OC) helps to disperse PTFE in mineral oil.

Example 4

Dispersion of Polyethylene in Isopropyl Alcohol
Preparation of Clay Slurry

A clay slurry using bentonite clay was prepared according to Example 3.
Preparation of Organoclay/PE and Organoclay/PTFE Two samples were prepared according to a ratio of 0.75 grams of quat to 1 gram of clay. The clay slurry above was found to have 1.57% by weight of clay. Bentonite clay contains 3% by weight of Na and quat contains 7% by weight of Cl. The proportions for the samples are provided in the Table 8 below:

TABLE 8

Formulation of Organoclay/PE and Organoclay/PTFE

| Sample ID | Wt. Ratio (Quat/Clay) | Clay Slurry (gram) | Clay (wt %) | Clay (gram) | Quat (gram) | PE [2](gram) | WVP [1](gram) |
|---|---|---|---|---|---|---|---|
| IX | 0.75 | 350 | 1.57 | 5.506 | 4.130 | 9.182 | 0.000 |
| X | 0.75 | 350 | 1.57 | 5.506 | 4.130 | 0.000 | 9.182 |

[1]WVP means Daikin F104 white virgin PTFE particles, Shamrock Technology designation Powdertex 53
[2]PE was S-395N1, which is commercially available from Shamrock Technology and which has an average diameter of 5 microns.

The clay slurry was placed in a 500 mL beaker and heated on a hot plate at a temperature of about 70° C. The heated clay slurry was transferred into a 1 liter blender. The blender was set at a mixing speed of 1, and PE powder was slowly added and mixed for about 3 minutes. While PE was being mixed in the clay solution, quat was dissolved in 150 grams of hot water at a temperature of about 65° C. This quat solution was then poured into the blender and mixed with the PE and clay for about 10 minutes. The organoclay/PE mixture ("OC/PE mixture") was then poured into a jar to observe how the OC/PE agglomerated to the top of the jar. After allowing the sample to stand for about 30 minutes, the OC/PE mixture was filtered and the solids of each sample were dried in an oven at 50° C. for about 24 hours. This procedure was repeated for the OC/WVP sample (white virgin PTFE).

Dispersions of these samples in isopropyl alcohol were then prepared according to the proportions provided in Table 9 below:

TABLE 9

Formulation of PE Dispersions in IPA

| Sample ID | IPA (grams) | PE (grams) | OC/PE (wt % ratio~1:1)[a] (grams) |
|---|---|---|---|
| Invention Example 8 | 10 | 0.00 | 0.20[b] |
| Comparative Example I | 10 | 0.20 | 0.00 |

[a]Organoclay weight ratio of 0.75/1 for Quat/Clay
[b]Sample IX from Table 8 was used.

Figure 8A:
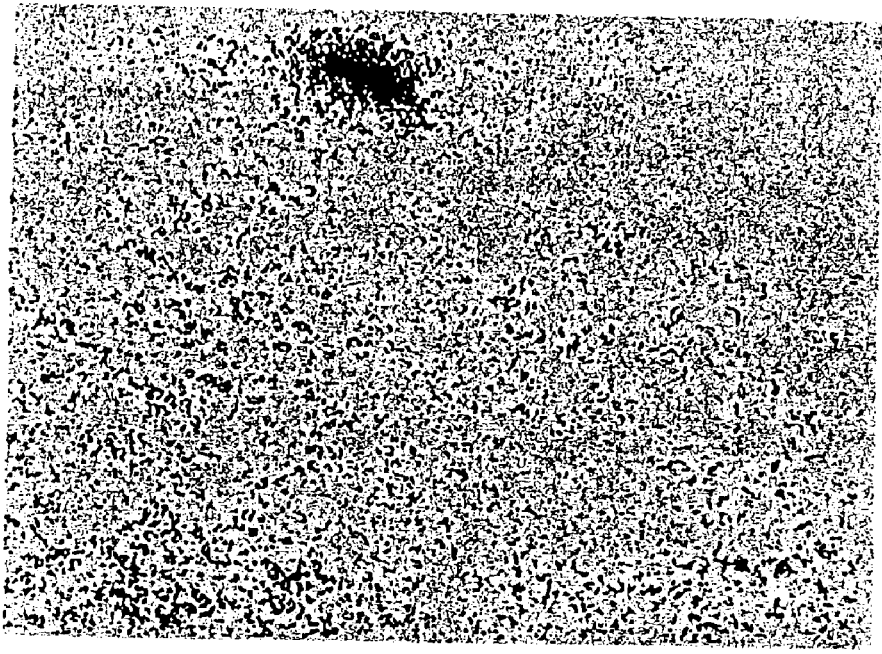
FIGS. 8A and 8B are photographs of PTFE dispersions in isopropyl alcohol.
Figure 8B:
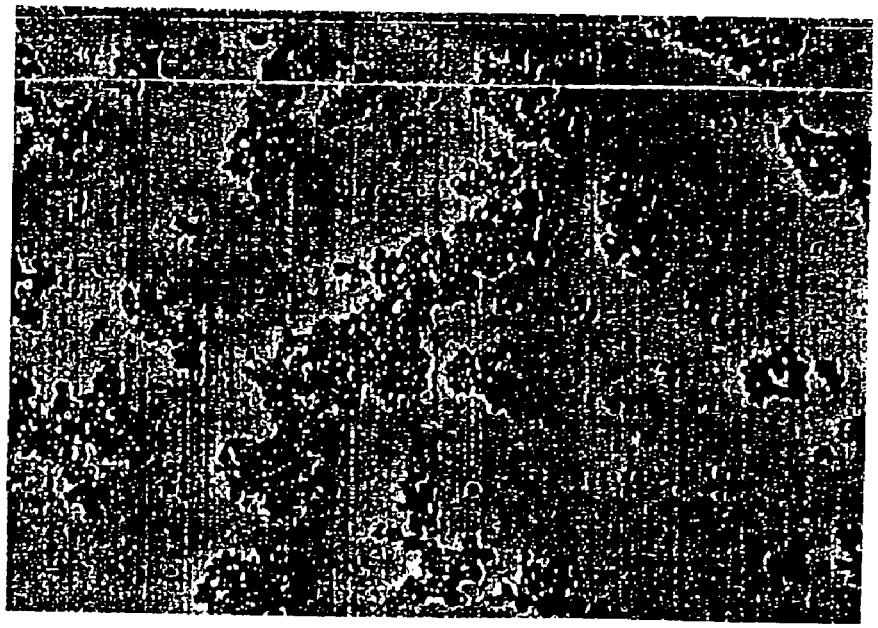

The dried solids (OC/PE) were ground with a spatula on a glass plate for approximately 10 minutes. 0.2 grams of PE and OC/PE were then separately placed in two 15 mL test tubes. Then 10 mL of isopropyl alcohol (IPA) was added to each test tube. Both samples were shaken by hand for a period of 10 seconds and pictures were taken at a magnification of 125×, as illustrated by FIGS. 8A and 8B. The visual and microscopic observations are provided in the Table 10 below:

TABLE 10

Visual and Microscopic Observations of IPA Samples

| Sample ID | Visual Observation | Microscopic Observation |
|---|---|---|
| Invention Example 8 | After shaking the test tube for 10 seconds, it was observed that the OC/PE immediately dispersed in the IPA providing a tan color. When the test tube was decanted, no OC/PE was left at the bottom of the test tube. | The microscopic pictures show that OC/PE is well dispersed without any agglomeration See FIG. 8A. |
| Comparative Example I | After shaking this test tube containing IPA and PE, it was observed that the PE did not disperse completely. Its color was cloudy, and large particles settled down to the bottom of the test tube. | The microscopic picture shows agglomeration of the PE particles. See FIG. 8B. |

The visual and microscopic observations reported in Table 10 of Invention Example 8 and Comparative Example I show that OC/PE disperses well in IPA without any agglomeration, as illustrated by FIG. 8A. In contrast, as shown in FIG. 8B, PE does not disperse well in IPA, as evidenced by the large amounts of agglomerates of PE.

Samples of the OC/WVP, which were obtained above, and WVP without OC were also analyzed by conducting a rubbing test. The procedure is as follows: approximately 0.5 grams of WVP and OC/WVP were separately placed next to each other on a rubber mouse pad, and an index finger was used to spread out the dry powders on the mouse pad. The OC/WVP spread out very easily, while the WVP particles adhered to each other to form larger balls or aggregates of particles.

Example 5

Grind Gauge and Settling Tests for Dispersions of PTFE in Mineral Oil

Preparation of Clay Slurry.

A clay slurry using bentonite clay was prepared according to Example 3.

Preparation of Organoclay/PTFE Powder

According to a previous experiment in Example 3, it was found that about 0.6 grams of quat is required for 1 gram of clay to effectively convert the bentonite clay into organoclay. Using the 0.6:1 ratio, seven samples having varying organoclay to PTFE ratios were prepared according the proportions provided in Table 11 below, wherein SST-3D PTFE was used.

TABLE 11

Formulation of OC/PTFE Powder

| Sample | Clay Slurry (g.) | Clay (solid wt. %) | Clay (g.) | Quat (g.) | OC* (g.) | PTFE (g.) | OC + PTFE (g.) | PTFE (% by wt.) | OC (% by wt.) |
|---|---|---|---|---|---|---|---|---|---|
| XI | 0.00 | 1.12 | 0.00 | 0.00 | 0.00 | 20.00 | 20.00 | 100.00 | 0.00 |
| XII | 10.00 | 1.12 | 0.11 | 0.07 | 0.18 | 17.74 | 17.92 | 99.00 | 1.00 |
| XIII | 20.00 | 1.12 | 0.22 | 0.13 | 0.36 | 13.98 | 14.34 | 97.50 | 2.50 |
| XIV | 50.00 | 1.12 | 0.56 | 0.34 | 0.90 | 17.02 | 17.92 | 95.00 | 5.00 |
| XV | 100.00 | 1.12 | 1.12 | 0.67 | 1.79 | 16.13 | 17.92 | 90.00 | 10.00 |
| XVI | 200.00 | 1.12 | 2.24 | 1.34 | 3.58 | 8.36 | 11.95 | 70.00 | 30.00 |
| XVII | 200.00 | 1.12 | 2.24 | 1.34 | 3.58 | 3.58 | 7.17 | 50.00 | 50.00 |

* No correction was made for weight loss of by product NaCl when organoclay is formed Using the proportions in the above table, Samples XI-XVII were separately prepared as follows. The clay slurry was placed in a 250 mL beaker, enough water was added to reach the 200 mL mark, and the sample was then heated to 65° C. After transferring the heated clay slurry to a 1 liter blender, PTFE was slowly added to the mixture in the blender while mixing at a blender speed setting of 1. While the PTFE/clay mixture was being mixed for about 3 minutes, the appropriate quantity of quat according to the proportions in the above table, was dissolved in 120 grams of hot water at 65° C. The quat solution was then added to the mixture in the blender and mixed for about 10 minutes at a blender speed setting of 1. The resulting organoclay/PTFE mixture ("OC/PTFE") was then poured into a jar and allowed to sit for about 30 minutes. The OC/PTFE, which agglomerated at the top of the jar, was separated by filtration, and the solids were dried in an oven for about 24 hours at 65° C. The dried sample was then ground for about 2 minutes in a Bel Art grinding machine.

Preparation of PTFE Dispersions in Mineral Oil

Seven PTFE dispersions in mineral oil, using the OC/PTFE powders obtained in the previous step were prepared according to the proportions provided in Table 12 below:

TABLE 12

Formulations of PTFE in Mineral Oil

| Samples | PTFE (wt %) | OC (wt %) | Mineral Oil (grams) | Acetone (grams) | OC/PTFE* (grams) |
|---|---|---|---|---|---|
| 10 | 100.0 | 0.0 | 160.0 | 0.8 | 3.200[a] |
| 11 | 99.0 | 1.0 | 160.0 | 0.8 | 3.232[b] |
| 12 | 97.5 | 2.5 | 160.0 | 0.8 | 3.282[c] |
| 13 | 95.0 | 5.0 | 160.0 | 0.8 | 3.368[d] |
| 14 | 90.0 | 10.0 | 160.0 | 0.8 | 3.555[e] |
| 15 | 70.0 | 30.0 | 160.0 | 0.8 | 4.572[f] |
| 16 | 50.0 | 50.0 | 160.0 | 0.8 | 6.400[g] |

* PTFE concentration was fixed at 3.2 g PTFE to 160 g mineral oil.
[a]Sample XI from Table 11 was used.
[b]Sample XII from Table 11 was used.
[c]Sample XIII from Table 11 was used.
[d]Sample XIV from Table 11 was used.
[e]Sample XV from Table 11 was used.
[f]Sample XVI from Table 11 was used.
[g]Sample XVII from Table 11 was used.

Containers were first filled with mineral oil and acetone according to the proportions in the above table. The mineral oil/acetone mixtures were then placed in a 1 liter blender and mixed for a few seconds at a speed setting of 2 while the OC/PTFE was added. The total mixture was then mixed for a period of about 2 minutes at the blender speed setting of 7. The samples were then placed in 75 mL test tubes to study the settling rate as a function of organoclay concentration, as described below. A grind gauge test was also performed to check agglomeration and particle size, as described below.

Settling Test for Mineral Oil Dispersions

Figure 9:
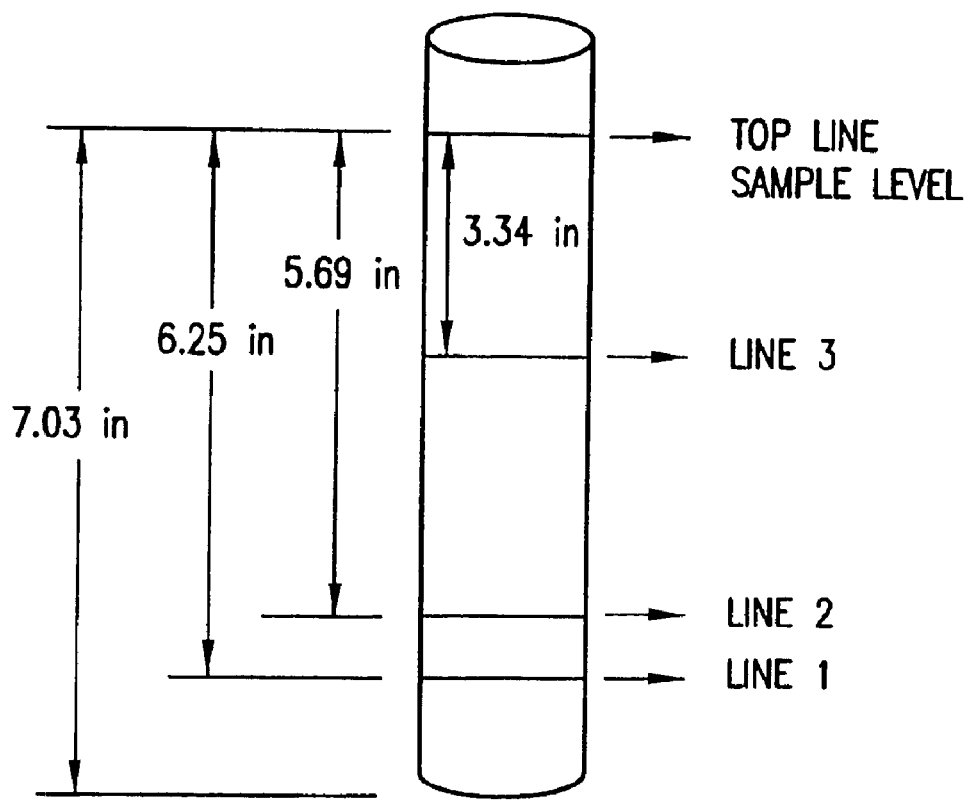
FIG. 9 is an illustration of the test tube used to determine the settling rate for compositions formed according to the present invention.

The seven 75 mL test tubes prepared above were filled to a top line height of 7.03 inches from the bottom of the test tubes. Three additional lines were drawn on each of the test tubes: (i) a first line at about 6.25 inches below the top line height; (ii) a second line at about 5.69 inches below the top line; and (iii) a third line at 3.34 inches from the top line, as illustrated in FIG. 9. The time needed for phase separation, i.e., settling, was observed and recorded by tracking the progress of the top of the white phase from the top line. As the top of the white phase decreased in height, the amount of a clear mineral oil phase increased on top of the white phase. The settling time results are summarized in Table 13 below.

TABLE 13

Settling Time Results

| Sample | PTFE (wt %) | OC * (wt %) | Line 1 (hrs) | Line 2 (hrs) | Line 3 (hrs) | length/time to line 1 (hr) | ratio of settling rate to sample 10 | Comments |
|---|---|---|---|---|---|---|---|---|
| 10 | 100.00 | 0.0 | 0.3472 | n/a | n/a | 18.0029 | 1.00 | Under line 1 |
| 11 | 99.0 | 1.0 | 0.4138 | n/a | n/a | 15.1027 | 1.19 | Under line 1 |

TABLE 13-continued

Settling Time Results

| Sample | PTFE (wt %) | OC * (wt %) | Line 1 (hrs) | Line 2 (hrs) | Line 3 (hrs) | length/time to line 1 (hr) | ratio of settling rate to sample 10 | Comments |
|---|---|---|---|---|---|---|---|---|
| 12 | 97.5 | 2.5 | 0.4417 | n/a | n/a | 14.1509 | 1.27 | Under line 1 |
| 13 | 95.0 | 5.0 | 0.5875 | n/a | n/a | 10.6383 | 1.69 | Under line 1 |
| 14 | 90.0 | 10.0 | 2.688 | 0.69 | n/a | 2.3244 | 7.75 | Under line 1 |
| 15 | 70.0 | 30.0 | — | 5.78 | 46.67 | <0.0166 | 1083.17 | After 361 hours, the top of the white phase was 6 inches below the top line |
| 16 | 50.0 | 50.0 | — | — | — | <<0.0125 | 1444.23 | After 361 hours, the top of the white phase was 4.5 inches below the top line |

* No correction was made for weight loss of byproduct NaCl

Figure 10A:
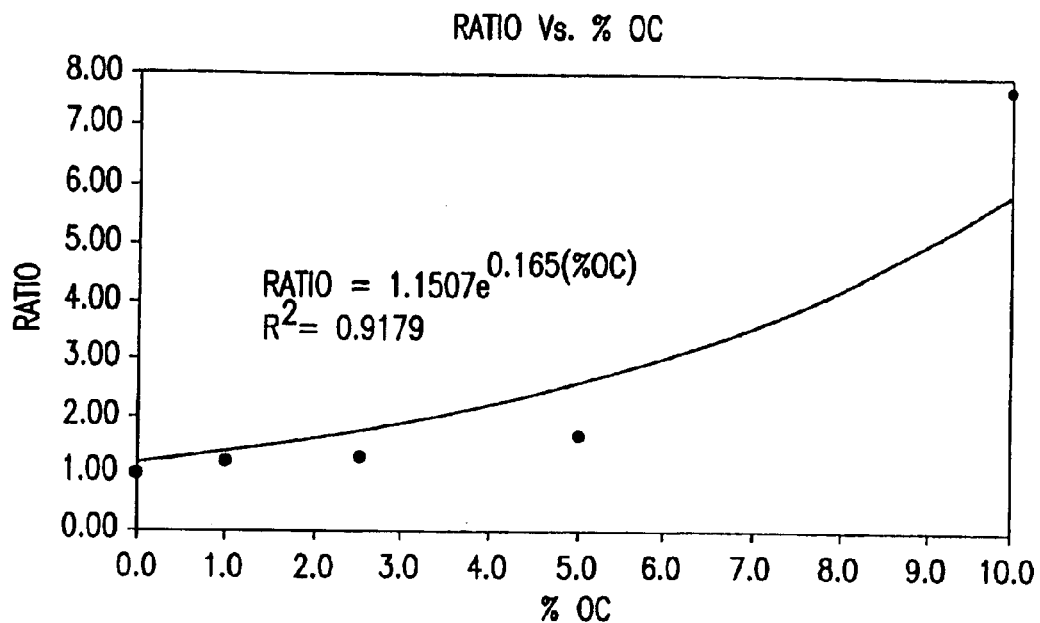
FIGS. 10A and 10B are graphs of the ratio of the settling rate versus the weight percent of organoclay.
Figure 10B:
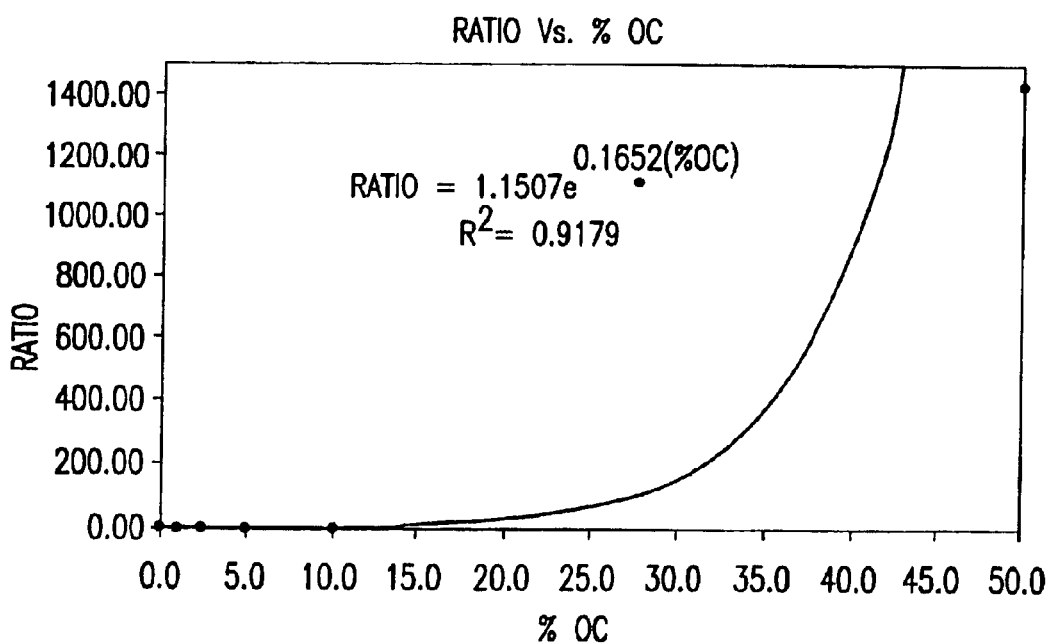

The first and second columns represent the mass % of PTFE and organoclay, respectively, for each sample. The fourth, fifth and sixth columns show the time required for the PTFE and organoclay to settle up to lines 1, 2, and 3, respectively. These results show that as the concentration of organoclay increases the settling rate decreases. In other words, adding more OC to each sample will result in a longer settling time for the PTFE. In fact, the OC/PTFE in Samples 15 and 16 did not even settle to line 1 even after 361 hours (roughly 2 weeks). Graphical illustrations of these results are provided in FIGS. 10A and 10B, which plot the ratio (of the settling rate to Sample 10) versus the organoclay weight percent. Furthermore, the OC/PTFE material of Samples 11–14 "soft settled," meaning that the settled material is readily re-dispersed with gentle mixing of the test tube by hand. In contrast, the material of Sample 10 "hard settled," meaning that the settled material was difficult to redisperse, even after vigorous shaking of the test tube by hand.

Grind Gauge Observations for the Mineral Oil Dispersions

Each sample in Table 13 was shaken by hand right before the grind gauge test was performed. Using a 5-mL plastic pipette, about 2 mL of each sample was placed on top of the grind gauge. The draw down was performed, and the observations were recorded. These observations correspond to samples 10 to 16 from Table 12.

TABLE 14

Observations of Mineral Oil Dispersion under the Grind Gauge

| Sample ID | PTFE (wt %) | OC (wt %) | Observations |
|---|---|---|---|
| 10 | 100.0 | 0.0 | Large quantity of large particles. The particles size were within the range of 0–80 μm on Hegman with many large particles at 80 μm. Hegman grind gauge values of 0–100μ 1½–80μ |
| 11 | 99.0 | 1.0 | Almost clean a few particles at 22 μm. Very few scattered. Particles on Hegman up to 60 μm. |
| 12 | 97.5 | 2.5 | This sample is much better than the previous sample, only a few particles seen. |
| 13 | 95.0 | 5.0 | Clean, no particles observed for both grind gauges (NPRI + Hegman)[1] |
| 14 | 90.0 | 10.0 | Same as sample 13 |

TABLE 14-continued

Observations of Mineral Oil Dispersion under the Grind Gauge

| Sample ID | PTFE (wt %) | OC (wt %) | Observations |
|---|---|---|---|
| 15 | 70.0 | 30.0 | Same as sample 13 |
| 16 | 50.0 | 50.0 | Same as sample 13 |

[1]NPRI is another type of grind gate, wherein a value of 10 means ~25 μm; 8 means ~20 μm, 6 means ~15 μm, 4 means ~10 μm, 2 means ~5 μm, and 0 means ~1 μm.

The results in Table 14 above show that organoclay can help PTFE dispersion in mineral oil even at a low OC weight percent of 1.0. As the concentration of organoclay increases, the particle size decreases, as well as the number of large particle size aggregates (scatter).

Example 6

Dispersion of $TiO_2$ in Mineral Oil

Preparation of Clay Slurry

The clay slurry was prepared as described in Example 2, however a 36×20 Mark III Centrifuge (commercially available from ATM/Delaval Co.) was used after mixing the bentonite clay in water for about 5½ hours. The centrifuge was operated at about 1625 RPM and an air pressure setting of 7 psi, which was previously determined to be the equivalent of 8.85 GPM. It took about 5¾ hours for all of the clear clay slurry to overflow the bowl centrifuge.

The solid weight percent of the bentonite clay was then determined as described in Example 2, however these samples were tested: a 5 gram sample, a 10 gram sample, and a 15 gram sample. The solid clay weight percentage was averaged for the three samples, and was determined to be 2.120%.

Preparation of Organoclay/$TiO_2$

According to previous experiments, it was found that the optimum weight ratio was about 0.7 to 0.8 gram of quat for every gram of clay. A 0.8 g quat to 1 g clay ratio was selected to ensure that adequate quat was present. Using that quat/clay ratio, eight organoclay/$TiO_2$ samples were prepared according to the proportions provided in Table 15 below:

TABLE 15

Formulation of OC/TiO₂

| Sample # | TiO₂ % | OC % | Clay Slurry (gram) | Clay (gram) | Quat (gram) | OC *(gram) | TiO² (gram) | OC/TiO₂ (gram) |
|---|---|---|---|---|---|---|---|---|
| XVIII | 0 | 100 | 500 | 10.6 | 8.48 | 19.08 | 0 | 19.08 |
| XIX | 20 | 80 | 222.22 | 4.711 | 3.769 | 8.48 | 2.12 | 10.6 |
| XX | 40 | 60 | 156.67 | 3.533 | 2.827 | 6.36 | 4.24 | 10.6 |
| XXI | 60 | 40 | 111.11 | 2.356 | 1.9844 | 4.24 | 6.36 | 10.6 |
| XXII | 80 | 20 | 55.56 | 2.12 | 0.942 | 2.12 | 8.48 | 10.6 |
| XXIII | 90 | 10 | 27.78 | 0.589 | 0.471 | 1.06 | 9.54 | 10.6 |
| XXIV | 95 | 5 | 13.89 | 0.294 | 0.236 | 0.53 | 10.07 | 10.6 |
| XXV | 100 | 0 | 0 | 0 | 0 | 0 | 10.6 | 10.6 |

*Not corrected for NaCl by-product

Using the proportions in Table 15 above, Samples XVIII–XXIX were each prepared separately as follows. The clay slurry was placed in a 700 mL beaker and then heated to 60° C. After transferring the heated clay slurry to a Waring blender, titanium dioxide was slowly added to the clay slurry while mixing at a blender speed setting of 6. The titanium dioxide is commercially available in KR 2078 from Kronos, Inc., located in Hightstown, N.J. While the TiO₂/clay mixture was being mixed for about 3 minutes, the appropriate amount of quat, according to the proportions in the above table, was dissolved in 100 grams of hot water at 65° C. The quat solution was then added to the mixture in the blender and mixed for about 5 minutes at a blender speed setting of 4. The resulting organoclay/TiO₂ mixture ("OC/TiO₂") was then poured into a jar and allowed to sit for about 30 minutes. The OC/TiO₂, which agglomerated at the top of the jar, was separated by filtration, and the recovered agglomerate was dried in an oven for about 24 hours at 55° C. The dried sample was then ground for about 2 minutes in a Bel Art grinding machine.

Preparation of TiO₂ in Mineral oil

Five TiO₂ dispersions in mineral oil, using the TiO₂/PTFE powders obtained in the previous step were prepared according to the proportions provided in Table 16 below.

TABLE 16

Formulations of TiO₂ in Mineral Oil

| Sample ID | TiO₂ (wt. %) | OC (wt. %) | Mineral Oil (gram) | Acetone (gram) | OC/TiO₂ (gram) |
|---|---|---|---|---|---|
| 17 | 100 | 0 | 150 | 0.5 | 1.5[a] |
| 18 | 100 | 0 | 150 | 0 | 1.5[b] |
| 19 | 95 | 5 | 150 | 0.5 | 1.5[c] |
| 20 | 90 | 10 | 150 | 0.5 | 1.5[d] |
| 21 | 60 | 40 | 150 | 0.5 | 1.5[e] |

[a]Sample XXV from Table 15 was used.
[b]Sample XXV from Table 15 was used.
[c]Sample XXIV from Table 15 was used.
[d]Sample XXIII from Table 15 was used.
[e]Sample XXI from Table 15 was used.

Five containers were first filled with mineral oil and acetone according to the proportions in Table 16 above. The mineral oil/acetone mixtures were then placed in a Waring blender and mixed for about 1 minute at a blender setting of 2 while the OC/TiO₂ was added. The total mixture was then mixed for a period of about 2 minutes at a blender speed setting of 6. The samples were then placed in separate containers to study the settling rate as a function of organoclay concentration and to perform the Hegman grind gauge test to check agglomeration and particle size. The results and observations are provided in Table 17 below. Pictures were also take at 125× magnification.

TABLE 17

Results and Observations of TiO₂ Dispersions in Mineral Oil

Figure 11A:
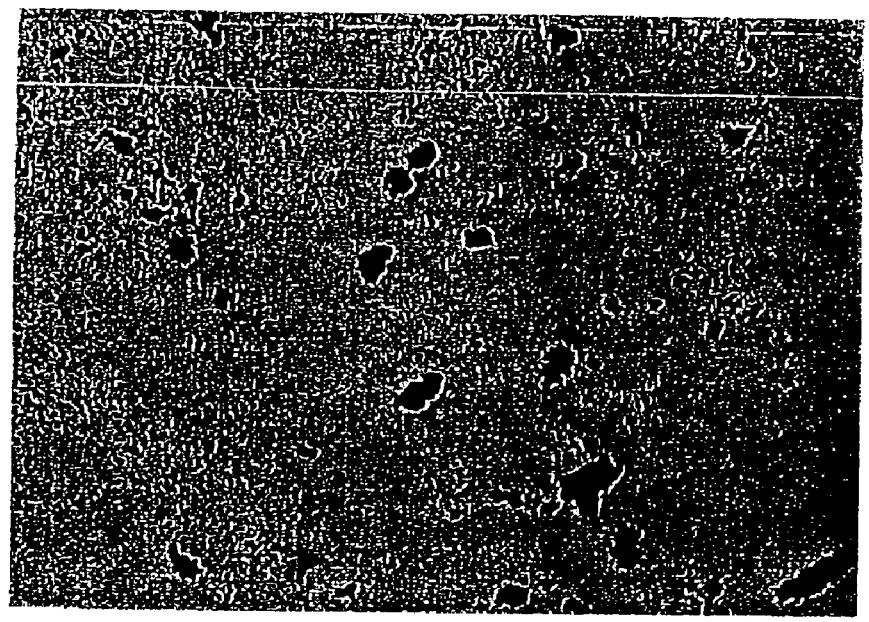
FIGS. 11A to 11E are photographs of $TiO_2$ dispersions in mineral oil.
Figure 11B:
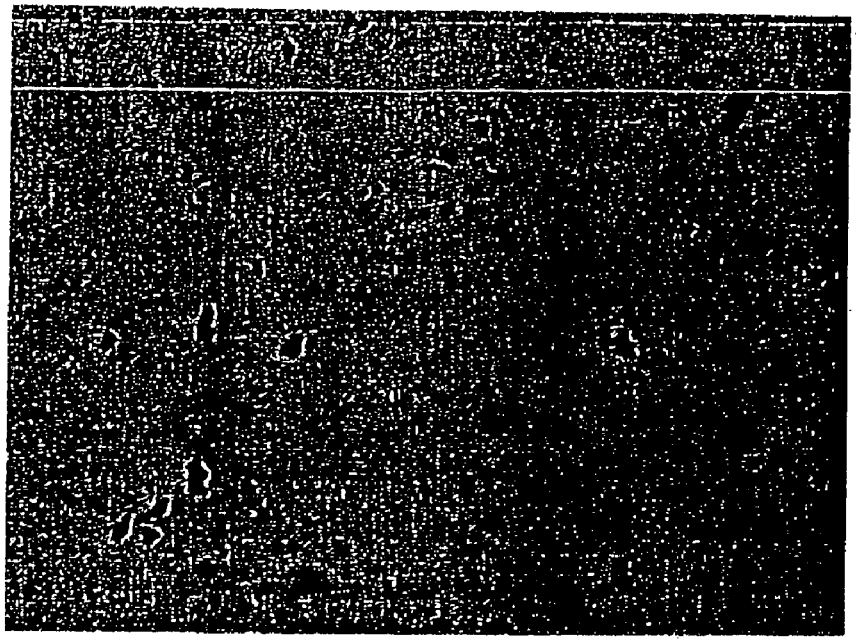
Figure 11C:
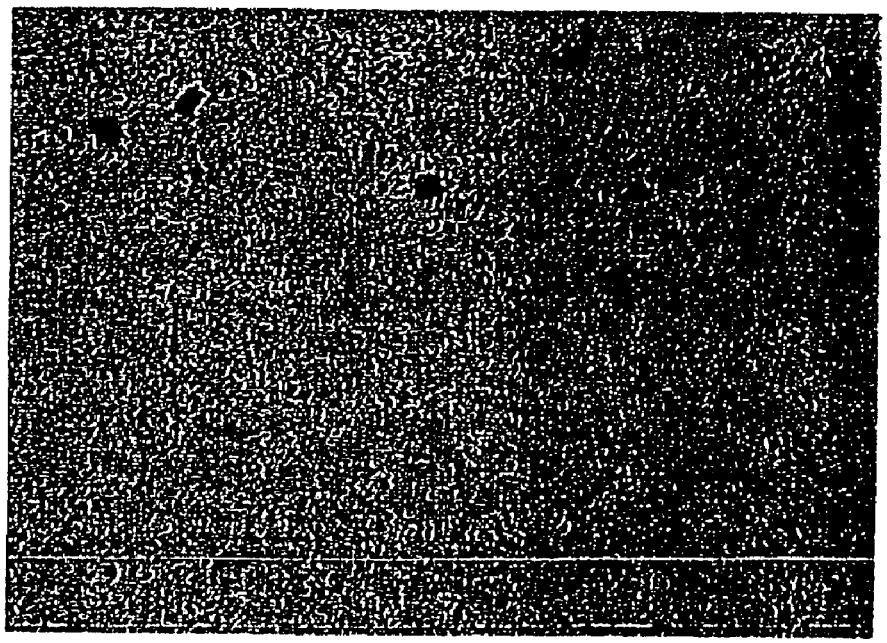
Figure 11D:
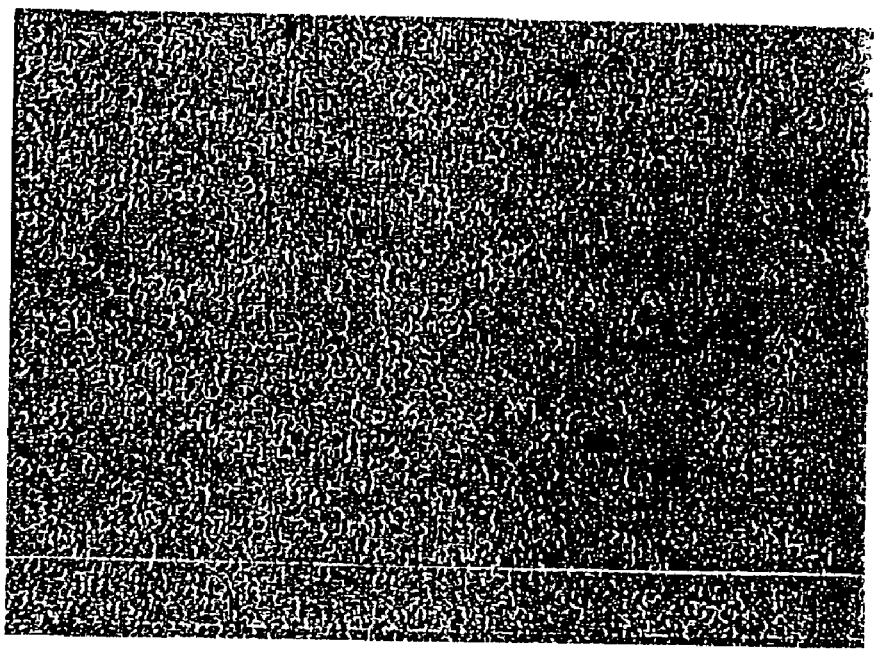

| Sample ID | Visual Observation | Microscopic Observation | Grind gauge Results |
|---|---|---|---|
| 17 | Virtually all of the TiO₂ particles completely settled to the bottom of the container after a few seconds. | A lot of agglomeration could be detected. See FIG. 11A. | Many large particles were present. The Hegman gauge reading was 0 (i.e., >100 micron.) |
| 18 | The sample remained dispersed for about 5 minutes, then settled (around 95% of the sample was settled). | A lot of agglomeration could be detected. See FIG. 11B. | Same as above but the particle sizes were less than the above. |
| 19 | The sample remained dispersed for about ½ hour, after which part of the sample settled (e.g., about 40% settled). | A few specks of agglomeration could be detected. See FIG. 11C. | The Hegman gauge reading was 5 (i.e., about 40 micron) with a very few particles up to 80 micron |
| 20 | The sample remained dispersed for about ½ hour, after which part of the sample settled (e.g., about 40% settled). | A few specks of agglomeration could be detected. See FIG. 11D. | The Hegman gauge reading was 5.5 (i.e., about 35 micron) with a few particles of up to 80 micron. |

TABLE 17-continued

Results and Observations of TiO$_2$ Dispersions in Mineral Oil

Figure 11E:
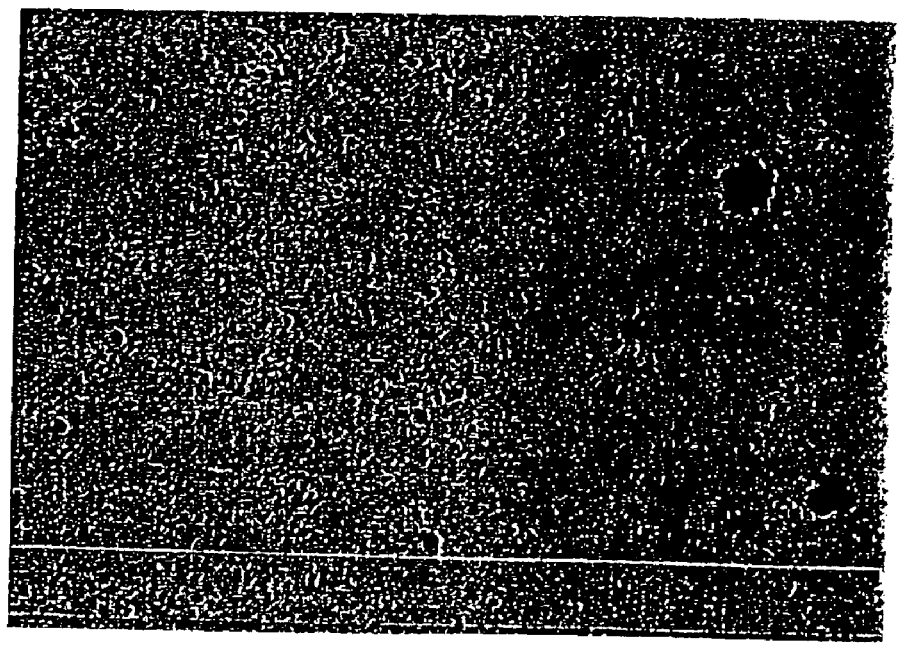

| Sample ID | Visual Observation | Microscopic Observation | Grind gauge Results |
|---|---|---|---|
| 21 | The sample remained dispersed for about ½ hour, after which part of the sample settled (e.g., about 20% settled). | No agglomeration could be detected. See FIG. 11E. | The Hegman gauge reading was 17.5 (i.e., about 4 micron) with 2 particles up to 40 micron. |

The results in Table 17 show that organoclay can help TiO$_2$ dispersion in mineral oil even at a low OC concentration of 5.0% by weight and significant increases TiO$_2$ dispersion at an OC concentration of 40.0% by weight. In fact, as the concentration of OC was increased from 0 to 40% by weight, a corresponding improvement of the Hegman grind gauge reading was observed from 0 to 5.5.

Example 7

Determining Size Profiles of the Clusters and Agglomerates of the Characteristic Use Particles The following four samples were tested using the above-described automatic sieve test for three minutes under vacuum at approximately 14 inches of H$_2$O: (i) a S395 N1 polyethylene sample, (ii) an organoclay/S395 N1 polyethylene sample, (iii) a Powdertex 53 PTFE sample, (iv) and an organoclay/Powdertex 53 PTFE sample. The organoclay/S395 N1 polyethylene sample and the organoclay/Powdertex 53 PTFE sample were respectively prepared according to Example 4 described above, except that the samples were ground in a Waring blender for about 30 seconds at a speed setting of 7. The results of the screening test are provided below in Table 18.

TABLE 18

Screen Test Results for Polyethylene and PTFE

| | S395 N1 Polyethylene[1] (wt. % of sample collected under screen) | Organoclay/S395 N1 Polyethylene[1] (wt. % of sample collected under screen) |
|---|---|---|
| 1 Min, | 26.0% | 97.6% |
| 2 Min, | 33.0% | 99.2% |
| 3 Min | 40.0% | 99.6% |

| | Powdertex 53 PTFE[2] (wt. % of sample collected under screen) | Organoclay/Powdertex 53 PTFE[2] (wt. % of sample collected under screen) |
|---|---|---|
| 1 Min, | 28.0% | 92.3% |
| 2 Min, | 34.0% | 95.6% |
| 3 Min | 41.0% | 96.6% |

[1] A #230 mesh size screen was used.
[2] A #50 mesh size screen was used.

As provided in Table 18 above, both organoclay/Polyethylene and organoclay/PTFE reflect a dramatic improvement in screening rate (e.g., wt. % collected underneath the screen per total time of screening) in comparison to pure PE and PTFE as indicated in the first minute. Without wanting to be limited by any one theory, it is believed that this data reflects the decreased size and occurrence of clusters and/or agglomerates of the PTFE and polyethylene particles resulting from the addition of organoclay.

The same four samples were tested in the Malvern particle size analyzer, as described above. The results are provided below in Table 19:

TABLE 19

Malvern Particle Size Results for Polyethylene and PTFE

| Sample | Volume Weighted Mean ($\mu$m) |
|---|---|
| S395 N1 Polyethylene | 10.776 |
| Organoclay/S395 N1 PE | 7.235 |
| Powdertex 53 PTFE | 189.277 |
| Organoclay/Powdertex 53 PTFE | 86.043 |

As provided in Table 19, the Malvern analysis provides a significant decrease in the volume weighted mean size of the clusters and/or agglomerates of the samples having organoclay compared to the pure samples of Powdertex 53 PTFE and S395 N1 polyethylene. These results are in accordance with the screen test results provided in Table 18.

Example 8

Dispersion of Hydrous Oxide/PTFE in Water

About 5 grams of TiOSO$_4$ are dissolved in about 100 mL of aqueous, 1N H$_2$SO$_4$ at 25° C. in a small beaker. Concurrently, about 3.42 grams of SST-4 type PTFE (commercially available from Shamrock Technologies) is added to 250 mL of hot water at about 90° C. in another beaker. While stirring rapidly, the solution of TiOSO$_4$ and H$_2$SO$_4$ is slowly added to the 250 mL of hot PTFE/water mixture over a period of about 60 seconds. Two minutes after the addition is completed, the mixture is filtered to recover the precipitated hydrous titanium dioxide having the entrapped PTFE ("the composite"). This composite is about a 50/50 mixture of PTFE physically entrapped in the hydrous oxide, because hydrous oxides can contain a variable amount of water.

Before drying, the composite can then be further processed to improve dispersion in the target media. For example, the composite can be peptized before adding the composite to a hydrophillic target medium. This can be done by rapidly stirring into the composite obtained above about 250 mL of 0.05 N aqueous HCl, wherein the hydrous titanium dioxide is peptized by the dilute acid solution.

Example 9

Preparation of Carbon Black/Organoclay Compositions

After removing impurities from about 5 gallons of clay as provided in Example 6, 500 mL of clean clay slurry containing 2.12% by weight solids is heated to 65° C. After transferring the heated clay slurry to a Waring blender, 53 grams of pigment grade carbon black (commercially available from Cabot Corporation) is slowly added to the clay slurry while mixing at a blender speed setting of 7. While the carbon black/clay mixture is mixed for about an additional 5 minutes, a quat solution is separately prepared by adding 7.42 grams of dry 2M2HT quat (commercially available from Witco Corp. as Adogen 442-100P) to 125 mL water at about 65° C. and mixing for about 5 minutes. The quat solution is then added to the carbon black/clay mixture in the blender and mixed for about an additional 10 minutes at a blender speed setting of 4. The resulting organoclay/carbon black mixture ("OC/CB") is then poured into a jar and allowed to sit for about 30 minutes. The agglomerated OC/CB is separated by filtration, washed with about 250 mL of water at about 65° C., and the recovered agglomerate is dried in an oven for about 24 hours at about 60° C. The dried sample can then be ground into powder form.

Example 10

Preparation of Calcium Carbonate/Organoclay Compositions

After removing impurities from about 5 gallons of clay as provided in Example 6, 500 mL of clean clay slurry containing 2.12% by weight solids is heated to 65° C. After transferring the heated clay slurry to a Waring blender, 126.14 grams of calcium carbonate (commercially available from Omya, Inc. as omyacarb 3) is slowly added to the clay slurry while mixing at a blender speed setting of 7. While the carbon black/clay mixture is mixed for about an additional 5 minutes, a quat solution is separately prepared by adding 7.42 grams of dry 2M2HT quat (commercially available from Witco Corp. as Adogen 442-100P) to 125 mL water at about 65° C. and mixing for about 5 minutes. The quat solution is then added to the calcium carbonate/clay mixture in the blender and mixed for about an additional 10 minutes at a blender speed setting of 4. The resulting organoclay/ calcium carbonate mixture ("OC/CC") is then poured into a jar and allowed to sit for about 30 minutes. The agglomerated OC/CC is separated by filtration, washed with about 250 mL of water at about 65° C., and the recovered agglomerate is dried in an oven for about 24 hours at about 60° C. The dried sample can then be ground into powder form.

Example 11

Preparation of Submicron PTFE/Organoclay Compositions

Submicron PTFE in IPA was formulated as follows. White virgin paste (WVP) PTFE, irradiated by an electron beam at 28 megarads was gently added to IPA at a concentration of 25% while mixing. Using a horizontal mill with 0.6 to 0.8 mm diameter beads, the mixture of irradiated PTFE and IPA was ground at a speed of 3500 RPM. To avoid settling, the mixture of irradiated PTFE and IPA was constantly mixed. After 5 passes of grinding, 100% of the particles had a particle size of less than 0.5 μm. It is generally expected that the dispersion will be completely submicron after 7 to 10 passes of grinding. Particle size analysis data for the PTFE/IPA dispersion are shown in FIGS. 14A and 14B.

Pure submicron PTFE powder was formulated as follows. To three gallons of hot water (60° C.), 1600 grams of the submicron PTFE/IPA dispersion formed above was gently added and mixed for 15 minutes. The mixture was then allowed to sit for 30 minutes. During this time, the PTFE floated to the top of the water/IPA mixture. The PTFE was then removed to an aluminum tray and dried in an oven at approximately 60° C. The remaining water/IPA mixture was filtered using a #1 filter paper and an air vacuum or water vacuum. Particle size analysis was performed on the pure submicron PTFE powder product, and the particle size analysis data for the submicron PTFE powder are shown in FIGS. 12A and 12B.

Submicron PTFE in IPA-Quat was formulated as follows. The mixture of PTFE in IPA/Quat comprised 25% White Virgin Paste (WVP) PTFE that had been irradiated at 28 megarads, 73% IPA, and 2% Quat, wherein the Quat used was 2M2HT, described in the above Examples. The Quat was first dissolved in the IPA, and the PTFE was gently added to the IPA/Quat mixture while mixing. A horizontal mill was used to grind the PTFE in IPA/Quat mixture while constantly mixing. The particle size was checked after 5 passes of grinding and was found to be less than 0.5 μm. The particle size results for the mixture of PTFE, IPA and Quat are shown in FIGS. 15A and 15B. The procedure for filtering and drying the submicron PTFE is as described above.

Lastly, the submicron PTFE/organoclay powder composition was produced as follows. For preparation of submicron clay in water, a 20% white clay slurry was ground in a horizontal mill. The particle size was checked after 15 minutes. The clay particles will normally be of micron size after about 25–30 minutes.

The amount of clay to be added to the mixture of IPA, Quat and submicron PTFE was calculated to be in a ratio of one part solid clay to 0.4 part of Quat. To three gallons of hot water (60° C.), the clay was added slowly and mixed at high speed. Then, 1500 grams of the submicron PTFE-IPA-Quat mixture formed above was gently added while constantly mixing. The solution was mixed for 15 minutes. After mixing, the solution was allowed to sit for 30 minutes. The wet organoclay/PTFE mixture was then filtered and washed with warm water, followed by drying in oven at a maximum temperature of 60° C. The PTFE/organoclay composition was air milled.

The concentration of the final submicron PTFE/ organoclay composition was determined to be 21.87% organoclay and 78.13% PTFE. Particle size analysis was performed on the dried PTFE/organoclay composition, wherein the dispersant (or the target medium) for dispersing the PTFE/organoclay composition was IPA. The particle size results for the dispersion of submicron PTFE/organoclay in IPA are shown in FIGS. 13A and 13B. These results showed the mean particle size value to be 1.642 μm and showed that 72.74% of the particles were below 1.00 μm in size. Thus, this Example shows that submicron PTFE is suitable for use as an effective characteristic use particle to be entrapped in a physical entrapment phase, such as an organoclay, and thereby easily dispersed into various target media.

Example 12

Preparation of Reactor Latex PTFE/Organoclay Compositions

In the present Example, PTFE in its reactor latex form was used as the characteristic use particle, while organoclay was used as the physical entrapment phase. As described earlier, "PTFE in its reactor latex form" simply denotes a suspension, in water, of PTFE particles in their primary particle size, which results from the synthesis of PTFE via an emulsion polymerization process. Specifically, the reactor latex PTFE used in this Example was a product obtained from Daikin. First, the overall percent solids concentration of the PTFE reactor latex sample was determined. This was done using a Computrac Max 1000 Moisture Analyzer (commercially available from Arizona Instruments). It was determined that the PTFE reactor latex sample used in this Example had a solids content of 25.0%.

Next, particle size analysis was performed on a sample of the PTFE in its reactor latex form. The particle size analysis employed the Malvern Mastersizer 2000 particle size analyzer and the Malvern method described in detail above. Specifically, a sample of the reactor latex PTFE was dispersed in IPA, and particle size results showed the mean particle size value to be 0.201 µm, while 100.00% of the PTFE particles were shown to be below 1.00 µm in size. A graph of the particle size distribution for this sample of PTFE in its reactor latex form is shown as FIG. 16. These results simply indicate to the user that the sample of reactor latex PTFE is readily dispersible, since 100% of the particles dispersed to submicron size, thus indicating a low level of agglomeration.

Subsequently, bentonite clay slurry was formed as described in Example 2 above. Particle size analysis of the bentonite clay slurry showed the mean particle size value of the clay particles to be about 2.2 µm. A small sample of this bentonite clay slurry kept at room temperature was then added to a small sample of the reactor latex PTFE. Particle size analysis of the reactor latex PTFE/clay was performed using the Malvern method, and the results showed the mean particle size value of the particles in the composition to be 1.887 µm, while 10.74% of the particles were below 1.00 µm in size. A graph of the particle size distribution for this sample of the reactor latex PTFE/clay is shown as FIG. 17. In this graph, a small peak is observed below 1 µm, which represents the particle size peak for the PTFE particles, while the larger peak above 1 µm represents the clay particles.

A small sample of the reactor latex PTFE was then combined with a sample of warm dissolved Quat. Herein, the Quat used was Adogen 442, described above. Particle size analysis was then performed for the PTFE/Quat mixture, and a graph of the particle size distribution for this composition is shown as FIG. 18. These particle size analysis results indicated that the mean particle size value of the PTFE/Quat mixture was 20.825 µm, and 0.00% of the particles were below 1.00 µm in size. Thus, these results indicated that the reactor latex PTFE experienced some agglomeration when combined with the warm dissolved Quat.

After the above preliminary analyses were performed, the method of the present invention was employed to combine PTFE in its reactor latex form (as the characteristic use particle) with organoclay (acting as the physical entrapment phase) and then determine the dispersibility of the resulting reactor latex PTFE/organoclay compositions in a target medium. The samples of organoclay were formed having varying clay/Quat ratios so that the effects of varying the clay/Quat ratio on the resulting reactor latex PTFE/organoclay compositions and their dispersibility could be examined.

All of the PTFE/organoclay compositions in the remainder of this Example were 50/50 reactor latex PTFE/organoclay compositions. The Clay/Quat ratios used included: 1:0.6, 1:0.8, 1:1, 1:1.2, and 1:1.4. The 50/50 PTFE/organoclay composition having a Clay/Quat ratio of 1:0.6 was prepared according to the following procedure: about 30 grams of PTFE in its reactor latex form were weighed. As noted above, the percent solids in the sample of reactor latex PTFE used herein was about 25%, so the 30 grams of PTFE reactor latex comprised about 7.5 grams of solid PTFE particles. The weighed PTFE reactor latex material was placed in a 500 mL glass beaker and was allowed to stir gently using a magnetic stirring bar on a Corning hot plate with no heat. To this sample of reactor latex PTFE, 166.67 grams of Bentonite L-400 clay slurry were added. The 166.67 gram sample of the clay slurry comprises about 4.69 grams of solid clay. The reactor latex PTFE and the clay slurry were allowed to mix for several minutes with no heating.

In a separate 250 mL glass beaker, 2.81 grams of Quat, specifically, Adogen 442 Quat, was dissolved in about 50 grams of water. From the 4.69 grams of solid clay mentioned above and the 2.81 grams of Quat used, the Clay/Quat ratio of about 1:0.6 was determined. The mixture of Quat and water was stirred using a stirring bar, and was heated to about 140° F. on a Corning hot plate. When the Quat was completely dissolved, it was added slowly to the reactor latex PTFE/clay slurry mixture, and the resulting mixture was gradually heated to about 150° F. under gentle stirring. This mixture was allowed to react for about 45 minutes, after which it was removed from the hot plate and allowed to stand for 20 minutes. The resulting composition was a 50/50 reactor latex PTFE/organoclay composition having a Clay/Quat ratio of 1:0.6.

Similar procedures were employed for the 50/50 PTFE/organoclay compositions having Clay/Quat ratios of 1:0.8, 1:1, 1:1.2, and 1:1.4, wherein only the amount of Quat dissolved was changed to create compositions having these varying Clay/Quat ratios.

The reactor latex PTFE/organoclay compositions were first analyzed to determine each position's filtration time. In this analysis, a small Buchner funnel was loaded with the same filtration media present on the pilot-plant Straight Line Belt Filter. A 100-gram well-mixed sample of each of the reactor latex PTFE/organoclay compositions described above was then filtered. Each filtration was performed under full vacuum conditions for consistency, and the filtration times for each sample were recorded in Table 20 below:

TABLE 20

Filtration Data for Reactor Latex PTFE/Organoclay Compositions at Varying Clay/Quat Ratios

| Clay/Quat Ratio | Filtration Time (seconds) | Filter Cake Cracking Time (seconds) |
| --- | --- | --- |
| 1:0.6 | 25 | 35 |
| 1:0.8 | 45 | 55 |
| 1:1.0 | 56 | 113 |
| 1:1.2 | 58 | 100 |
| 1:1.4 | 54 | 110 |

These results show that there is a direct relationship between the ease of filtration and the amount of Quat used in the organoclay. As the amount of Quat used in the organoclay increases, the filtration time generally increases.

Following the filtration analysis described above, the remainder of each of the 50/50 reactor latex PTFE/organoclay compositions having the varying Clay/Quat ratios was filtered using a large Buchner funnel and allowed to dry in an oven at a temperature of about 50° C. The dried filter cake from each sample was then milled, and a dry powder form of each of the 5 reactor latex PTFE/organoclay compositions resulted. The resulting dry powder products were then analyzed visually for each sample's characteristics, and those results are shown in Table 21 below:

TABLE 21

Visual Observations of Reactor Latex PTFE/Organoclay Dry Powder Products Having Varying Clay/Quat Ratios

| Clay/Quat Ratio | Product Characteristics | Overall Score (1 = Best, 5 = Worst) |
| --- | --- | --- |
| 1:0.6 | Easily compacts/fibrillates | 5 |
| 1:0.8 | Tendency to compact/fibrillate | 3 |
| 1:1.0 | Tendency to compact/fibrillate | 4 |
| 1:1.2 | Powder more free-flowing | 2 |
| 1:1.4 | Powder more free-flowing | 1 |

The above results show that as the amount of Quat in the organoclay increases, the quality of the reactor latex PTFE/organoclay composition generally increases and the free-flowing nature of the resulting powder markedly increases. Thus, by examining the results shown in Tables 20 and 21 above, it is evident that an appropriate balance must be achieved with regard to the optimal Clay/Quat ratio to use when working with PTFE in its reactor latex form as the characteristic use particle. This balance is needed because although an increase in the amount of Quat used tends to increase the free-flowing characteristics of the resulting powder, this same increase in the amount of Quat tends to make filtration of the reactor latex PTFE/organoclay composition more time consuming. Thus, for example, one might select 1:0.8 as an optimal Clay/Quat ratio when using PTFE in its reactor latex form as the characteristic use paerticle because the corresponding filtration time would be considered an acceptable filtration time under typical belt filter processing conditions used in common manufacturing processes.

After the reactor latex PTFE/organoclay compositions described above were visually observed for their free-flowing characteristics, the compositions were dispersed in a target medium, specifically mineral oil. Subsequently, particle size analysis was performed to determine how well each of the compositions dispersed in the mineral oil. The particle size analysis was performed using the Malvern method (described in detail above) and the Malvern Mastersizer 2000 particle size analyzer.

For the reactor latex PTFE/organoclay composition having a Clay/Quat ratio of 1:0.6, the mean particle size value when dispersed in mineral oil was found to be 0.467 $\mu$m, and 93.77% of the particles in the sample were below 1.00 $\mu$m in size. A particle size distribution graph for this sample is shown as FIG. 19. Note that 2 peaks occur in FIG. 19, one at about 0.2 $\mu$m, which signifies the particle size distribution for the PTFE particles, and one at about 0.6 $\mu$m, which signifies the particle size distribution for the organoclay particles. The 2 peaks, or the bimodal particle size distribution of the reactor latex PTFE/organoclay composition, show that the organoclay truly acts as a "physical" entrapment phase (i.e., as opposed to a chemical entrapment phase), since the organoclay particles and PTFE particles disperse into the mineral oil and create 2 distinct peaks or ranges of particle size.

For the reactor latex PTFE/organoclay composition having a Clay/Quat ratio of 1:0.8, the mean particle size value when dispersed in mineral oil was found to be 0.452 $\mu$m, and 94.81% of the particles in the sample were below 1.00 $\mu$m in size. A particle size distribution graph for this sample is shown as FIG. 20.

For the reactor latex PTFE/organoclay composition having a Clay/Quat ratio of 1:1.0, the mean particle size value when dispersed in mineral oil was found to be 0.426 $\mu$m, and 96.00% of the particles in the sample were below 1.00 $\mu$m in size. A particle size distribution graph for this sample is shown as FIG. 21.

For the reactor latex PTFE/organoclay composition having a Clay/Quat ratio of 1:1.2, the mean particle size value when dispersed in mineral oil was found to be 0.445 $\mu$m, and 94.97% of the particles in the sample were below 1.00 $\mu$m in size. A particle size distribution graph for this sample is shown as FIG. 22.

For the reactor latex PTFE/organoclay composition having a Clay/Quat ratio of 1:1.4, the mean particle size value when dispersed in mineral oil was found to be 0.434 $\mu$m, and 95.42% of the particles in the sample were below 1.00 $\mu$m in size. A particle size distribution graph for this sample is shown as FIG. 23. Note that FIGS. 20–23 showed the same bimodal particle size distribution described above in conjunction with FIG. 19, as evidenced by the 2 peaks present in each of FIGS. 20–23. Again, this bimodal particle size distribution shows that the method and resulting compositions of the present invention involve physical entrapment of the characteristic use particles as opposed to chemical bonding or entrapment. In general, the results of this Example and of FIGS. 19–23 show that all 5 of the reactor latex PTFE/organoclay compositions experienced excellent dispersibility in mineral oil as the target medium, even though the Clay/Quat ratios were varied for the compositions.

Example 13

Dispersion of Reactor Latex PTFE/Organoclay Compositions in IPA

In the present Example, PTFE in its reactor latex form was again used as the characteristic use particle, and organoclay was again used as the physical entrapment phase. The purpose of this Example was to prepare reactor latex PTFE/organoclay compositions at varying concentrations of reactor latex PTFE and then examine the dispersibility of the resulting reactor latex PTFE/organoclay compositions using IPA as the target medium. Specifically, reactor latex PTFE/organoclay compositions having concentrations of 75/25 organoclay/PTFE, 50/50 organoclay/PTFE, and 25/75 organoclay/PTFE were prepared. These three reactor latex PTFE/organoclay compositions were prepared as described in Example 12 above, with the only variation being the concentrations of organoclay/PTFE of 75/25, 50/50, and 25/75, respectively.

The resulting dry powder organoclay/PTFE compositions were dispersed in IPA as the target medium and underwent particle size analysis using the Malvern method described above and the Malvern Mastersizer 2000 particle size analyzer. A particle size distribution graph for the 75/25 organoclay/PTFE composition dispersed in IPA is shown as FIG. 24, wherein the mean particle size value was found to be 0.999 $\mu$m and wherein 64.96% of the particles were shown to be below 1.00 $\mu$m in size. For the 50/50 organoclay/PTFE composition dispersed in IPA, the particle size distribution graph included as FIG. 25 showed the mean particle size value to be 0.471 $\mu$m and showed that 92.24% of the particles were below 1.00 $\mu$m in size. In addition, the particle size distribution graph for the 25/75 organoclay/PTFE composition dispersed in IPA is included as FIG. 26, wherein the mean particle size value was found to be 0.937 $\mu$m and wherein 65.40% of the particles were below 1.00 $\mu$m in size.

FIGS. 24–26 show the bimodal particle size distribution discussed above, illustrating, once again, the physical nature of the entrapment phase served by the organoclay particles. In addition, in each of FIGS. 24–26, the peak representing the particle size distribution for the PTFE particles (the peak on the left side of each graph) is well below 1.00 $\mu$m, showing that the goal of the present invention, successfully dispersing a characteristic use particle such as reactor latex PTFE in a target medium such as IPA, was achieved by using organoclay as the physical entrapment phase in these compositions.

Example 14

Preparation of Reactor Latex PTFE/Organoclay Compositions and Subsequent Irradiation of Compositions In the present Example, PTFE in its reactor latex form was again used as the characteristic use particle of choice, while organoclay was again used as the physical entrapment phase. The purpose of this Example was to examine the embodiments of the present invention wherein reactor latex PTFE/organoclay compositions formed according to the present method may be irradiated, using an electron beam, and then dispersed into various target media.

First, in this Example, a 50/50 organoclay/PTFE composition was formed according to the procedure described in detail in Example 12 above.

As described in Example 12 above, the resulting 50/50 organoclay/PTFE composition was filtered using a Buchner funnel and allowed to dry in an oven at a temperature of about 50° C. The dried filter cake was then milled, and a dry powder form of the 50/50 reactor latex PTFE/organoclay composition resulted.

A sample of this dry 50/50 PTFE/organoclay composition (without any irradiation) was dispersed in mineral oil and underwent particle size analysis. The particle size analysis performed herein employed the Malvern method described above and the Malvern Mastersizer 2000 particle size analyzer. Specifically, for particle size analysis, the samples in this Example were prepared by placing 2% by weight of the formed 50/50 organoclay/PTFE reactor latex composition in 98% by weight mineral oil. (The mineral oil used herein was Magiesol.) In addition, IPA in the amount of 20% of the organoclay weight was added to each sample, and each sample was then blended in a Waring blender at speed 6 for about 2 minutes. The PTFE Wet SOP described in detail above was the Standard Operating Procedure used for the particle size analysis.

The particle size distribution graph for the unirradiated sample of 50/50 organoclay/PTFE is included as FIG. 19, and the particle size data showed the mean particle size value to be 0.467 $\mu$m and showed that 93.77% of the particles in the sample were below 1.00 $\mu$m in size. As described earlier, the graph in FIG. 19 shows a bimodal particle size distribution in that 2 distinct peaks are shown, where the peak on the left represents the particle size distribution of the PTFE particles and the peak on the right represents the particle size distribution of the organoclay particles.

Subsequently, samples of the dry 50/50 reactor latex PTFE/organoclay composition formed as described above underwent irradiation at doses of 7 megarads, 14 megarads, and 28 megarads, respectively. This irradiation was performed using electron beam irradiation. After irradiation, each of the samples was tested for particle size by being dispersed into mineral oil according to the detailed procedure above. The particle size analysis measurements were taken for each sample. For the sample of reactor latex PTFE/organoclay irradiated at 7 megarads, the particle size distribution graph is shown as FIG. 27, where the mean particle size value was found to be 73.964 $\mu$m, and wherein 8.19% of the particles were below 1.00 $\mu$m in size. The graph of FIG. 27 shows the bimodal particle size distribution described above, wherein 2 distinct peaks are apparent for the PTFE particles and the organoclay particles.

For the sample of reactor latex PTFE/organoclay irradiated at 14 megarads, the particle size distribution graph is included as FIG. 28, wherein the mean particle size value was found to be 104.657 $\mu$m, and wherein 8.76% of the particles were below 1.00 $\mu$m in size. Again, a bimodal particle size distribution was observed.

For the sample of reactor latex PTFE/organoclay irradiated at 28 megarads, the particle size distribution graph of is included as FIG. 29, wherein the mean particle size value of the particles was found to be 58.176 $\mu$m, and wherein 17.75% of the particles were found to be below 1.00 $\mu$m in size. Similarly to the graphs described above, a bimodal particle size distribution was observed.

By comparing the 3 particle size distribution graphs shown in FIGS. 27–29, these results showed that as the intensity of the irradiation was increased to 28 megarads, the volume percentage of the first peak (the peak on the left side of each graph that represents the distribution of the PTFE particles) greatly increased, thereby showing enhanced dispersibility of the PTFE as the level of irradiation increased.

Visual observations of the 3 samples (irradiated at 7, 14, and 28 megarads, respectively) also showed that the flowability of the organoclay/PTFE compositions increased as the dosage of irradiation increased, while the stickiness of the samples (and therefore the ability of the samples to clump or agglomerate) decreased significantly with increasing irradiation dosage.

Further qualitative observations were performed to determine the effects of the irradiation on the PTFE/organoclay products. In these observations, a small amount (about 1 gram) of each of the samples was individually placed in the palm of the user's hand. Using a finger from the opposite hand, the user spread the powder around using a circular motion, while gently pressing down as the organoclay/PTFE powder composition moves between the palm and the finger. The shearing force produced between the palm and the finger caused the unirradiated sample of the 50/50 organoclay/PTFE powder composition to fibrillate, ball up and exhibit stickiness. However, the samples of the 50/50 organoclay/PTFE powder compositions that had been irradiated retained most of their original free-flowing characteristics described above and did not tend to fibrillate. Additionally, the quality of the PTFE/organoclay compositions (as observed in this qualitative rubbing test) increased as the intensity of the irradiation increased from 7 to 14 and finally to 28 megarads. Thus, the present Example shows that in embodiments where PTFE in its reactor latex form is chosen as the characteristic use particle, the PTFE/organoclay compositions formed may be irradiated and exhibit good dispersibility in various target media.

Example 15

Preparation of Reactor Latex PTFE/Organoclay Compositions Using Laponite As the Clay In this Example, PTFE in its reactor latex form was again used as the characteristic use particle, and organoclay was used as the physical entrapment phase. A 60/40 organoclay/PTFE composition was prepared according to the detailed procedure in Example 12 above, except that the organoclay/PTFE concentration was changed from 50/50 to 60/40 and the clay used in the present Example was Laponite rather than bentonite. Specifically, Laponite RD is a synthetic clay, commercially available from Southern Clay Products, which generally has a smaller particle size than bentonite clay. The Clay/Quat ratios for the samples formed in this Example varied from 1:0.3 to 1:1.5. Qualitative analyses were done, and it was determined that the optimal Clay/Quat ratio for Laponite clay is 1:0.7. Generally, the reactor latex PTFE/organoclay compositions formed with Laponite clay exhibited less stickiness than those formed with the other clays studied. Furthermore, because Laponite has a smaller particle size relative to certain other clays, it was contemplated that in embodiments where Laponite is the clay of choice, the concentration of the organoclay (in relation to the concentration of PTFE) may be significantly reduced. This is because the smaller particle size of Laponite clay leads to the clay having a higher amount of exposed surface area that is available to act as part of the physical entrapment phase and that therefore keeps the characteristic use particles dispersed in the target medium.

The results of Examples 12–15 show that PTFE in its reactor latex form may be chosen as a characteristic use particle according to the method of the present invention and may experience the benefits of being entrapped in a physical entrapment phase, such as an organoclay. The reactor latex PTFE generally experiences enhanced dispersibility in various target media, such as organic systems, when it is combined with organoclay as the physical entrapment phase, as contemplated by the present invention. Furthermore, the primary particle size of the PTFE particles is retained as the reactor latex PTFE is incorporated into a physical entrapment phase such as organoclay. Also, the organoclay/PTFE compositions made using PTFE in its reactor latex form as the characteristic use particle generally exhibit low levels of agglomeration when dispersed in various target media, exhibit low levels of stickiness, and are free-flowing in nature.

What is claimed is:

1. A process for manufacturing a composition that is capable of being dispersed in a target medium, comprising:
    A. mixing a physical entrapment phase precursor with a characteristic use particles in a processing medium in which the precursor is dispersible, wherein the characteristic use particles have native sizes and native features;
    B. converting the precursor into a physical entrapment phase which is not dispersible in said processing medium, thereby entrapping the characteristic use particle within the physical entrapment phase; and
    C. separating the physical entrapment phase having the characteristic use particles entrapped therein from the processing medium to obtain said composition, wherein when the composition is dispersed in the target medium a substantial number of the physically entrapped characteristic use particles are released from the composition, whereby the released characteristic use particles exhibit substantially their original native sizes and native features in the target medium.

2. The process according to claim 1 further comprising drying the composition and grinding the dried composition.

3. The process according to claim 1, wherein the precursor is converted into the physical entrapment phase by adding a triggering agent to the processing medium.

4. The process according to claim 3, wherein the physical entrapment phase comprises a plurality of physical entrapment particles.

5. The composition according to claim 4, wherein the number ratio of physical entrapment phase particles to characteristic use particles is greater than or equal to about 10:1.

6. The process according to claim 4, wherein
    said process medium is hydrophillic;
    said physical entrapment phase precursor is a smectite clay; and and
    said triggering agent is one or more organic cations.

7. The process according to claim 6, wherein
    said clay is selected from the group consisting of montmorillonite, bentonite, beidellite, hectorite, saponite, stevensite, and mixtures thereof;
    said organic cation has a formula

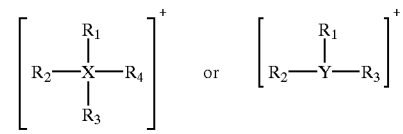

wherein X is nitrogen or phosphorus, Y is sulfur, $R_1$ is a long chain, linear or branched, saturated or unsaturated alkyl group and $R_2$, $R_3$ and $R_4$ can be independently selected from the group consisting of linear or branched alkyl groups, aralkyl groups which are benzyl and substituted benzyl moieties including fused ring moieties having 1 to 22 carbon atoms linear or branched 1 to 22 carbon atoms in the alkyl portion of the structure; aryl groups; beta, gamma-unsaturated groups having six or less carbon atoms or hydroxyalkyl groups having two to six carbon atoms; and hydrogen; and
    said characteristic use particle is a polymer selected from the group consisting of resins, binders, metal oxides, pigments, extenders, dyes, film forming agents, anti-corrosive agents, matting/flattening agents, rheological modifiers, biocides, inorganic fillers, flow modifiers, and mixtures thereof.

8. The process according to claim 7, wherein said characteristic use particle is selected from the group consisting of polytetrafluoroethylene (PTFE), polyethylene (PE), polypropylene (PPE), polyethylene terephthalate (PET), polystyrene, polycarbonate, polymethyl methacrylates, polybutadiene, titanium dioxide ($TiO_2$), magnesium oxide (MgO), zinc oxide (ZnO), ferrous oxide (FeO), ferric oxide ($Fe_2O_3$), calcium carbonate ($CaCO_3$), lead chromate ($PbCrO_4$), barium sulfate ($BaSO_4$), molybdate orange, hansa yellow, phthalocyanine blue, phthalocyanine green, carbazole violet, carbon black, rubinine red, talc, china clay, mica, feldspar, waxes, and mixtures thereof.

9. The process according to claim 8, wherein said characteristic use particles are selected from the group consisting of PTFE, PE, PPE, $TiO_2$, carbon black, $CaCO_3$, and mixtures thereof.

10. The process according to claim 4, wherein
    said process medium is hydrophillic;
    said physical entrapment phase precursor is a metal salt; and
    said triggering agent is selected from the group consisting of an acid and a base.

11. The process according to claim 10, wherein said metal salt is a water soluble metal salt.

12. The process according to claim 10, further comprising adding a dilute acid.

13. The process according to claim 12, wherein said characteristic use particle is selected from the group consisting of polytetrafluoroethylene (PTFE), polyethylene (PE), polypropylene (PPE), polyethylene terephthalate (PET), polystyrene, polycarbonate, polymethyl methacrylates, polybutadiene, titanium dioxide ($TiO_2$), magnesium oxide (MgO), zinc oxide (ZnO), ferrous oxide (FeO), ferric oxide ($Fe_2O_3$), calcium carbonate ($CaCO_3$), lead chromate ($PbCrO_4$), barium sulfate ($BaSO_4$), molybdate orange, hansa yellow, phthalocyanine blue, phthalocyanine green, carbazole violet, carbon black, rubinine red, talc, china clay, mica, feldspar, waxes, and mixtures thereof.

14. The process according to claim 13 wherein said characteristic use particles are selected from the group consisting of PTFE, PE, PPE, $TiO_2$, carbon black, $CaCO_3$, and mixtures thereof.

15. A composition obtained according to the process of any one of claims 1, 6, and 10.

16. The composition according to claim 15, wherein a mixture of the composition with the target medium has a Hegman grind gauge improvement of greater than or equal to 1 unit compared to the Hegman grind gauge value of a control mixture of the target medium and agglomeration-exhibiting characteristic use particles that are not trapped in a physical entrapment phase.

17. The composition according to claim 15, wherein a mixture of the composition has a 1 minute sieve weight % result of greater than or equal to about 10% in comparison to a 1 minute sieve weight % result of a control sample of characteristic use particles that are not trapped in a physical entrapment phase.

18. The composition according to claim 15, wherein the composition has an agglomerated particle size decrease of greater than or equal to about 10% in comparison to the agglomerated particle size of characteristic use particles that are not trapped in a physical entrapment phase.

19. The process according to claim 1, wherein said characteristic use particle is PTFE in its reactor latex form and wherein said process further comprises drying the composition and irradiating the dried composition, wherein the irradiation takes place at an intensity of from about 5 megarads to about 50 megarads.

20. The process according to claim 8, wherein said characteristic use particle is a submicron particle.

21. The process according to claim 8, wherein said characteristic use particle is PTFE in its reactor latex form.

22. The process according to claim 13, wherein said characteristic use particle is a submicron particle.

23. The process according to claim 13, wherein said characteristic use particle is PTFE in its reactor latex form.

24. The product according to claim 15, wherein said characteristic use particle is a submicron particle.

25. The product according to claim 15, wherein said characteristic use particle is PTFE in its reactor latex form.

* * * * *